(12) United States Patent
Little et al.

(10) Patent No.: US 6,678,639 B2
(45) Date of Patent: Jan. 13, 2004

(54) AUTOMATED PROBLEM IDENTIFICATION SYSTEM

(75) Inventors: Mike E. Little, Cedar Park, TX (US); Matt J. Helgren, Austin, TX (US); Alan J. Treece, St. Peters, MO (US)

(73) Assignee: Sun Microsystems, Inc., Palo Alto, CA (US)

(*) Notice: Subject to any disclaimer, the term of this patent is extended or adjusted under 35 U.S.C. 154(b) by 114 days.

(21) Appl. No.: 09/917,597

(22) Filed: Jul. 27, 2001

(65) Prior Publication Data

US 2002/0052718 A1 May 2, 2002

Related U.S. Application Data

(60) Provisional application No. 60/223,400, filed on Aug. 4, 2000.

(51) Int. Cl.[7] .............................................. G06F 11/00
(52) U.S. Cl. ................................... 702/188; 714/25
(58) Field of Search ................ 702/117–120, 186–188, 702/FOR 103, FOR 104, FOR 134, FOR 135, FOR 139, FOR 170, FOR 171; 714/47, 36–39, 25, 48, 49, 52; 706/916, 45, 47, 50

(56) References Cited

U.S. PATENT DOCUMENTS

| | | | | |
|---|---|---|---|---|
| 4,447,846 A | * | 5/1984 | McCleery | |
| 5,944,839 A | * | 8/1999 | Isenberg | |
| 5,974,568 A | * | 10/1999 | McQueen | 714/38 |
| 6,219,626 B1 | * | 4/2001 | Steinmetz et al. | |
| 6,298,308 B1 | * | 10/2001 | Reid et al. | |

FOREIGN PATENT DOCUMENTS

JP     04225407 A    *   8/1992

* cited by examiner

*Primary Examiner*—Marc S. Hoff
*Assistant Examiner*—Craig Steven Miller
(74) *Attorney, Agent, or Firm*—Kent A. Lembke; William J. Kubida; Hogan & Hartson LLP

(57) ABSTRACT

The present invention provides an automated problem identification system. The invention analyzes a customer's computing environment, including administration practices, system configuration including hardware, software and the operating system. Then the invention compares the computing environment to an internal rules database. The internal rules database is a compilation of various problems that are known to exist on various configurations. Then, instead of calling an expert when there is a problem and repeating the process for every customer, the invention uses a proactive approach by analyzing a given system configuration and comparing it to a body of known problems, before the system breaks down.

65 Claims, 56 Drawing Sheets

AUTOMATED PROBLEM IDENTIFICATION SYSTEM

The present invention relates to an automated problem identification system. Applicant claims priority to provisional patent application No. 60/223,400 filed Aug. 4, 2000.

BACKGROUND OF THE INVENTION

1. Field of the Invention

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computing environments are becoming ever-increasingly complex. Today business enterprises operate their companies in distributed computer networks, which have skyrocketed m complexity as the simple client-server architecture has given way to three-tiered and multi-tiered computer architectures. Resources and data are increasingly pooled and accessed remotely from stripped down user terminals.

With this increasing complexity there has been an associated increase in the difficulty that system administrators have to not only keep these systems functioning, but also to keep these system is functioning in an optimal manner.

Reliability, Availability, and Serviceability (RAS)

RAS has become a foundation for strategic success for most enterprises. Reliability refers to making a system as reliable as possible. Availability is directly related to downtime. The more time a system is down the less available it is. Serviceability refers to the processes that take place when a system is down.

Maximizing a systems RAS components is essential in a computerized world. For instance, modern systems are routinely capable of meeting user requirements 99% of the time. Still, however, a 1% downtime still exceeds 80 hours per year on a system run 24 hours a day, 7 days a week. The loss of end-user productivity in a 20 user system, for just a single hour, exceeds $1000.

If the application itself is revenue generating, then the loss of a single hour of server availability could cost many thousands, or even hundreds of thousands of dollars. To illustrate, at Federal Express, the loss of a single hour of server availability is estimated to cost a million dollars. The cost of losing even a single minute of global transaction availability for Visa or Mastercard approaches ten million.

Solutions to Increase RAS

Traditionally, when problems occurred, system administrators would contact an expert, such as the maker of their computers or other technician, who would either come to their site or communicate via telephone or electronically. The expert would walk the user through the problem until a solution was found and the system was up and running once again.

One problem associated with this solution is that it is wastefully repetitious, in that the same problems that occur to different users repeat frequently. An expert called upon to repair the problem, then, will often have to repeat the same steps over and over to correct the same problems different system administrators may have. Alternatively, different experts would each have to separately solve different users identical problems in non-uniform manners.

Another problem associated with this scheme is that it only is implemented when something goes wrong (i.e., it is not proactive). If the system is not optimally configured and bound to fail soon, nothing intervenes until the system actually crashes. Therefore, using this solution there is always a time that the system is not available, and hence, the system is less reliable.

SUMMARY OF THE INVENTION

The present invention provides an automated problem identification system. The invention analyzes a customer's computing environment, including administration practices, system configuration including hardware, software and the operating system. Then the invention compares the computing environment to an internal rules database. The internal rules database is a compilation of various problems that are known to exist on various configurations. Then, instead of calling an expert when there is a problem and repeating the process for every customer, the invention uses a proactive approach by analyzing a given system configuration and comparing it to a body of known problems, before the system breaks down.

In one embodiment, the invention generates a prioritized list of problems or non-optimized aspects of the system and lists them according to severity. To analyze the customer's computing environment, one embodiment of the invention generates a list of questions that relate to the user's computing environment. Another embodiment implements a tool that analyzes and gathers data about the computing environment in an automated manner. When a problem is encountered that is not in the rules database, the problem is transferred to a human engineer, who solves the problem and updates the rules database with the solution to the problem for that given configuration.

Another embodiment of the present invention uses a user interface, a knowledge base, and a knowledge engine. The user interface is where the human interaction with the system occurs. The knowledge base comprises a series of checks which contain granular information about problems that may be encountered. The knowledge engine is a software component that interacts with the knowledge base and user interface to interpret checks and produce recommendations.

DETAILED DESCRIPTION OF THE INVENTION

The invention is an automated problem identification system. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Automated Problem Identification System

Figure 1:
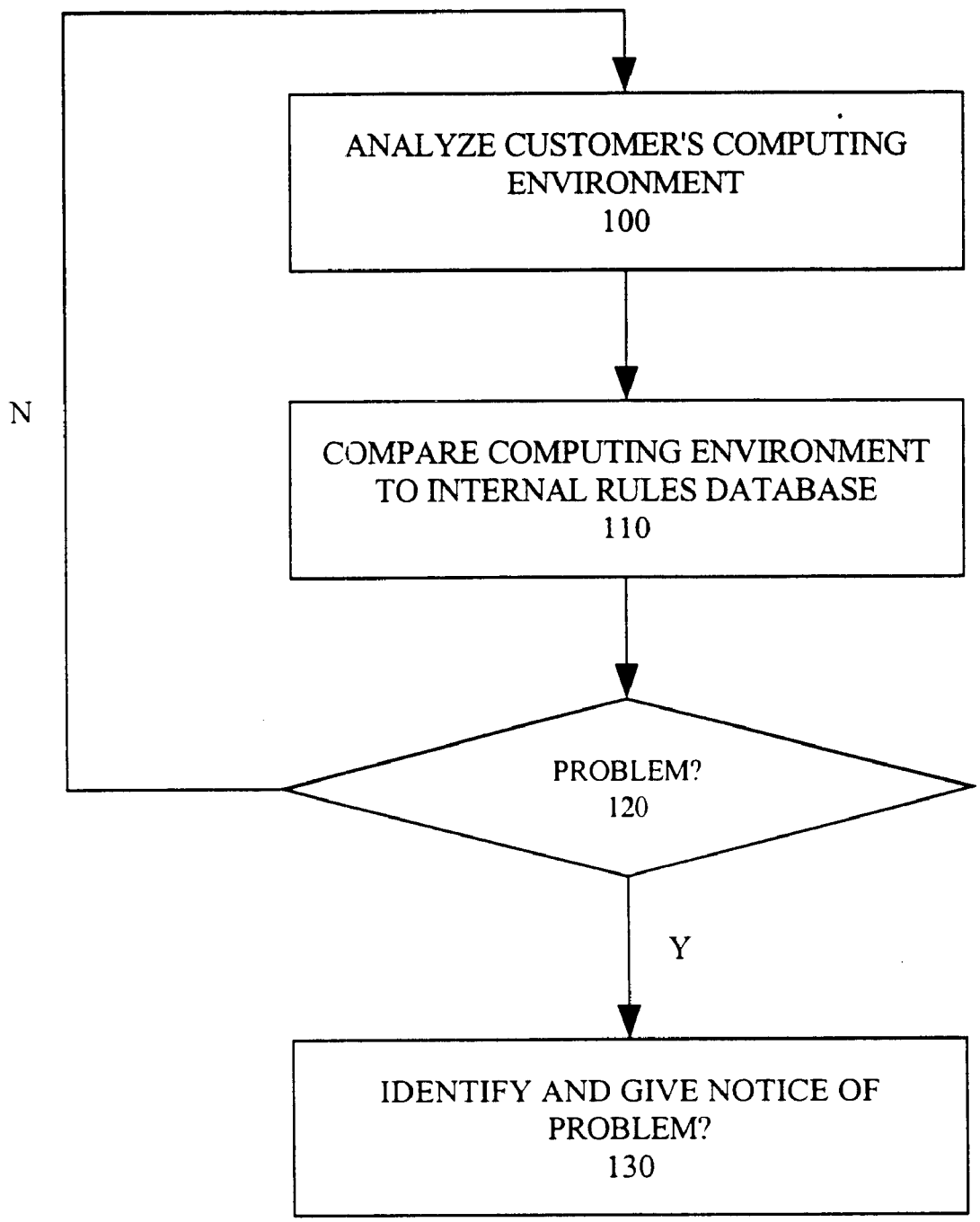
FIG. 1 is a flowchart showing the proactive process implemented by an embodiment of the present invention.

The present invention uses a proactive model to identify and solve problems. One embodiment of the proactive process is shown in FIG. 1. At operation 100, a customer's computing environment is analyzed. This might include, for instance, administration practices, system configuration including hardware, software and the operating system. Then at operation 110, the computing environment is compared to an internal rules database. The internal rules database is a compilation of various problems that are known to exist on various configurations. At operation 120, it is determined if there is a potential problem. If not, the process repeats at operation 100. Otherwise, at operation 130, the potential problem is identified and taken notice of. The identification may take place, for instance, by generating a report.

Figure 2:
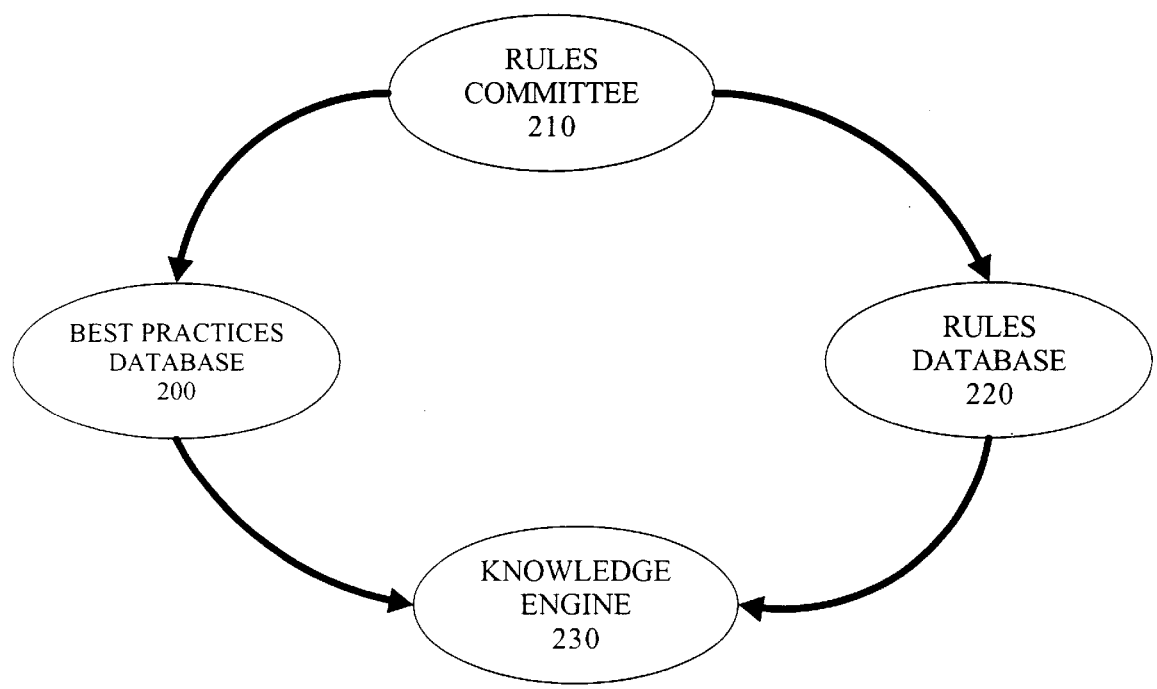
FIG. 2 is a flowchart showing the generation of a rules database according to an embodiment of the present invention.

The manner in which the internal rules database is created and maintained by one embodiment of the present invention is shown in FIG. 2. A best practices database 200 is maintained which documents the most effective solution to a given problem. A rules committee 210 reviews the best practices database 200. If one of the best practices applies to a given problem, the rules committee 210 places the practice into a rule or knowledge database 220, which is used to create a knowledge engine 230 that is used by embodiments of the present invention.

Figure 3:
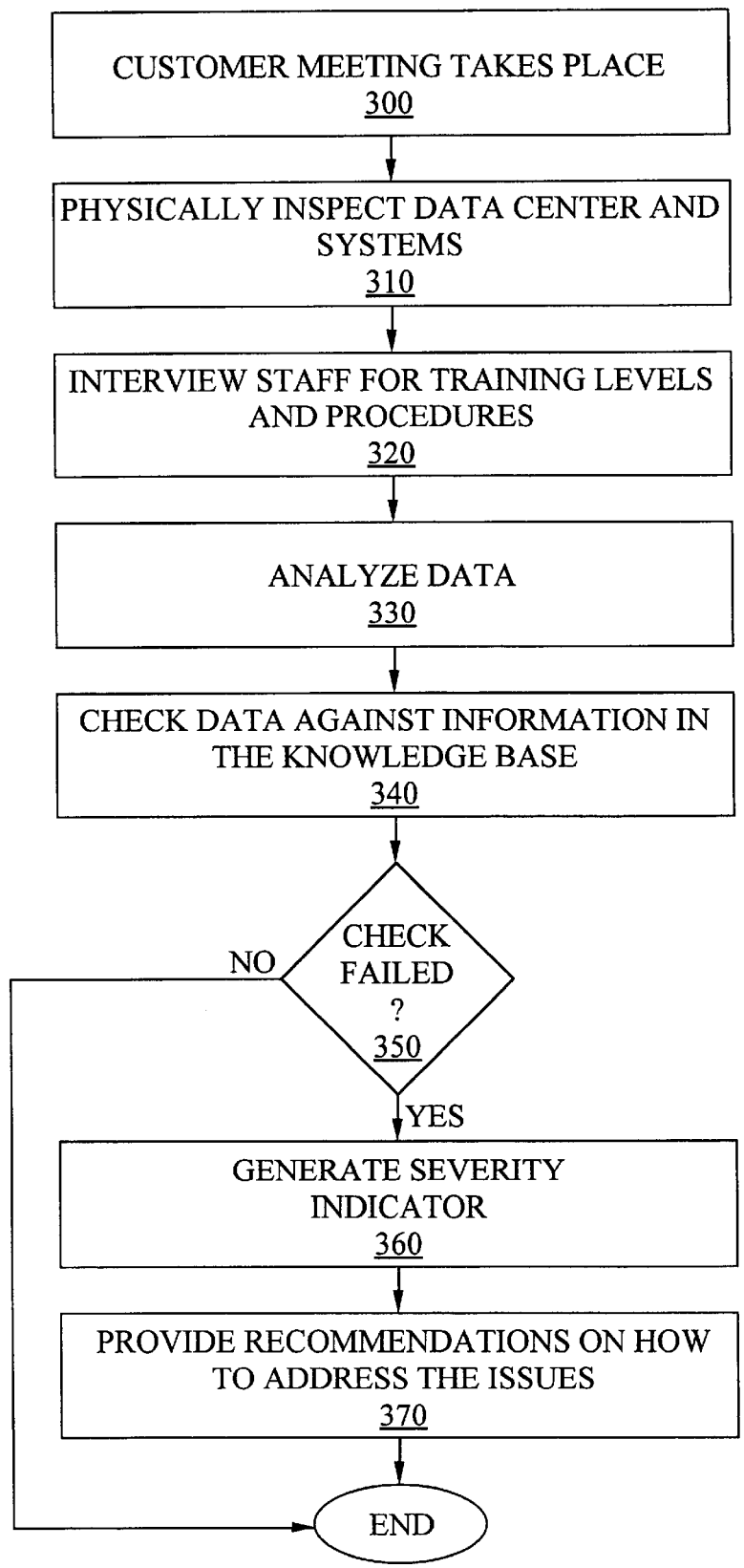
FIG. 3 is a flowchart showing the automated problem identification system of one embodiment of the present invention.

Another embodiment of the present invention is shown in FIG. 3. A customer meeting first takes place at operation 300. Next, at operation 310, a physical inspection of the data center and systems takes place where hardware and environmental conditions are analyzed. At operation 320 the staff is interviewed for training levels and data center procedures. At operation 330, an engineer analyzes the data. Next, the system checks the data against information in the knowledge base at operation 340.

At operation 350 it is determined if the check failed. If not, then there are no anticipated problems and the process terminates. If so, a severity indicator is generated at operation 360 that highlights the potential for unplanned system downtime and/or data corruption due to a problem in the data center or due to system conditions. At operation 370 recommendations are made on how to address the issues.

Knowledge Base and Knowledge Engine

Another embodiment of the present invention uses a user interface, a knowledge base, and a knowledge engine. The user interface is where the human interaction with the system occurs. In one embodiment, the user interface takes place in a conventional web browser, such as Microsoft Internet Explorer or Netscape Communicator. The knowledge base comprises a series of checks which contain granular information about problems that may be encountered and may also contain information about identifying, analyzing, and correcting the problem. A check is defined as an act or an instance of inspecting or testing, as for accuracy or quality.

Figure 4:
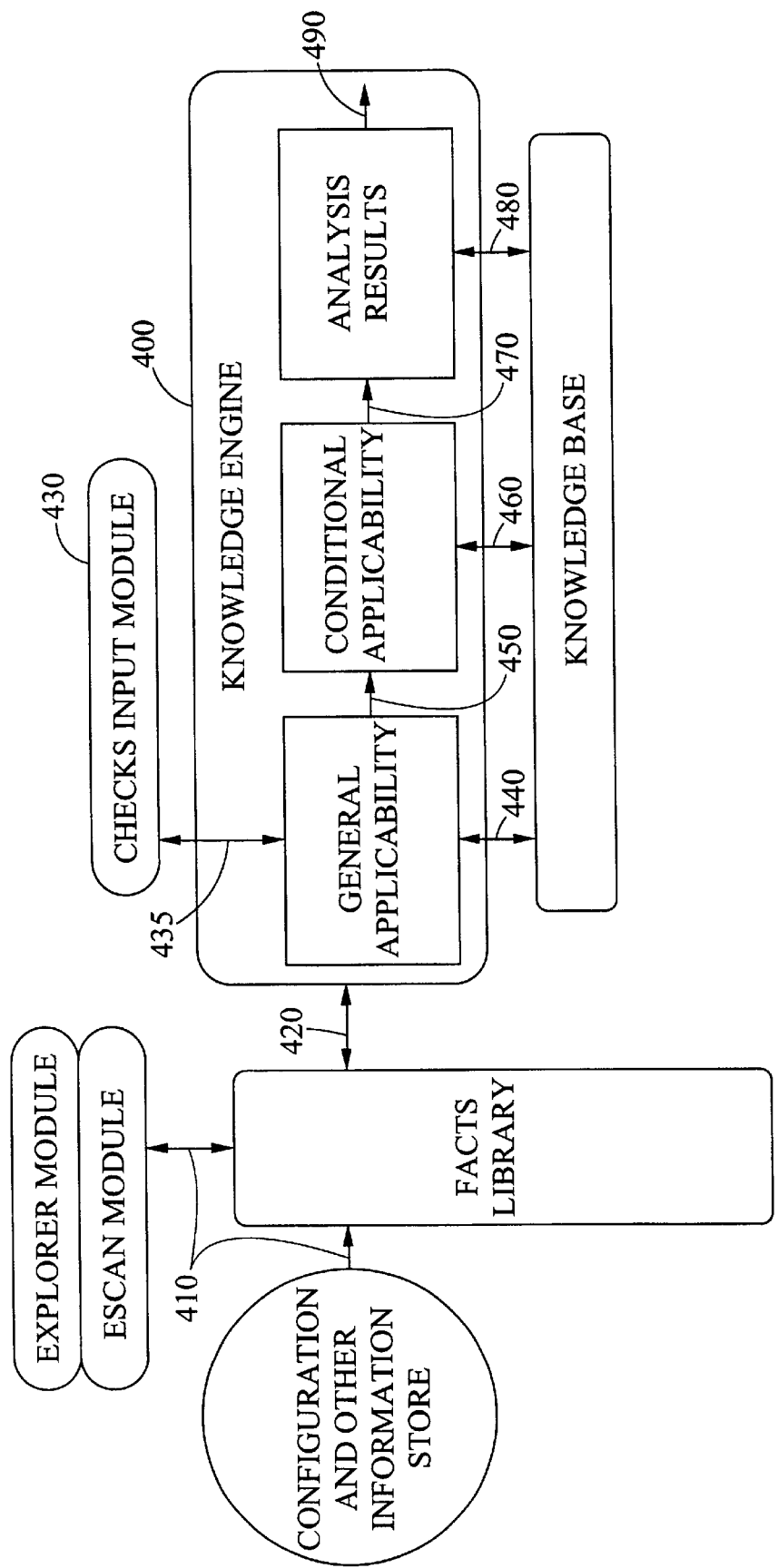
FIG. 4 is a flowchart showing the automated problem identification system of another embodiment of the present invention.

The knowledge engine is a software component that interacts with the knowledge base and user interface to interpret checks against the customer's configurations. The knowledge engine decides which recommendations will be included in the reports delivered to the customers. One embodiment of the knowledge engine is shown in FIG. 4.

The knowledge engine 400 is a check flow manager that passes particular checks to other information flows based on the given conditions. Configuration and other information 410, is sent to a facts library. A check list generator gets the facts having general applicability 420. The checks are obtained from a module 430, for instance a database such as Oracle or others. A generator 435 creates a checklist given the facts 440. The generator 435 passes on a check (one at a time) to a conditions component 450.

The condition component 450 uses an interpreter 460 to generate the appropriate checks that meet the conditions of applicability. The checks that qualify are fed (one at a time) to an analysis results section 470. The analysis section runs checks to generate the appropriate response given the conditions 480. Then, results are passed on for publishing 490.

Check Condition Language (CCL)

In one embodiment, a CCL is used. For instance, the CCL might be used, for instance when the generator creates a checklist given the facts or when appropriate responses are given based on the conditions. One embodiment of a CCL has the form:

<applicability><conditions><severity>

CCL allows understandable input and provides the precision needed for an expert engine. CCL acts as a trip wire mechanism allowing the creation of checklists that apply to the system's condition and general applicability. CCL allows for multiple severity analysis for a given check. A CCL interpreter is used in the knowledge engine to generate check lists and allows for parsing. Checks are then fed to the analysis flow one check at a time.

Check Embodiments

A check is comprised of a title (description of the check), rule (what is being checked and what makes it fail), analysis (what is found in the inspection), and recommendations (what recommendations are given by the subject matter experts on how to resolve and/or allow future inspections to pass this check). The following are examples of different checks that might be used by the present invention.

High Risk of Service Interruption

An example of an environmental check that might result in a high risk of service interruption or data loss is when the temperature measured in the computer room is unacceptable. The analysis might state that the measured computer room temperature is outside the acceptable range for RAS compliance. The recommendation might instruct the user to address the computer room ambient temperature.

Most computer equipment can operate within a wide psychrometric range, but a temperature range of 70 to 74 degrees F (21 to 23 C.) is desirable because it is easier to maintain safe associated humidity levels at this temperature, and there is a fairly wide operational buffer in case of environmental support systems down time. The operating environment specifications provided by manufacturers are normally the absolute hardware limits, and should not be considered guidelines for normal continuous operation. The hardware environment should be maintained within the optimal condition range at all times, thus allowing the greatest buffer in case of transients caused by environmental support equipment failure or other unpredictable influences.

Figure 5:
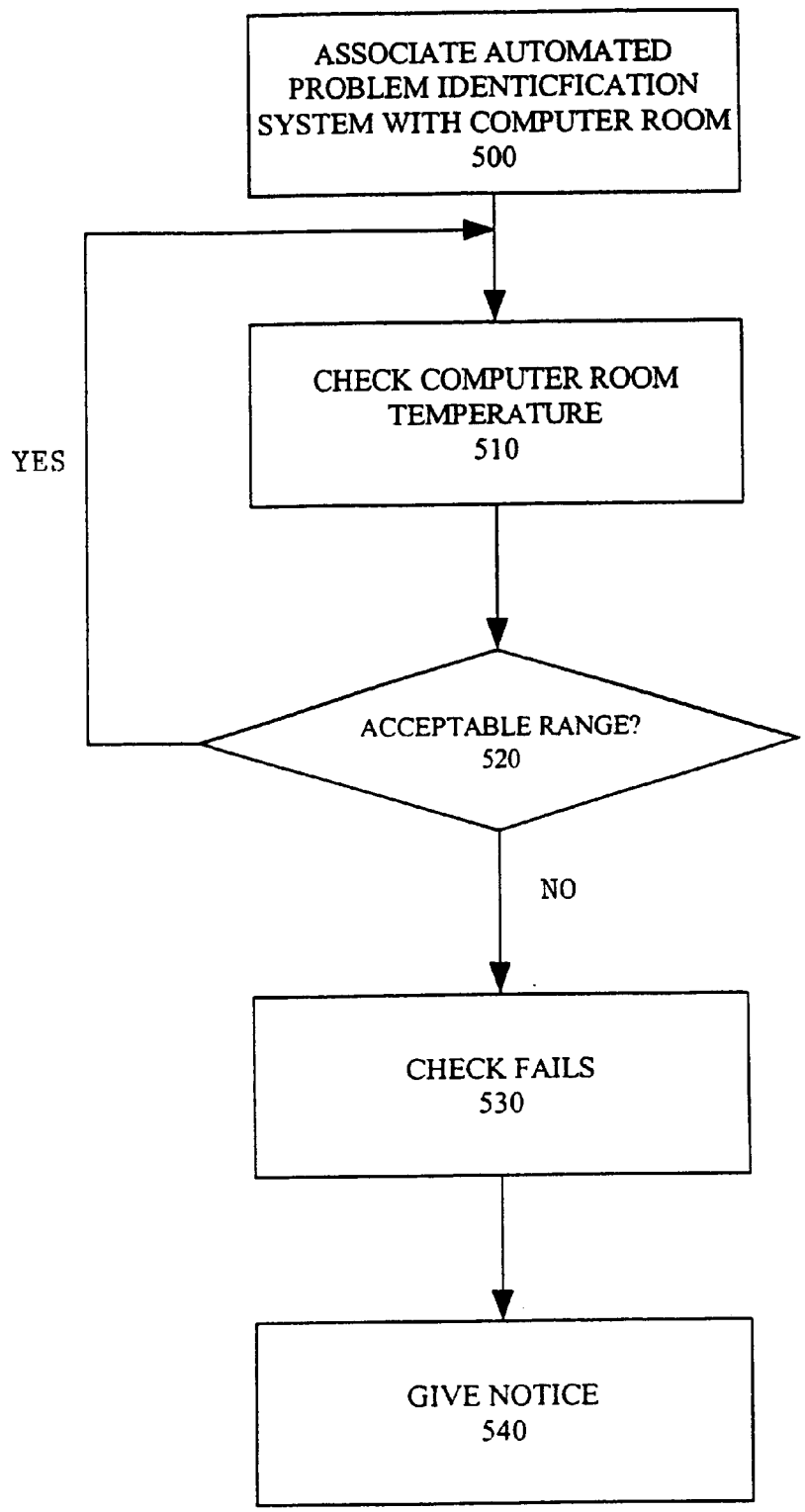
FIG. 5 shows a high risk of service interruption check according to an embodiment of the present invention.

FIG. 5 shows a check according to an embodiment of the present invention. At operation 500, an automated problem identification system is associated with a computer room. At operation 510, the computer room temperature is checked. At operation 520, it is determined if the temperature is within an acceptable range. If it is within the range, the process repeats at step 510. Otherwise, the temperature is outside range, so the check fails at operation 530 and some form of notice is given at operation 540.

An example of a hardware check that might result in a high risk of service interruption or data loss is a UDWIS/SBus SCSI host-target communication problem after reboot—FCO A0163. The analysis might state that systems with large quantities of UDWIS/SBus Host Adapters installed (Sun part number 370-2443-01) may not come up after reboot due to miscommunication between the SCSI host and the target. Large configurations with many UDWIS/SBus Host Adapter cards are more vulnerable due to higher probability of encountering the reboot problem.

If a system can be rebooted it may fail to communicate correctly with a storage device connected via a UDWIS/SBus Host Adapter. This would have different results depending on the system configuration. StorEdge A3x00 units on either standalone systems or clusters are particularly susceptible to this problem. Cluster or Non-cluster systems with StorEdge A3x00s may see corrupted SCSI inquiry strings during boot up. The recommendation might instruct the user to replace all 370-2443-01 (UDWIS SPORT-20D SBus Card) with 370-2443-092.

Figure 29:
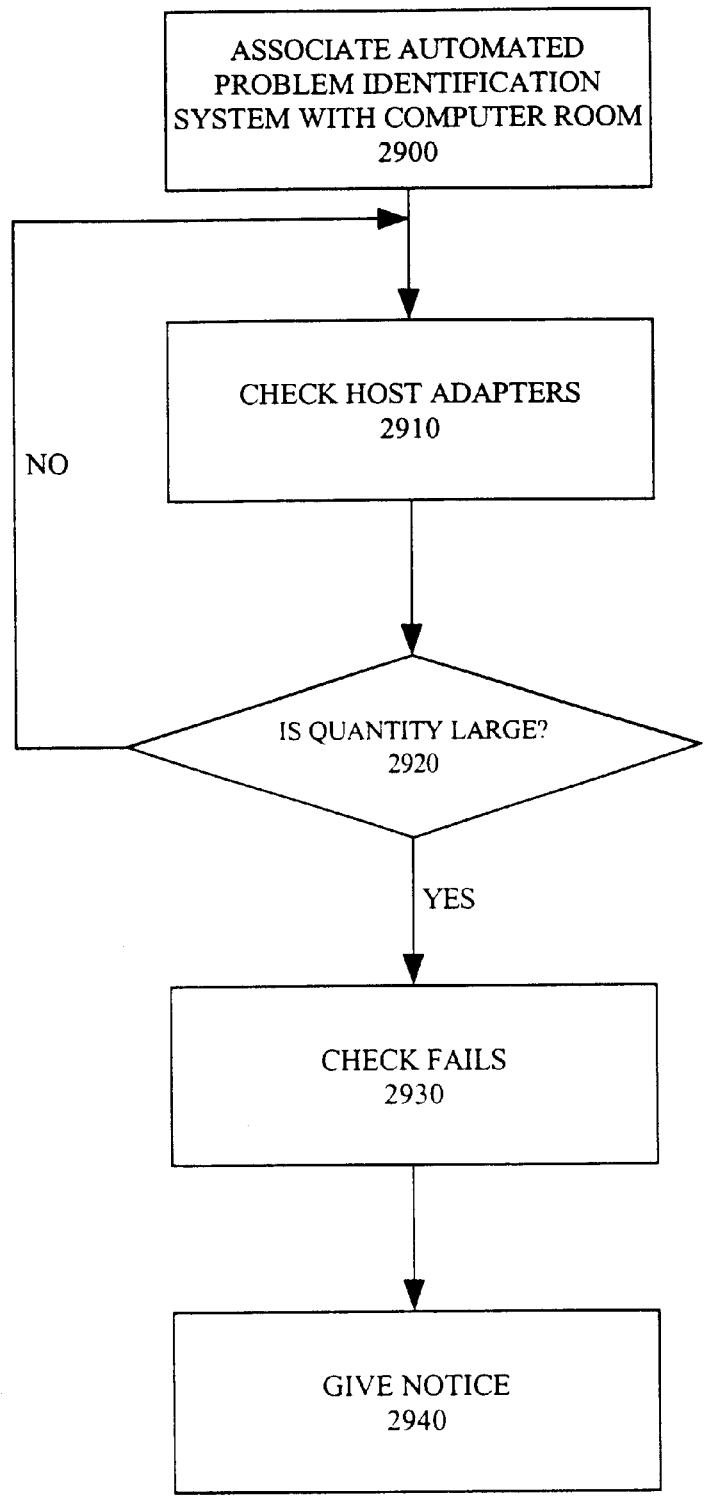
FIG. 29 shows a high risk of service interruption check according to another embodiment of the present invention.

FIG. 29 shows a check according to an embodiment of the present invention. At operation 2900, an automated problem identification system is associated with a computer room. At operation 2910, the quantity of UDWIS/SBus Host Adapters installed is checked. At operation 2920, it is determined if there is a large quantity. If there is not, the process repeats at step 2910. Otherwise, the check fails at operation 2930 and some form of notice is given at operation 2940.

An example of a storage check that might result in a high risk of service interruption or data loss is when an A5x00 software patch cluster is not current. The analysis might state:

A5000 configuration:
  3 A5000
    b Firmware Rev: 1.09
    a Firmware Rev: 1.09
    d Firmware Rev: 1.08
  Warning:
  The matching of firmware and driver is not achieved for each ibfirmware.
  The firmware that should be installed is the 1.09.
  4 FCode (SBus or Onboard)
    FCode 1.12 OK
    FCode 1.12 OK
    FCode 1.12 OK
    FCode 1.12 OK
  30 disks 9G ST19171FC, 30 of them are in firmware below 7Dxx or different from fw patch 9GST19171FC: 106129-11
  All the disks 9G ST39102FC have a firmware higher or equal to 0929.

The recommendation might instruct the user to install all patches in the latest A5x00 patch cluster. Failure to do so could result in down time related to known issues.

Figure 30:
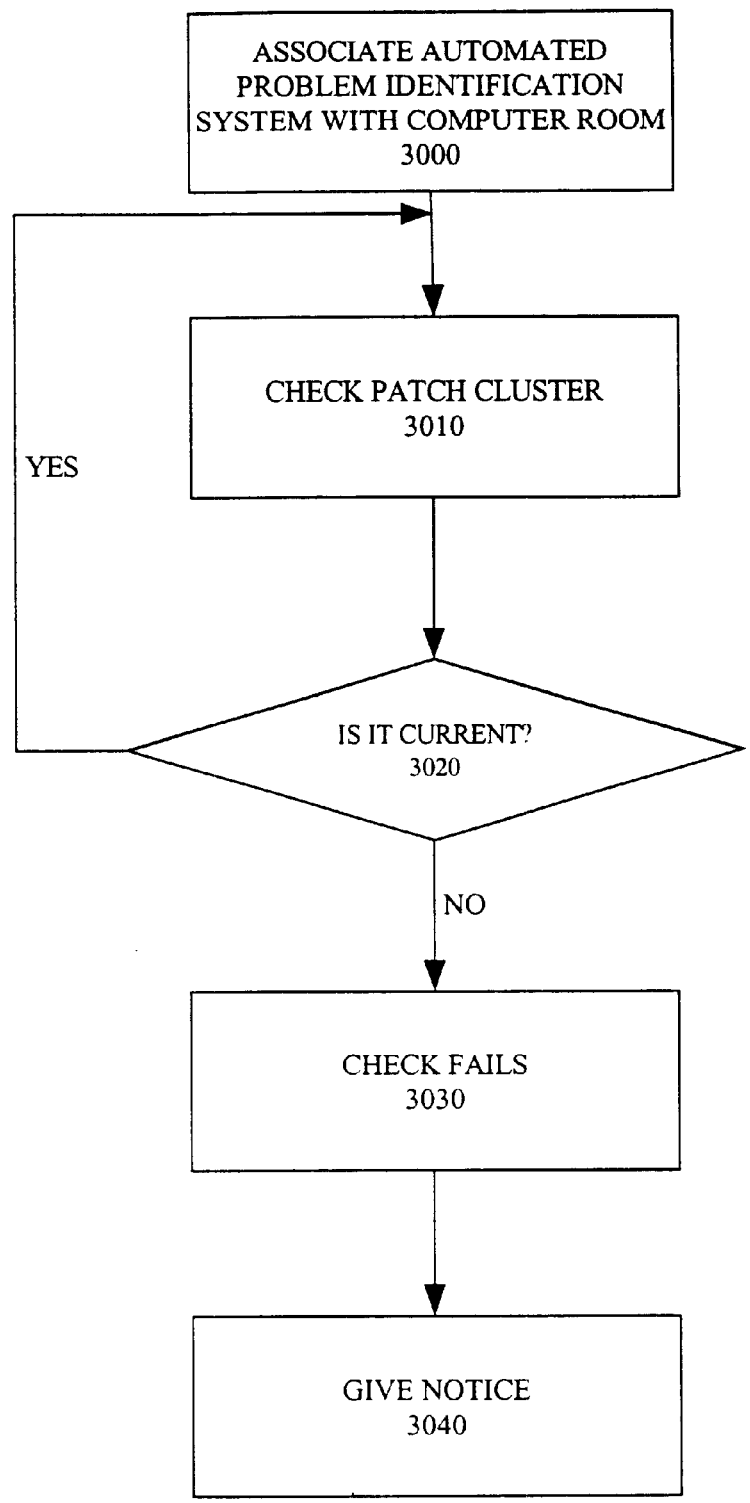
FIG. 30 shows a high risk of service interruption check according to another embodiment of the present invention.

FIG. 30 shows a storage check according to an embodiment of the present invention. At operation 3000, an automated problem identification system is associated with a computer room. At operation 3010, the A5x00 patch cluster is checked. At operation 3020, it is determined if it is current. If it is, the process repeats at step 3010. Otherwise, the check fails at operation 3030 and some form of notice is given at operation 3040.

An example of a storage check that might result in a high risk of service interruption or data loss is when 18GB drives of type ST118273FC do not have current firmware. The analysis might state that ST118273FC drive(s) have firmware below 8854. The recommendation might instruct the user to upgrade the ST19171FC disk firmware to the latest firmware, which may be, for example, available in patch 106129. It might also state that the following disks need to be upgraded:

c4t0d0 at 6b78
c4t1d0 at 6b78
c4t2d0 at 6b78
c4t3d0 at 6b78
c4t4d0 at 6b78
c4t5d0 at 6b78
c4t6d0 at 6b78
c4t16d0 at 6b78
c4t17d0 at 6b78
c4t18d0 at 6b78
c4t19d0 at 6b78
c4t20d0 at 6b78
c4t21d0 at 6b78
c4t22d0 at 6b78
c4t32d0 at 6b78
c4t33d0 at 6b78
c4t34d0 at 6b78
c4t35d0 at 6b7E
c4t36d0 at 6b78
c4t37d0 at 6b78
c4t38d0 at 6b78
c4t48d0 at 6b7E
c4t49d0 at 6b78
c4t50d0 at 6b78
c4t51d0 at 6b7E
c4t52d0 at 6b78
c4t53d0 at 6b78
c4t54d0 at 6b7E
c6t0d0 at 147E
c6t3d0 at 147E

Figure 31:
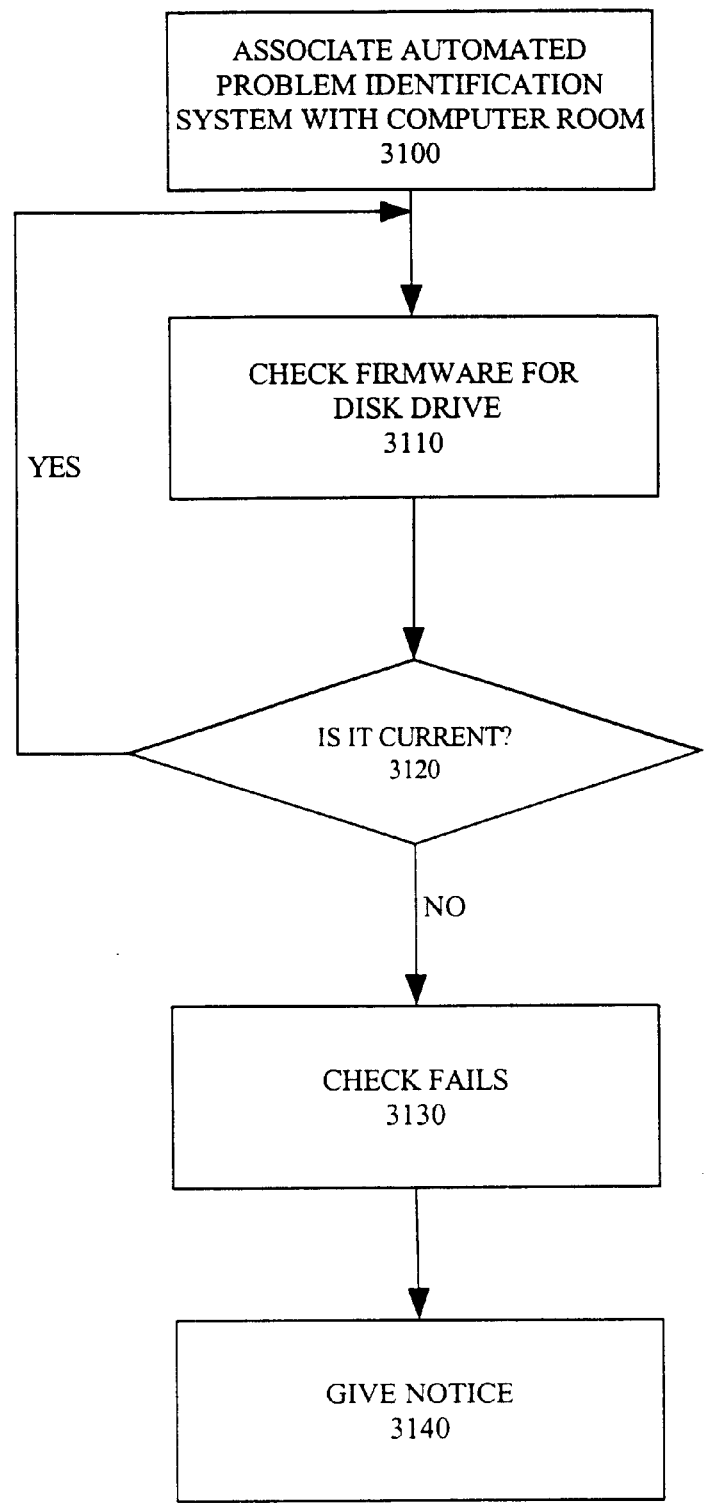
FIG. 31 shows a high risk of service interruption check according to another embodiment of the present invention.

FIG. 31 shows a storage check according to an embodiment of the present invention. At operation 3100, an automated problem identification system is associated with a computer room. At operation 3110, the firmware for the disk drive is checked. At operation 3120, it is determined if it is current. If it is, the process repeats at step 3110. Otherwise, the check fails at operation 3130 and some form of notice is given at operation 3140.

An example of a storage check that might result in a high risk of service interruption or data loss is when two different models of or types of disk arrays or memory devices, such as StorEdge™ A1000/D1000 and A3X00 arrays distributed by Sun Microsystems, Inc., are operating with only one power supply. In this example, the analysis might state that an A1000/D1000 and an A3X00 may be operating with only one power supply or have power supply date codes that fall within range of FCO-A0162-1. The recommendation might state that failure of this check does not mean that you have a power supply that falls within the serial number or date code range of FCO-A0162-1. However, we advise you to identify and replace all A1000/D1000 and A3X00 power supplies that fall within date code range or have failed. This is an intrusive check which will require the system to be down to validate. Please refer to the contents of FCO-A0162-1. It is recommended that the verification of this FCO ("field change order") be performed at the next maintenance window.

Figure 32:
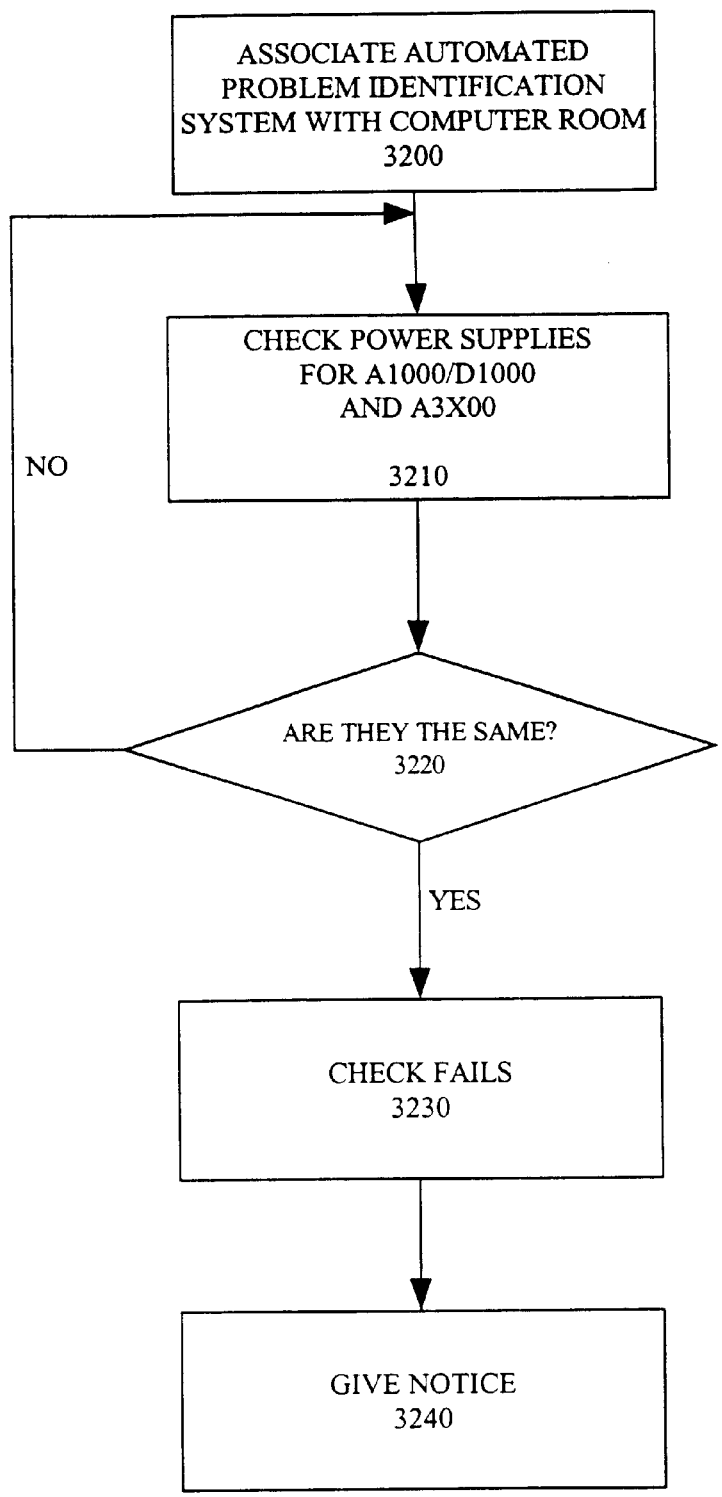
FIG. 32 shows a high risk of service interruption check according to another embodiment of the present invention.

FIG. 32 shows a storage check according to an embodiment of the present invention. At operation 3200, an automated problem identification system is associated with a computer room. At operation 3210, the power supplies for A1000/D1000 and A3X00 are checked. At operation 3220, it is determined if they are the same. If they are not, the process repeats at step 3210. Otherwise, the check fails at operation 3230 and some form of notice is given at operation 3240.

An example of an operational check that might result in a high risk of service interruption or data loss is when a system does not have a current, restorable OS backup using ufsdump. The analysis might state that the system does not have a directly restorable OS backup. Data backup utilities such as Solstice Backup (Legato) or Enterprise NetBackup do not have the capability to restore data to a system without a running operating system, and disk mirrors do not protect against data corruption. An operating system will have to be (re)loaded on the system, before the backup software can be reloaded and restore of the system data can commence. The recommendation might state that the user should routinely backup the system OS using ufsdump to a local device. These OS backups should be sent offsite routinely with the corresponding data backups.

Figure 33:
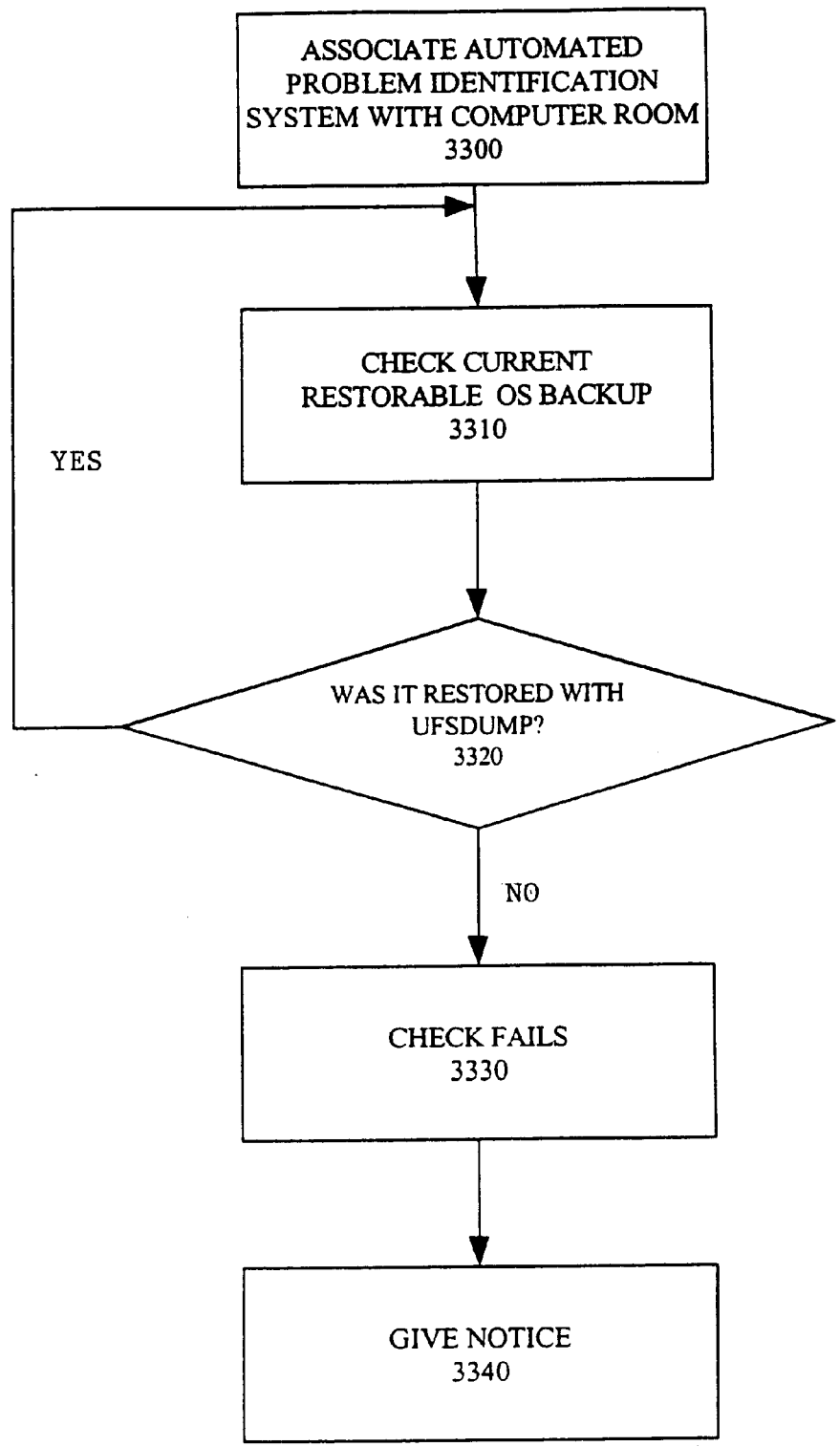
FIG. 33 shows a high risk of service interruption check according to another embodiment of the present invention.

FIG. 33 shows an operational check according to an embodiment of the present invention. At operation 3300, an automated problem identification system is associated with a computer room. At operation 3310, the current restorable OS backup is checked. At operation 3320, it is determined if it was restored with a backup utility, such as a basic Unix backup utility or Solaris™ ufsdump (i.e., a utility for backing up all specified files to magnetic tape, diskette, disk file, and the like). If so, the process repeats at step 3310. Otherwise, the check fails at operation 3330 and some form of notice is given at operation 3340.

An example of an unbundled products check that might result in a high risk of service interruption or data loss is when the system has a plex with a kernel state of DISABLED. The analysis might state that a volume plex has been found with a kernel state of "DISABLED". The plex is currently offline and cannot be accessed. The recommendation might state that the user should investigate and repair the kernel state of the plex.

Figure 34:
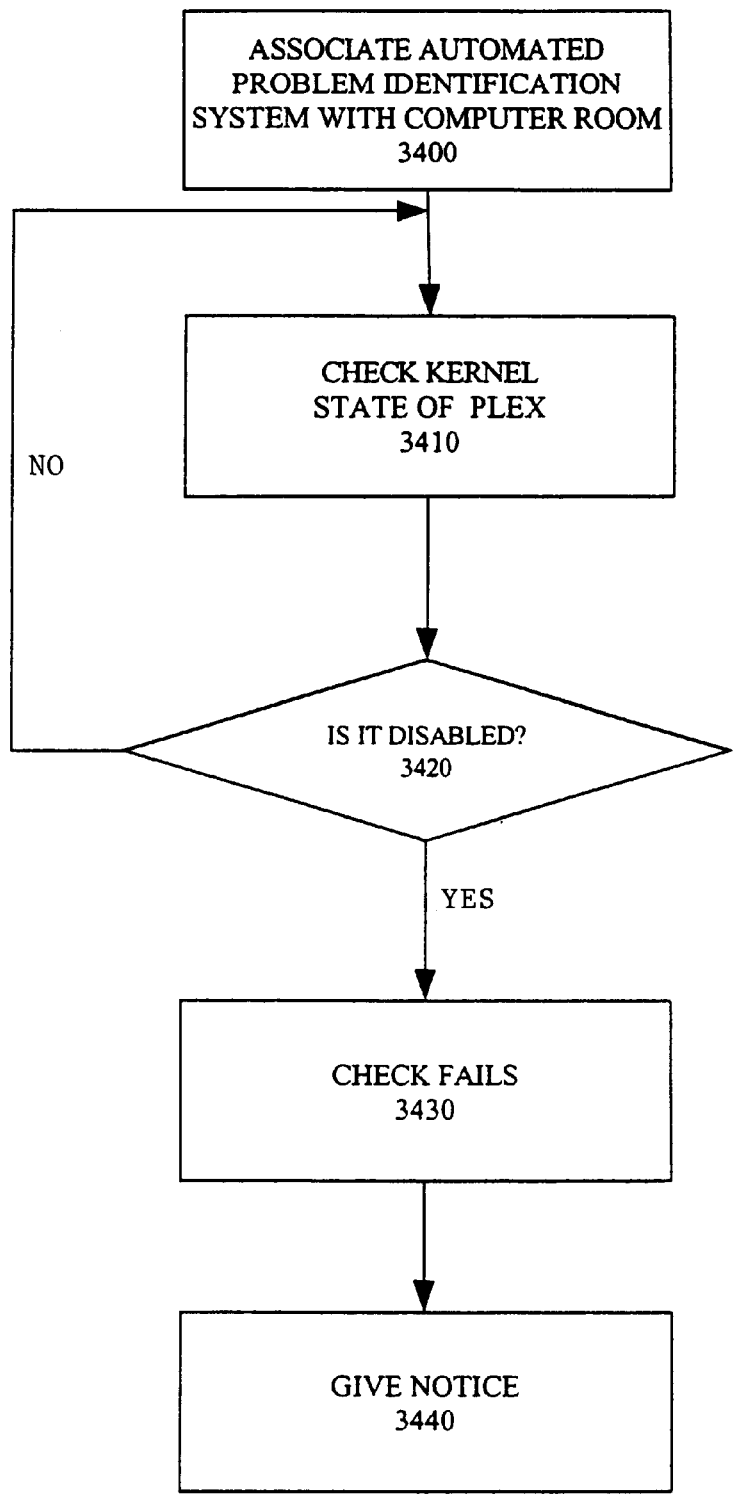
FIG. 34 shows a high risk of service interruption check according to another embodiment of the present invention.

FIG. 34 shows an unbundled products check according to an embodiment of the present invention. At operation 3400, an automated problem identification system is associated with a computer room. At operation 3410, the kernel state of the plex is checked. At operation 3420, it is determined if it is disabled. If not, the process repeats at step 3410. Otherwise, the check fails at operation 3430 and some form of notice is given at operation 3440.

Medium Risk of Service Interruption

An example of an environmental check that might result in a medium risk of service interruption or data loss is when power and environmental systems have not been re-certified within the last year. The analysis might state that the power and environmental systems have not been re-certified or re-calibrated within the last year. The recommendation might instruct the user to re-certify the data center power and/or environmental systems to ensure correct operation.

Figure 6:
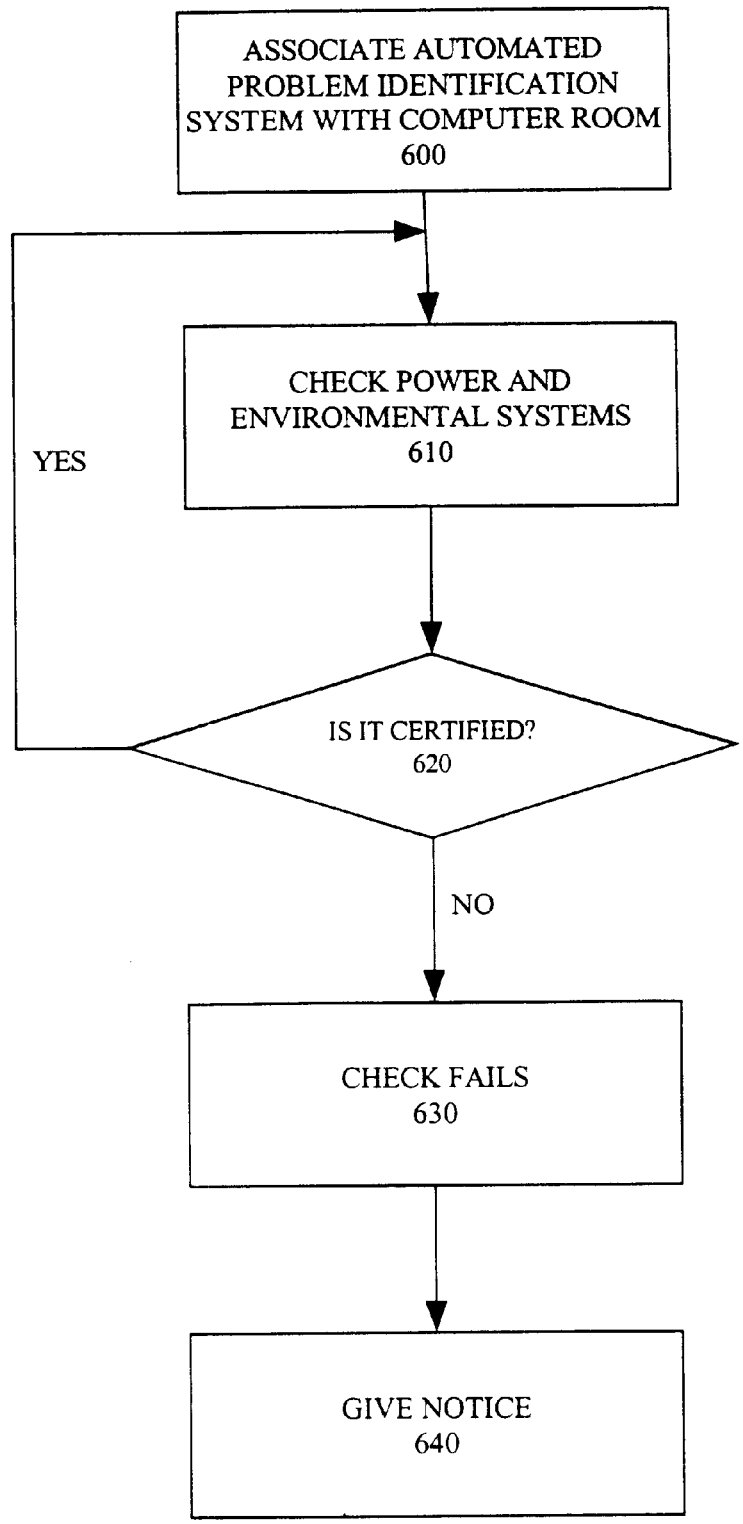
FIG. 6 shows a medium risk of service interruption check according to an embodiment of the present invention.

FIG. 6 shows a check according to an embodiment of the present invention. At operation 600, an automated problem identification system is associated with a computer room. At operation 610, the power and environmental systems are checked for certification within the last year. At operation 620, it is determined if the equipment is certified. If it is, the process repeats at step 610. Otherwise, the certification or calibration is not current, so the check fails at operation 630 and some form of notice is given at operation 640.

Another example of an environmental check that might result in a medium risk of service interruption or data loss is when one or more grounding points do not reference PDU ground. The analysis might state that one or more grounding points (raised floors, power receptacles, etc.) do not properly reference PDU ground. The key component for grounding is solid, stable earth ground at the PDU. The recommendation might instruct the user to configure all grounding points (raised floors, power receptacles, etc.) to reference PDU ground.

Figure 7:
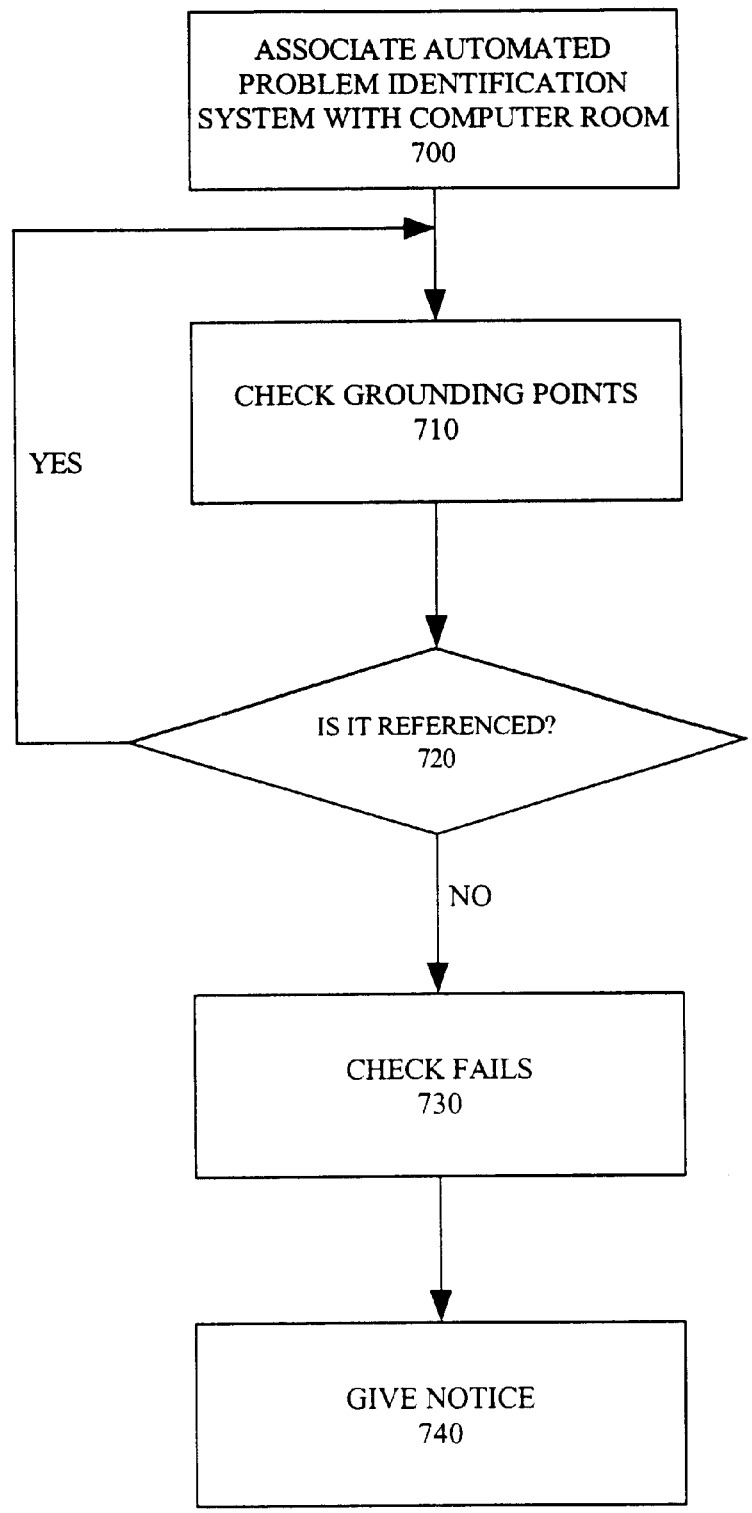
FIG. 7 shows a medium risk of service interruption check according to another embodiment of the present invention.

FIG. 7 shows a check according to an embodiment of the present invention. At operation 700, an automated problem identification system is associated with a computer room. At operation 710, the grounding points are checked for a reference to PDU ground. At operation 720, it is determined if the grounding points reference PDU ground. If it is, the process repeats at step 710. Otherwise, the check fails at operation 730 and some form of notice is given at operation 740.

An example of a security check that might result in a medium risk of service interruption or data loss is when the root password is not changed at least every six months. The analysis might state that the root password has not been changed in the last six months. Frequent change of the root password limits the security risk if an unauthorized person obtains the root password for a system. The recommendation might instruct the user to implement a policy to change the root password at least every six months, to increase root password security.

Figure 8:
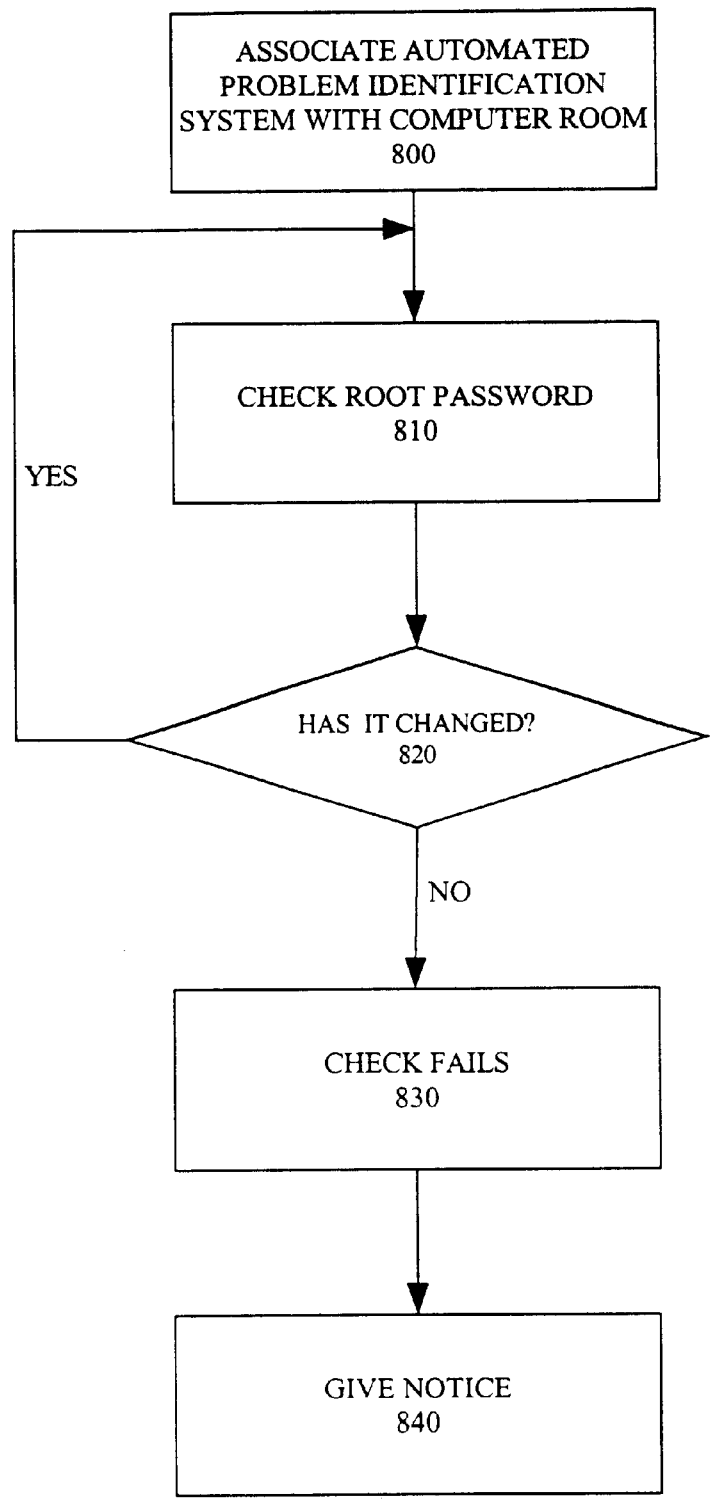
FIG. 8 shows a medium risk of service interruption check according to another embodiment of the present invention.

FIG. 8 shows a check according to an embodiment of the present invention. At operation 800, an automated problem identification system is associated with a computer room. At operation 810, the root password is checked to see if it has been changed within the last six months. At operation 820, it is determined if the password has been changed. If it has, the process repeats at step 810. Otherwise, the password has not been changed, so the check fails at operation 830 and some form of notice is given at operation 840.

An example of a monitoring and escalation check that might result in a medium risk of service interruption or data loss is when the escalation procedure is not readily available. The analysis might state that the escalation procedure is not readily available in hard copy. If the escalation document cannot be found during a system failure, extended downtime may result. The escalation procedure should be kept as a hard copy document, as the soft copy maybe unavailable due to the system failure. The recommendation might instruct the user to make a hard copy of the escalation procedure readily available so that it can be easily accessed in the event of a system or service interruption.

Figure 9:
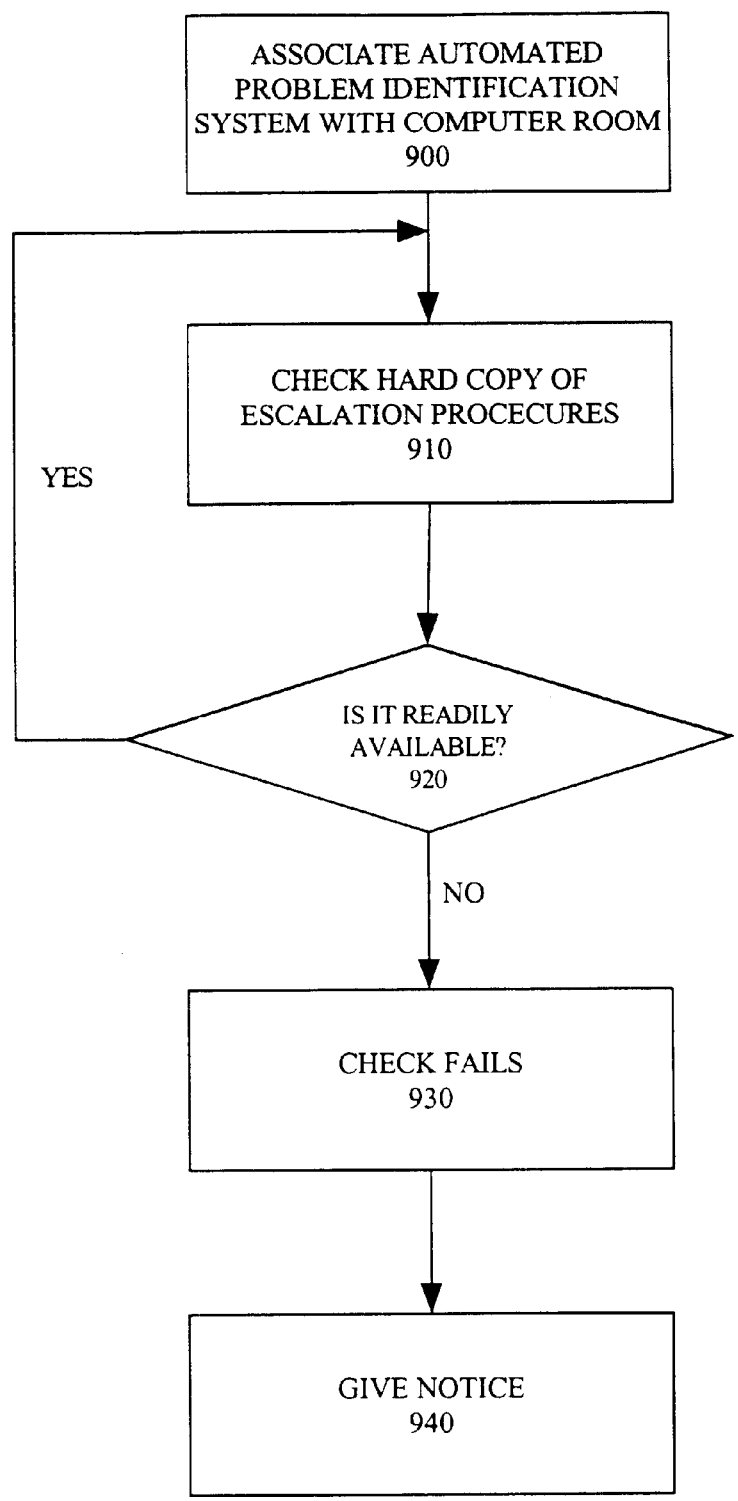
FIG. 9 shows a medium risk of service interruption check according to another embodiment of the present invention.

FIG. 9 shows a monitoring and escalation check according to an embodiment of the present invention. At operation 900, an automated problem identification system is associated with a computer room. At operation 910, the hard copy of the escalation procedures is checked. At operation 920, it is determined if it is readily available. If it is, the process repeats at step 910. Otherwise, the check fails at operation 930 and some form of notice is given at operation 940.

An example of a monitoring and escalation check that might result in a medium risk of service interruption or data loss is when service response expectations do not match current contract levels. The analysis might state that the expected application recovery times may not be met based on the current hardware and software contract levels. The recommendation might instruct the user to upgrade the contract levels to match the expected response times and expected application recovery times.

Figure 10:
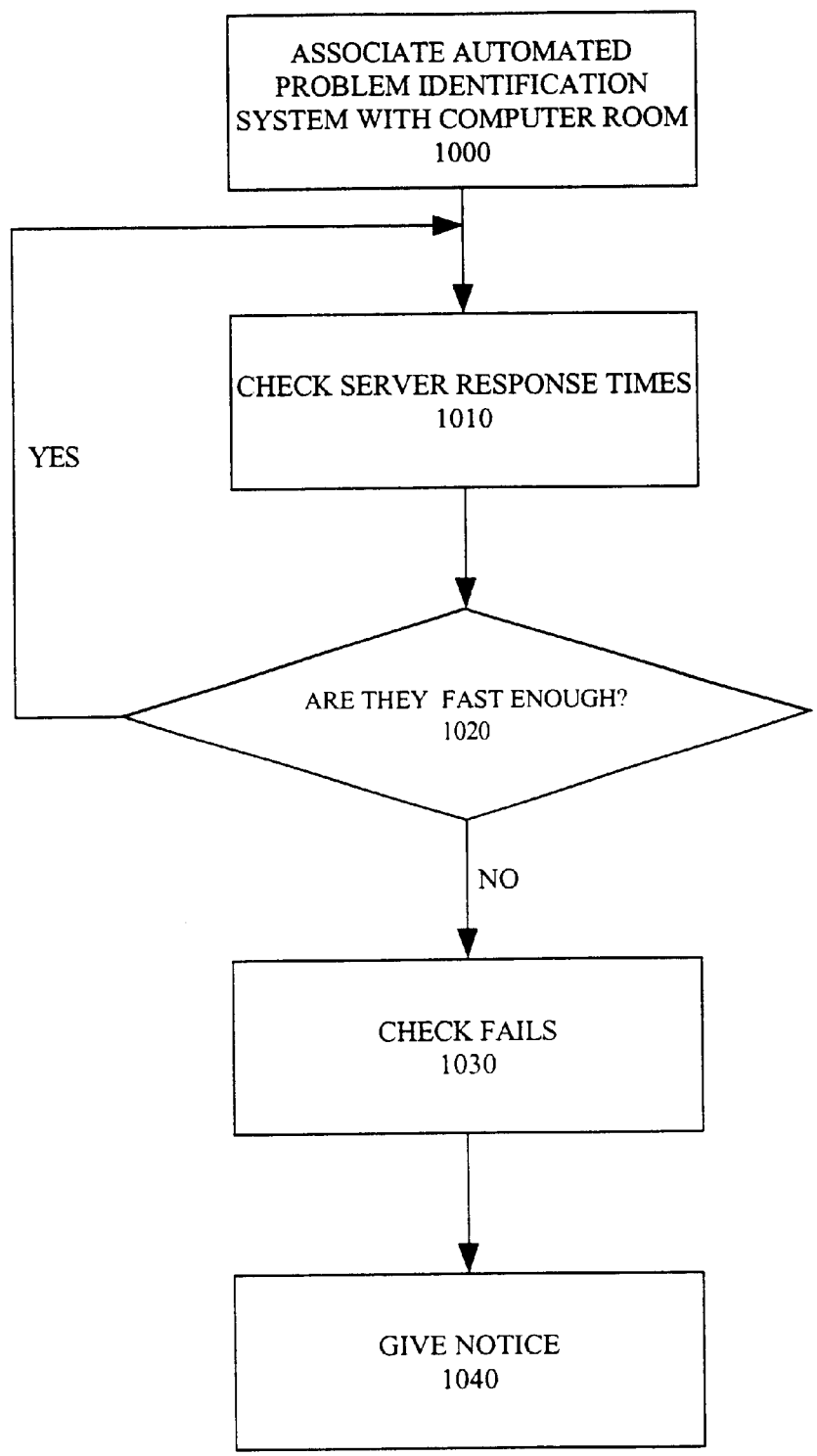
FIG. 10 shows a medium risk of service interruption check according to another embodiment of the present invention.

FIG. 10 shows a monitoring and escalation check according to an embodiment of the present invention. At operation 1000, an automated problem identification system is associated with a computer room. At operation 1010, the server response times are checked. At operation 1020, it is determined if they are fast enough. If they are, the process repeats at step 1010. Otherwise, the check fails at operation 1030 and some form of notice is given at operation 1040.

An example of a change management check that might result in a medium risk of service interruption or data loss is when new hardware does not go through a validation process. The analysis might state that a validation and test process for new datacenter hardware does not exist. An untested piece of datacenter equipment may cause unwanted service interruption, due to infant mortality or configuration issues that would be discovered during a test and validation process. The recommendation might instruct the user to implement procedures such that all new hardware goes through a thorough validation and test process prior to bringing that equipment online.

Figure 11:
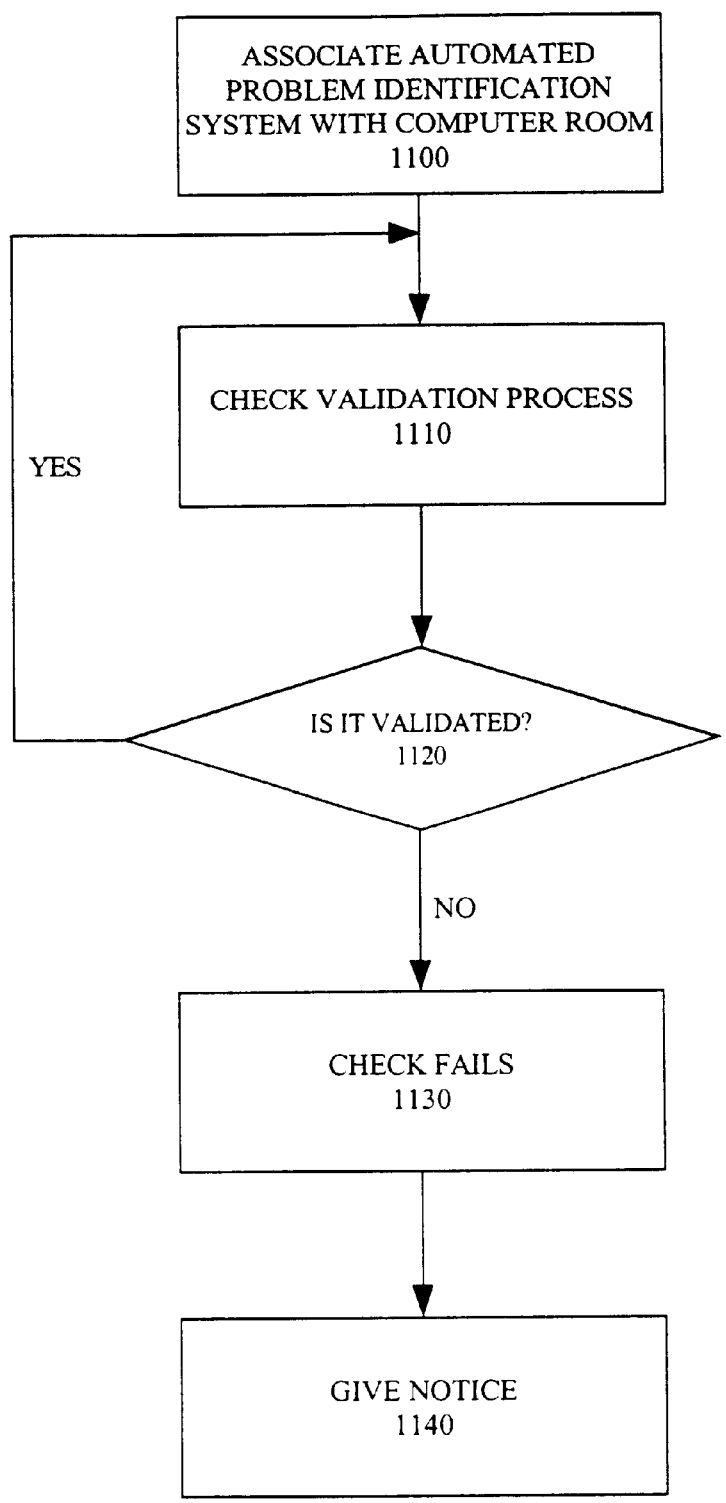
FIG. 11 shows a medium risk of service interruption check according to another embodiment of the present invention.

FIG. 11 shows a change management check according to an embodiment of the present invention. At operation 1100, an automated problem identification system is associated with a computer room. At operation 1110, the new hardware validation process is checked. At operation 1120, it is determined if new hardware is validated. If it is, the process repeats at step 1110. Otherwise, the check fails at operation 1130 and some form of notice is given at operation 1140.

An example of a backup and disaster recovery check that might result in a medium risk of service interruption or data loss is when system operating system (OS) backup procedures do not include regularly scheduled level zero ufsdumps. The analysis might state that regular level zero ufsdumps are not currently part of system backup procedures. This may result in longer mean times to repair in the event of a failed OS disk or data corruption on the OS disk. The recommendation might instruct the user to implement regular testing of backups to insure backup integrity.

Figure 12:
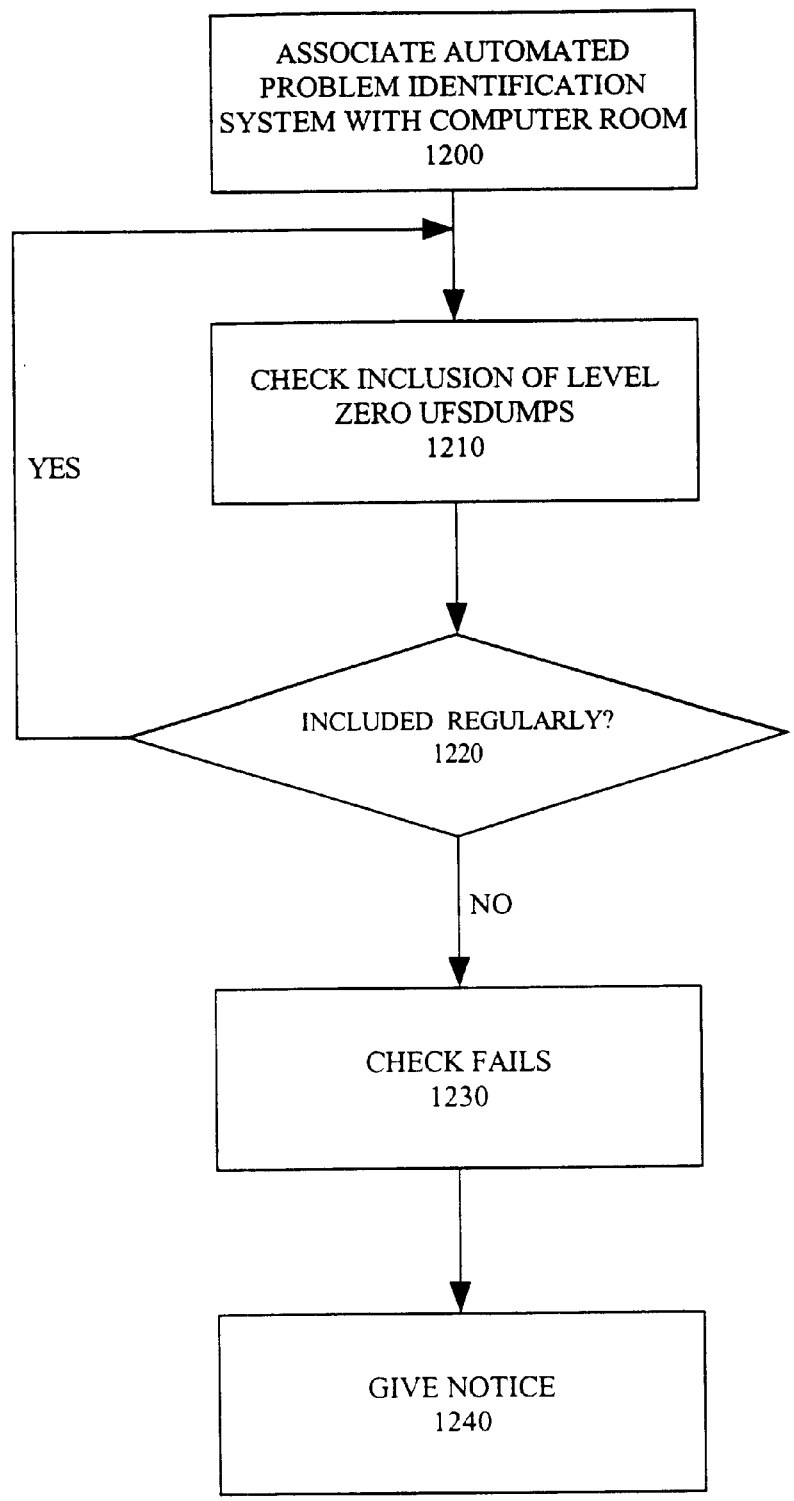
FIG. 12 shows a medium risk of service interruption check according to another embodiment of the present invention.

FIG. 12 shows a backup and disaster recovery check according to an embodiment of the present invention. At operation 1200, an automated problem identification system is associated with a computer room. At operation 1210, the inclusion of regular level zero ufsdumps is checked. At operation 1220, it is determined if they occur regularly. If they do, the process repeats at step 1210. Otherwise, the check fails at operation 1230 and some form of notice is given at operation 1240.

Another example of a backup and disaster recovery check that might result in a medium risk of service interruption or data loss is when backups are not tested at a regular interval. The analysis might state that no procedure is defined for regularly testing backups. System conditions change over time, and backups may become unusable due to a system event after the initial installation of the system and backup software. The recommendation might instruct the user to implement regular testing of backups to ensure backup integrity.

Figure 13:
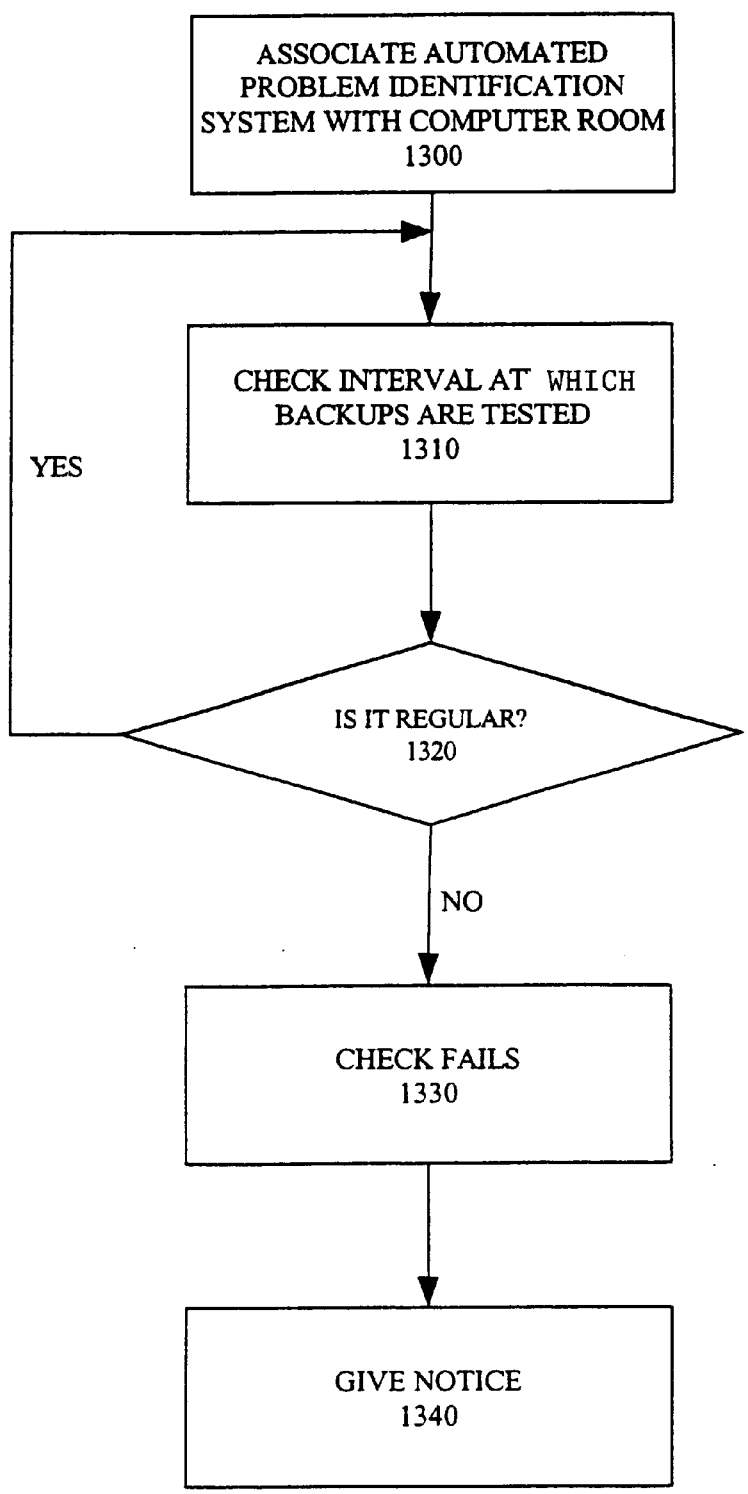
FIG. 13 shows a medium risk of service interruption check according to another embodiment of the present invention.

FIG. 13 shows a backup and disaster recovery check according to an embodiment of the present invention. At operation 1300, an automated problem identification system is associated with a computer room. At operation 1310, the interval by which backups are tested is checked. At operation 1320, it is determined if they are regular enough. If they are, the process repeats at step 1310. Otherwise, the check fails at operation 1330 and some form of notice is given at operation 1340.

Another example of a backup and disaster recovery check that might result in a medium risk of service interruption or data loss is when recovery times for the OS and data sets are not documented. The analysis might state that the recovery times for operating systems and/or data sets are unknown or undocumented. In the event of a system failure requiring a restoration from backups, realistic recovery times will be unknown. The recommendation might instruct the user to test recovery times for restoring the OS and data sets to ensure accurate estimates of availability impact in the event of an unplanned system failure.

Figure 14:
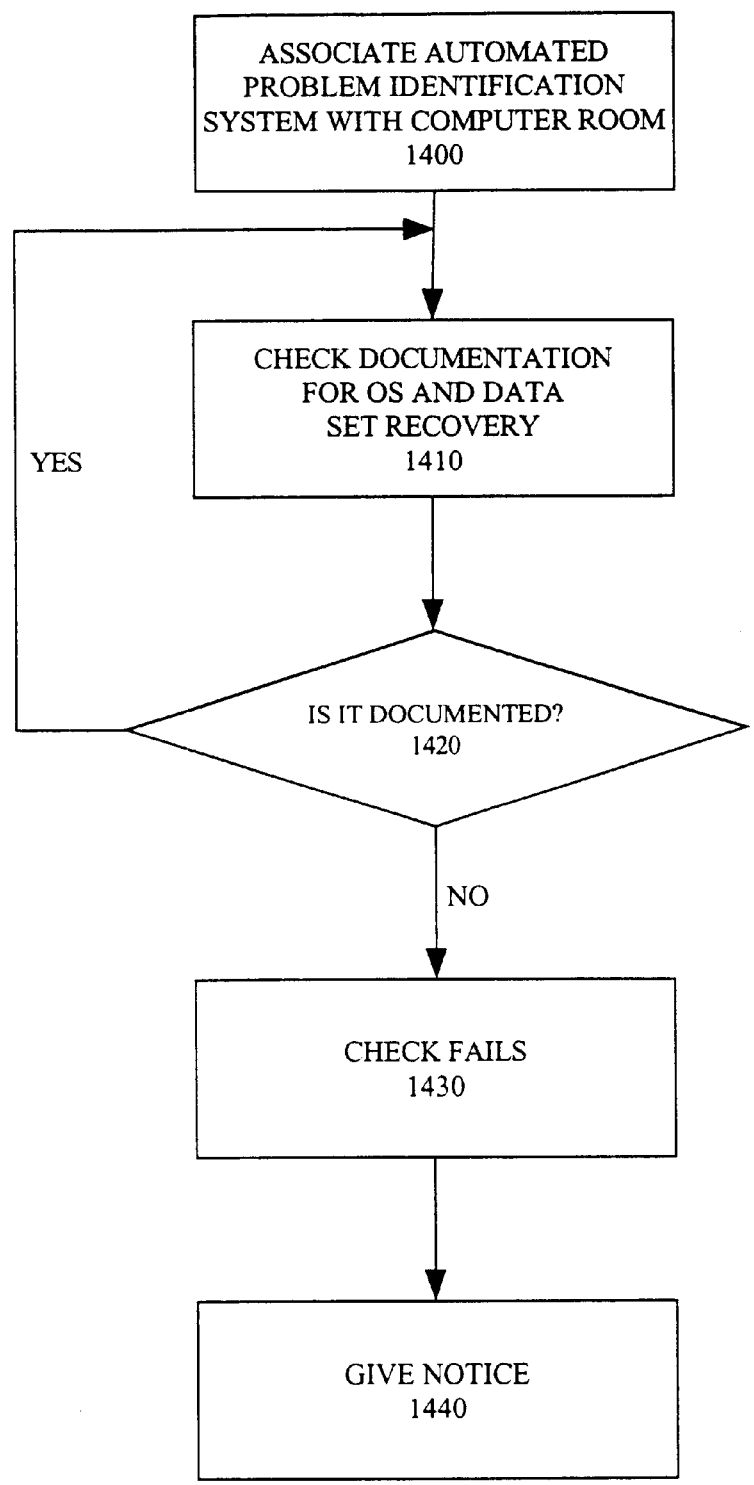
FIG. 14 shows a medium risk of service interruption check according to another embodiment of the present invention.

FIG. 14 shows a backup and disaster recovery check according to an embodiment of the present invention. At operation 1400, an automated problem identification system is associated with a computer room. At operation 1410, the documentation for OS and data set recovery is checked. At operation 1420, it is determined if it is documented. If it is, the process repeats at step 1410. Otherwise, the check fails at operation 1430 and some form of notice is given at operation 1440.

An example of a hardware check that might result in a medium risk of service interruption or data loss is when the cables are not cleanly routed. The analysis might state that the cables are not cleanly routed within the system cabinet or below the raised floor. Poorly routed cables can cause an impact on system serviceability be decreasing the accessibility of the system. Poor cable routing can also lead to cable damage due to knotting and twisting, and can interfere with new cable additions or removal of obsolete cabling. The recommendation might tell the user to re-route the cabling within the system and under the raised floor in a clean and orderly fashion.

Figure 35:
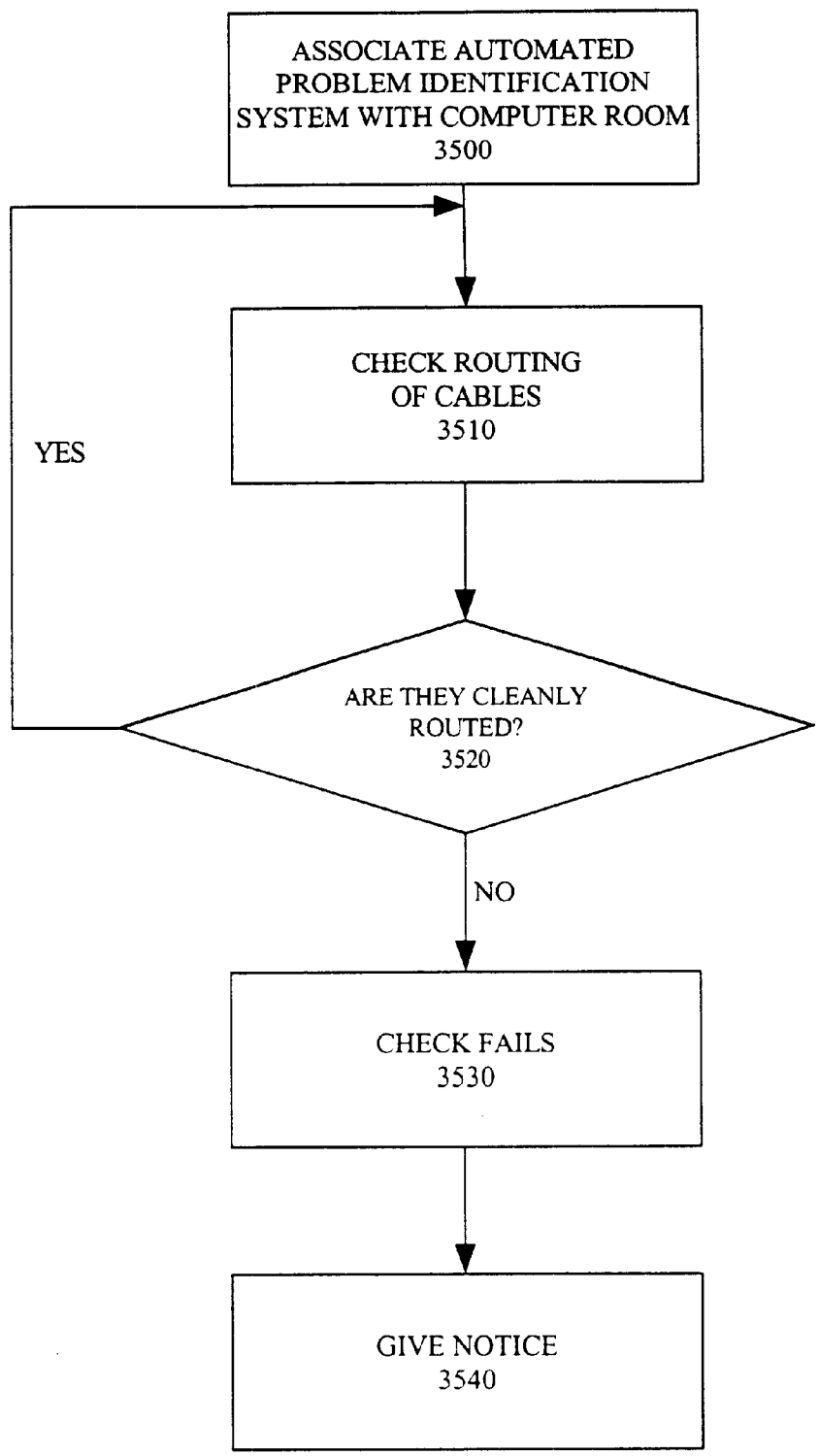
FIG. 35 shows a medium risk of service interruption check according to another embodiment of the present invention.

FIG. 35 shows a hardware check according to an embodiment of the present invention. At operation 3500, an automated problem identification system is associated with a computer room. At operation 3510, the routing of the cables is checked. At operation 3520, it is determined if they are cleanly routed. If so, the process repeats at step 3510. Otherwise, the check fails at operation 3530 and some form of notice is given at operation 3540.

Another example of a hardware check that might result in a medium risk of service interruption or data loss is when the system console is not clearly labeled. The analysis might state that the system console is not clearly labeled. This increases the risk of operator error through accidental action on the wrong system console. In this instance, operator error may lead to service interruption, or, potentially, data loss on the system. The recommendation might instruct the user to clearly label the system console.

Figure 36:
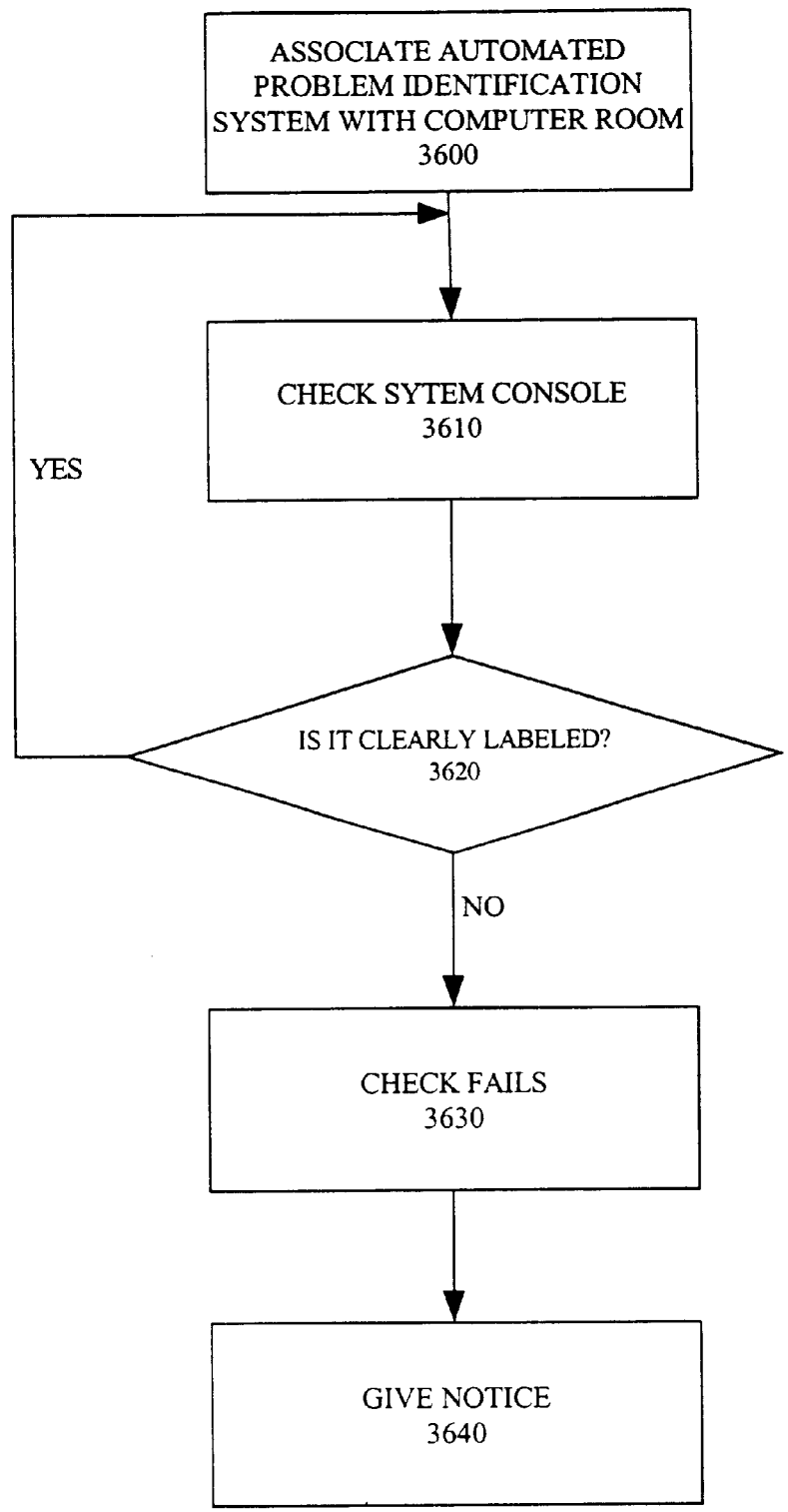
FIG. 36 shows a medium risk of service interruption check according to another embodiment of the present invention.

FIG. 36 shows a hardware check according to an embodiment of the present invention. At operation 3600, an automated problem identification system is associated with a computer room. At operation 3610, the system console is checked. At operation 3620, it is determined if it is clearly labeled. If it is, the process repeats at step 3610. Otherwise, the check fails at operation 3630 and some form of notice is given at operation 3640.

Another example of a hardware check that might result in a medium risk of service interruption or data loss is when a fast Ethernet NIC is operating at half duplex. The analysis might state that fast Ethernet NIC(s) are operating in a less than optimal mode. The recommendation might instruct the user to connect the fast Ethernet NIC to a 100 Mbps switched port or determine if you have to use a utility useful for setting fast Ethernet driver parameters, such as the ndd utility, to force the full duplex setting.

Figure 37:
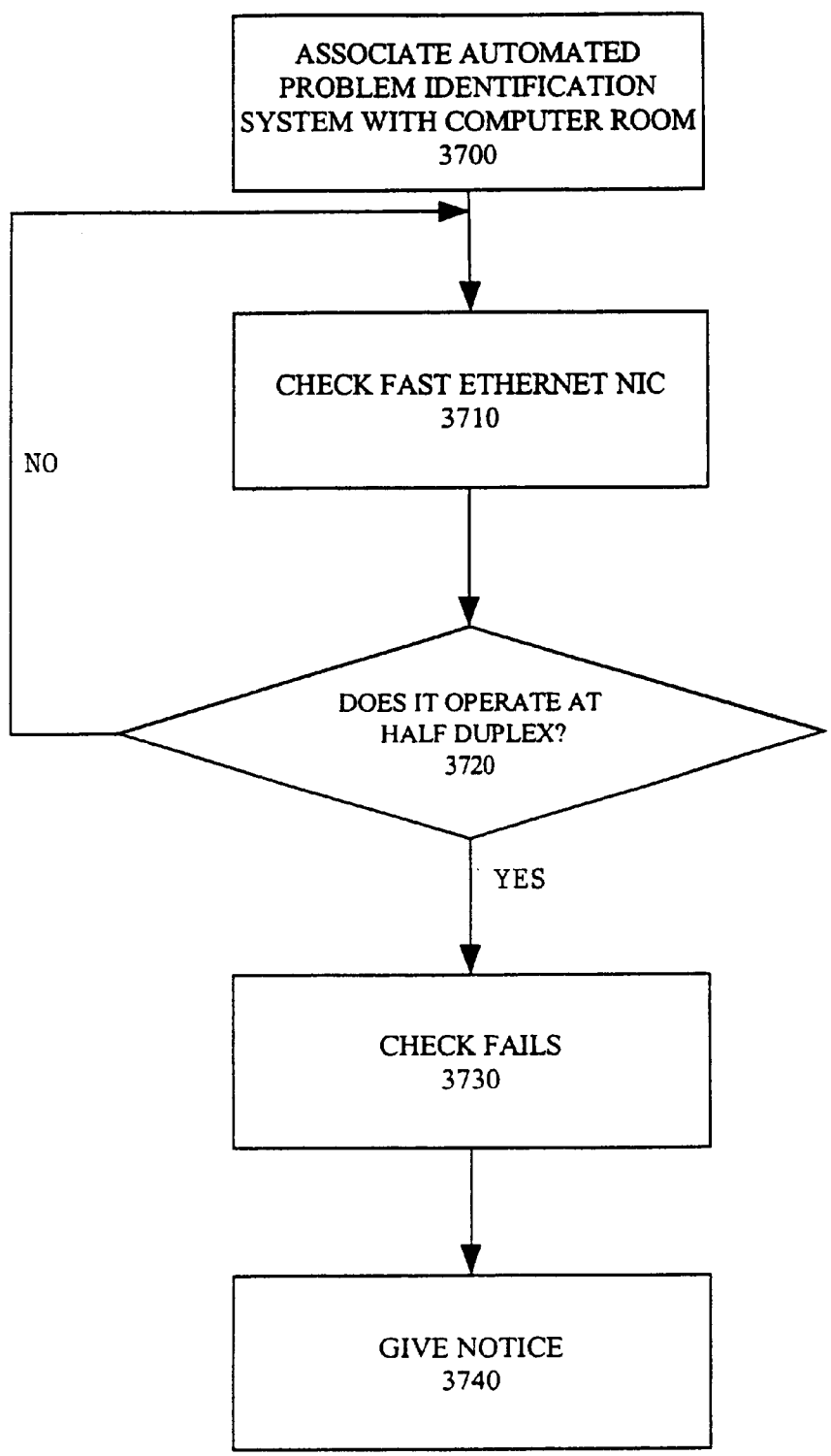
FIG. 37 shows a medium risk of service interruption check according to another embodiment of the present invention.

FIG. 37 shows a hardware check according to an embodiment of the present invention. At operation 3700, an automated problem identification system is associated with a computer room. At operation 3710, the fast Ethernet NIC is checked. At operation 3720, it is determined if it is operating at half duplex. If it is not, the process repeats at step 3710. Otherwise, the check fails at operation 3730 and some form of notice is given at operation 3740.

An example of a hardware check that might result in a medium risk of service interruption or data loss is when there are excessive input or output errors on NIC. The analysis might state that there are excessive input or output errors on NIC. The recommendation might instruct the user to check the network connections for electrical problems or bad cabling. Also check for a faulty NIC.

Figure 38:
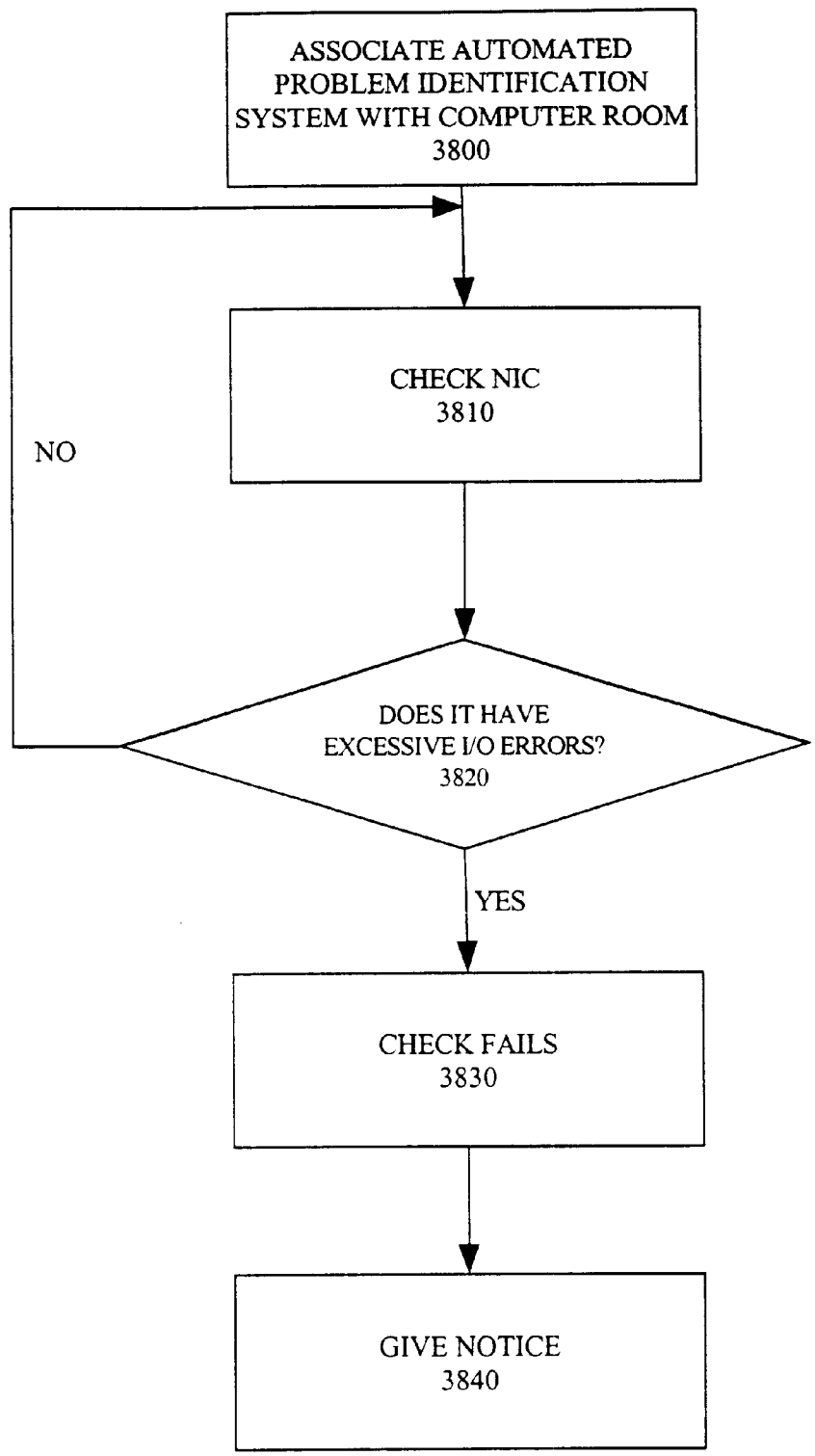
FIG. 38 shows a medium risk of service interruption check according to another embodiment of the present invention.

FIG. 38 shows a backup and disaster recovery check according to an embodiment of the present invention. At operation 3800, an automated problem identification system is associated with a computer room. At operation 3810, the NIC is checked. At operation 3820, it is determined if there are excessive I/O errors on the NIC. If not, the process repeats at step 3810. Otherwise, the check fails at operation 3830 and some form of notice is given at operation 3840.

An example of an operating system check that might result in a medium risk of service interruption or data loss is when the printing of kernel routine names is not enabled if a watchdog reset occurs. The analysis might state that kernel routine names can be printed after a watchdog reboot if the obpsym module (i.e., a Solaris™ kernel module that used for debugging firmware) is loaded which can facilitate debugging the cause of the watchdog reset. However, the setting nopanicdebug=1 must also be added to /etc/system so that the system will automatically reboot. The recommendation might tell the user to add "forceload:misc/obpsym" and "set nopanicdebug=1" to /etc/system. To load the module on a running system use the command "modload/platform/sun4u/kernel/misc/obpsym".

Figure 39:
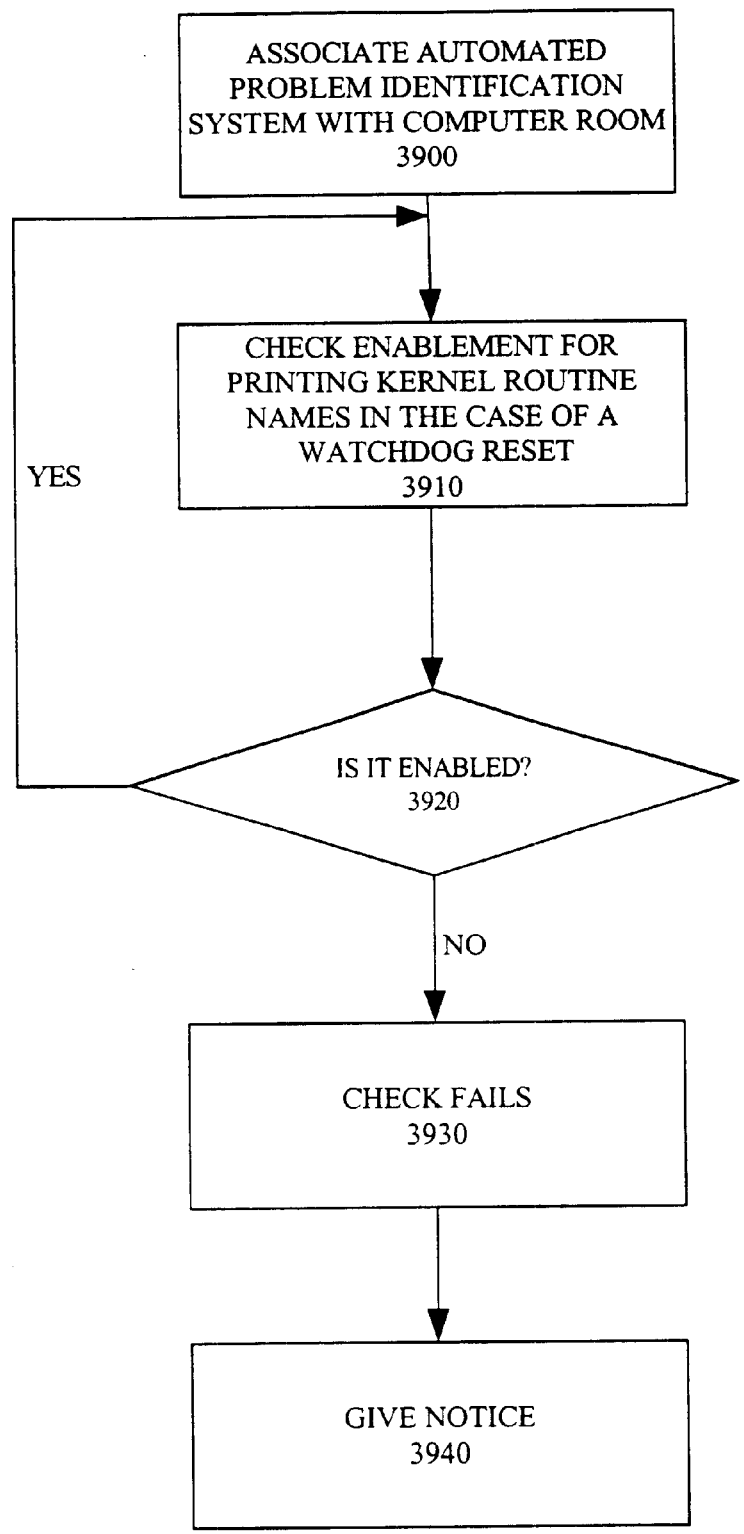
FIG. 39 shows a medium risk of service interruption check according to another embodiment of the present invention.

FIG. 39 shows an operating system check according to an embodiment of the present invention. At operation 3900, an automated problem identification system is associated with a computer room At operation 3910, the enablement for the printing of kernel routine names in the case of a watchdog reset is checked. At operation 3920, it is determined if it is enabled. If it is, the process repeats at step 3910. Otherwise, the check fails at operation 3930 and some form of notice is given at operation 3940.

Another example of an operating system check that might result in a medium risk of service interruption or data loss is when there is no Y2K OS patch. The analysis might state that the OS Y2K patches do not meet the minimum required revision(s). The recommendation might state that the recommended versions in this header are the minimum necessary versions, except for the patches recommended in some other headers.

Figure 40:
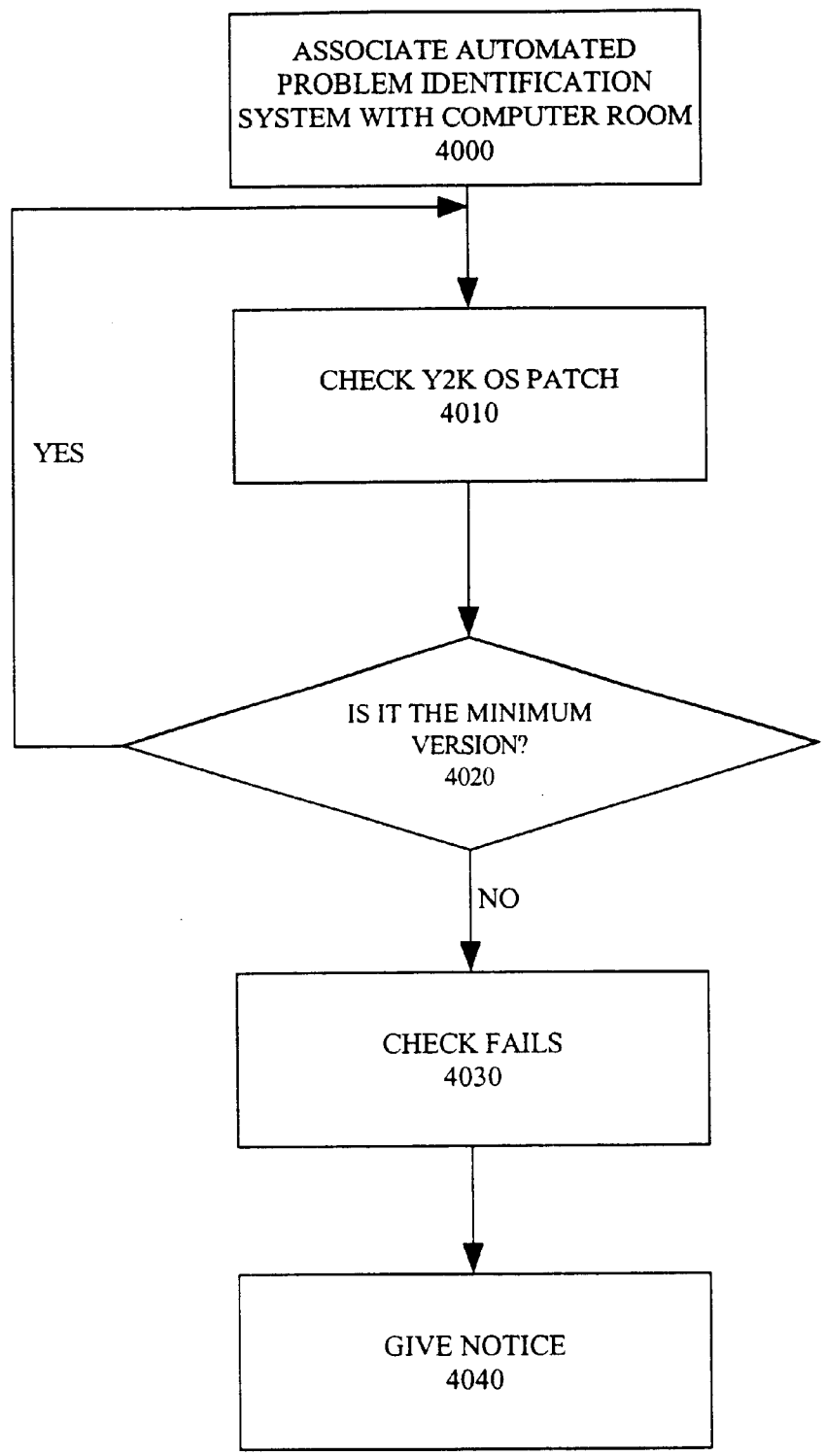
FIG. 40 shows a medium risk of service interruption check according to another embodiment of the present invention.

FIG. 40 shows an operating system check according to an embodiment of the present invention. At operation 4000, an automated problem identification system is associated with a computer room. At operation 4010, the Y2K OS patch is checked. At operation 4020, it is determined if it is the minimum version. If it is, the process repeats at step 4010. Otherwise, the check fails at operation 4030 and some form of notice is given at operation 4040.

An example of a storage check that might result in a medium risk of service interruption or data loss is when Vixel GBICs in use on A5X00 disk arrays are earlier than revision-03. The analysis might state that the A5X000 disk array contains Vixel revision-02 GBICs. These GBICs may degrade over time resulting in numerous error messages of the following types: "CRC Error", "scsi parityerror", 'OFFLINE', 'timeout', 'Offline timeout'. The recommendation might tell the user to schedule to replace all revision-02 GBICs (part number 370-2303-02) with revision-03 Vixel GBICs (part number 370-2303-03) or IBM GBICs (part number 370-2303-03 or 370-3975-01).

Figure 41:
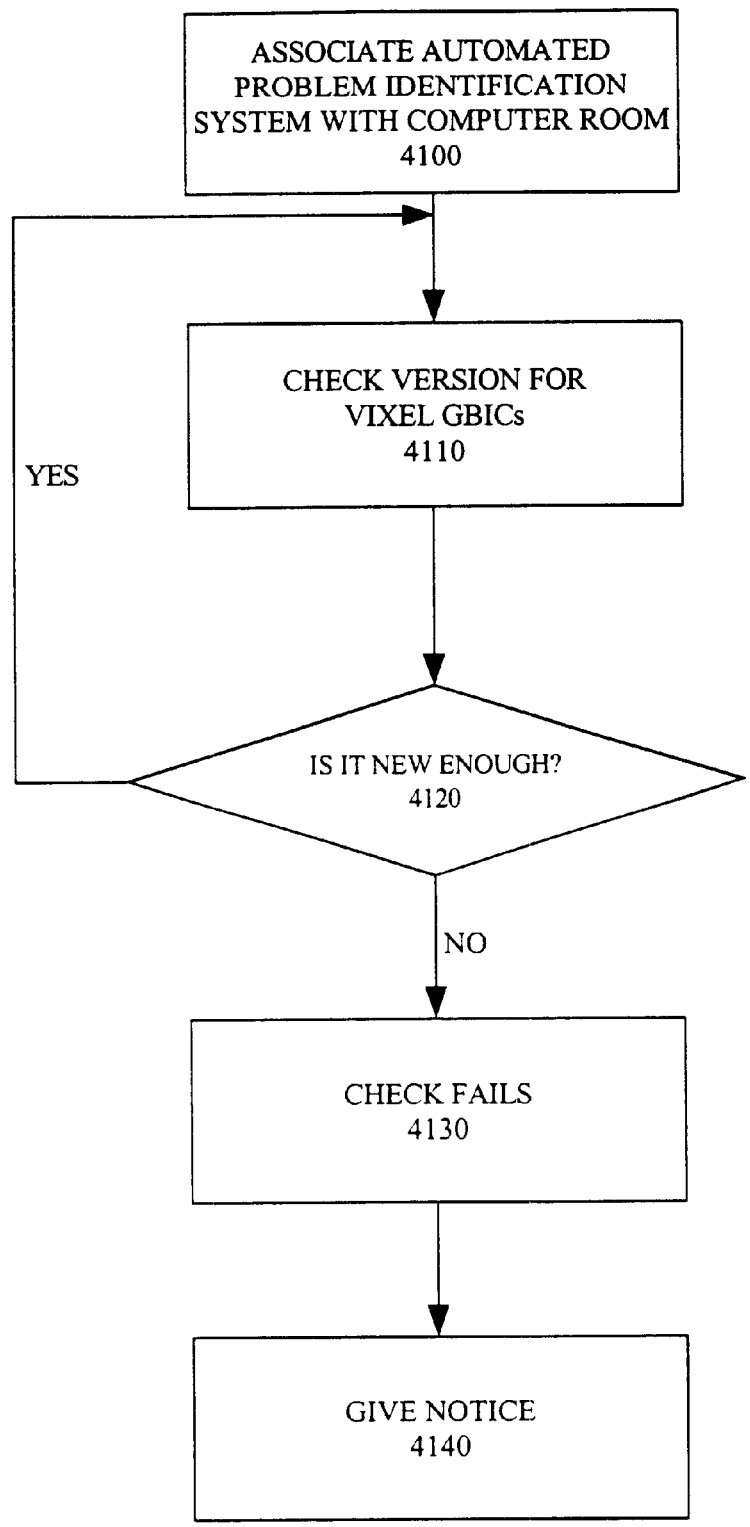
FIG. 41 shows a medium risk of service interruption check according to another embodiment of the present invention.

FIG. 41 shows a storage check according to an embodiment of the present invention. At operation 4100, an automated problem identification system is associated with a computer room. At operation 4110, the version for the Vixel GBICs is checked. At operation 4120, it is determined if they are new enough. If they are, the process repeats at step 4110. Otherwise, the check fails at operation 4130 and some form of notice is given at operation 4140.

An example of a storage check that might result in a medium risk of service interruption or data loss is when Vixel GBICs in use on disk arrays, such as on StorEdge™ A5X00 disk arrays available from Sun Microsystems, Inc., are earlier than revision -03. In the A5X00 example, the analysis might state that the disk array contains Vixel revision -02 GBICs. These GBICs may degrade over time resulting in numerous error messages of the following types: "CRC Error", "scsi parity error", 'OFFLINE', 'timeout', 'Offline timeout'. The recommendation might tell the user to schedule to replace all revision -02 GBICs (part number 370-2303-02) with revision -03 Vixel GBICs (part number 370-2303-03) or IBM GBICs (part number 370-2303-03 or 370-3975-01).

An example of a storage check that might result in a medium risk of service interruption or data loss is when Seagate ST19171FC 9 GB disks have FD7D firmware. The analysis might state that the ST19171FC drive(s) have firmware below 7Dxx. The recommendation might tell the user to schedule to upgrade ST19171FC disk firmware to the latest firmware level. Available in patch 106129. It might further state that the following disks need to be upgraded:

c4t0d0 at 6B78
c4t1d0 at 6B78
c4t2d0 at 6B78
c4t3d0 at 6B78
c4t4d0 at 6B78
c4t5d0 at 6B78
c4t6d0 at 6B78
c4t16d0 at 6b78
c4t17d0 at 6b78
c4t18d0 at 6b78
c4t19d0 at 6b78
c4t20d0 at 6b78
c4t21d0 at 6b78
c4t22d0 at 6b78
c4t32d0 at 6b78
c4t33d0 at 6b78
c4t34d0 at 6b78
c4t35d0 at 6b7E
c4t36d0 at 6b78
c4t37d0 at 6b78
c4t38d0 at 6b78
c4t48d0 at 6b7E
c4t49d0 at 6b78
c4t50d0 at 6b78
c4t51d0 at 6b7E
c4t52d0 at 6b78
c4t53d0 at 6b78
c4t54d0 at 6b7E
c6t0d0 at 147E
c6t3d0 at 147E

Figure 42:
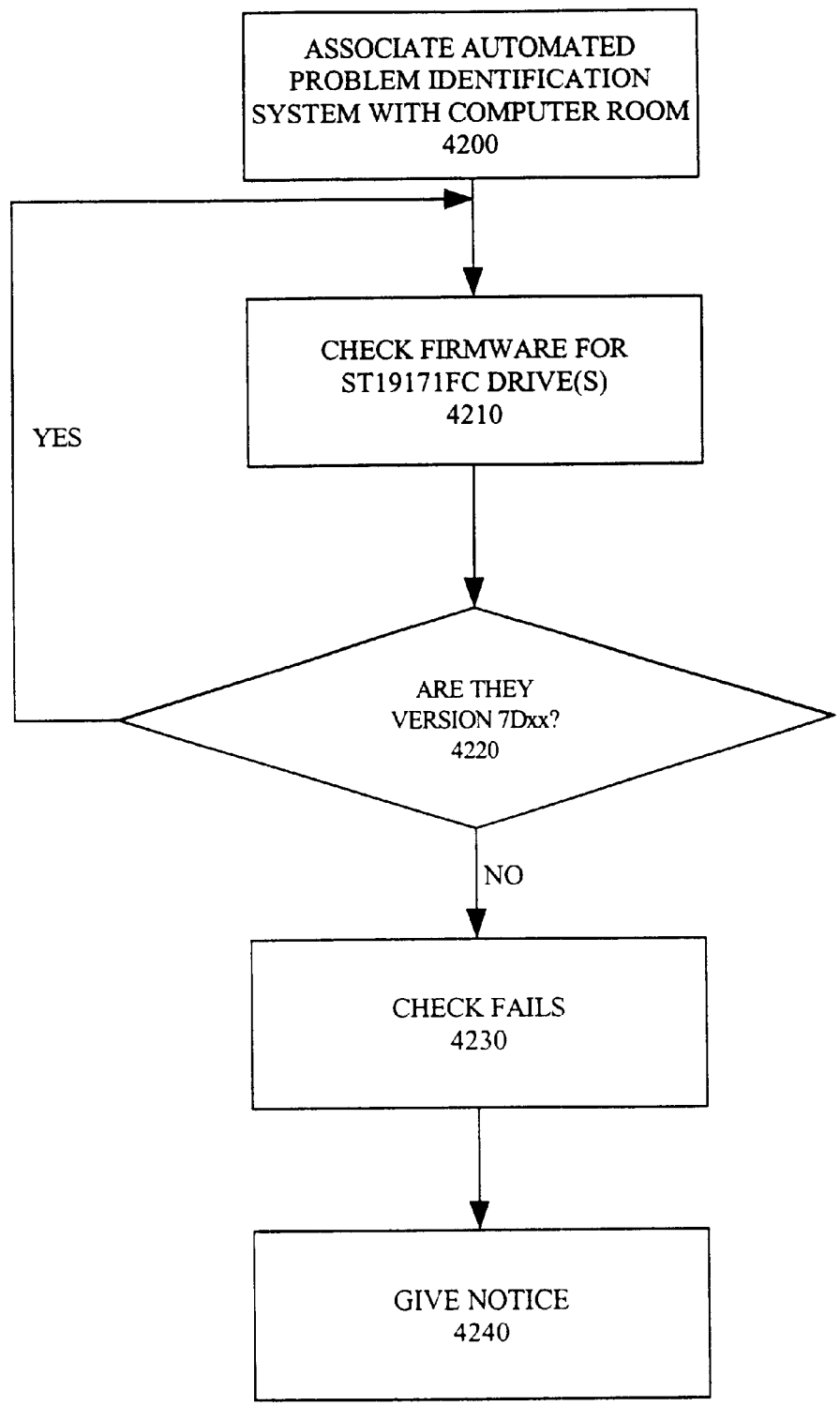
FIG. 42 shows a medium risk of service interruption check according to another embodiment of the present invention.

FIG. 42 shows a storage check according to an embodiment of the present invention. At operation 4200, an automated problem identification system is associated with a computer room. At operation 4210, the firmware for the ST19171FC drive(s) is checked. At operation 4220, it is determined if they are version 7Dxx. If they are, the process repeats at step 4210. Otherwise, the check fails at operation 4230 and some form of notice is given at operation 4240.

Another example of a storage check that might result in a medium risk of service interruption or data loss is when an ST3102LC drive has outdated firmware. The analysis might state that the ST3102LC drive firmware is down reviewed. The recommendation might tell the user to review firmware update requirements for the ST3102LC drives. Update the firmware at the next maintenance window or if problems arise. Verify that full backups have been performed before any and all firmware updates.

Figure 43:
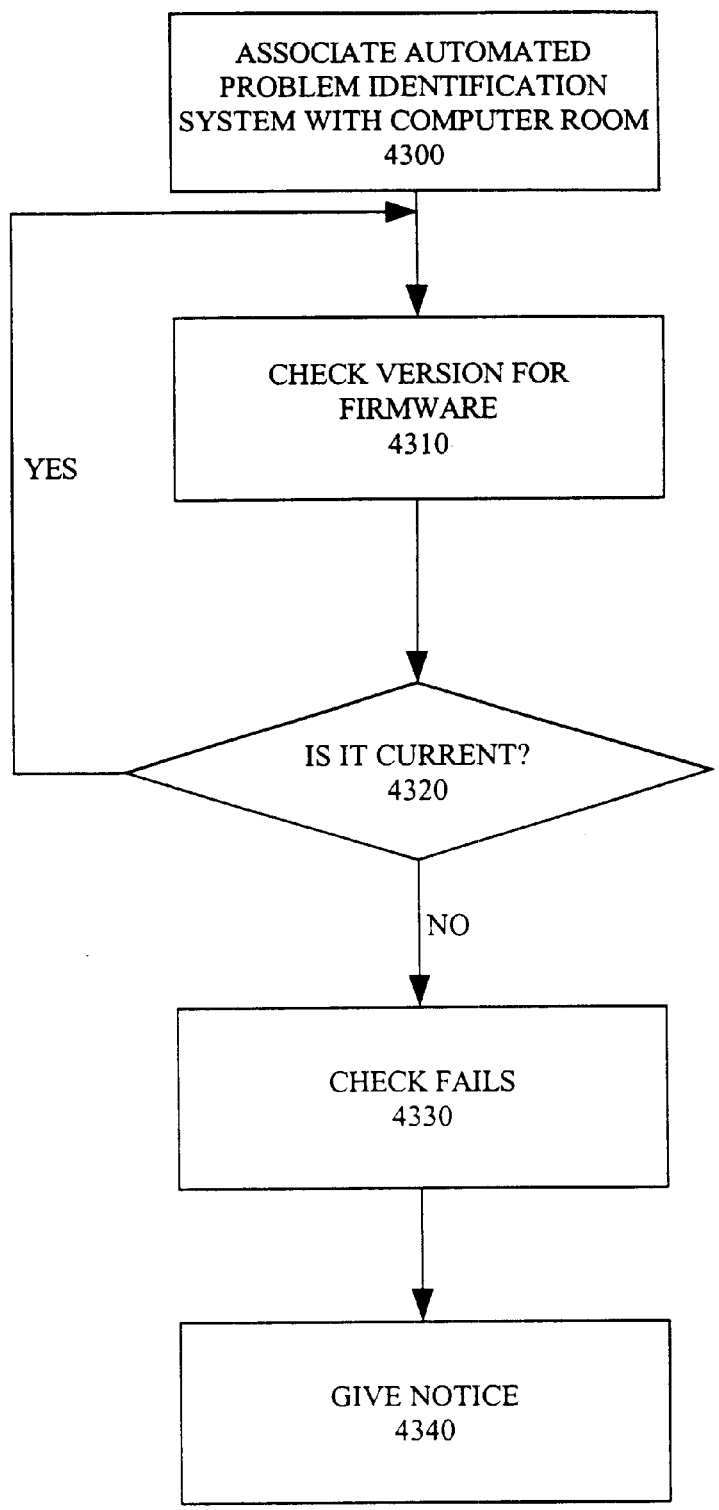
FIG. 43 shows a medium risk of service interruption check according to another embodiment of the present invention.

FIG. 43 shows a storage check according to an embodiment of the present invention. At operation 4300, an automated problem identification system is associated with a computer room. At operation 4310, the version for the firmware is checked. At operation 4320, it is determined if it is current. If it is, the process repeats at step 4310. Otherwise, the check fails at operation 4330 and some form of notice is given at operation 4340.

Another example of a storage check that might result in a medium risk of service interruption or data loss is when an ST39102LC drive has outdated firmware. The analysis might state that the ST39102LC drive firmware level is down reviewed from the recommended revision level of 6329. The recommendation might tell the user to install drive firmware patch 108105-02 during the next maintenance window or if problem arises.

Before upgrading firmware: 1) Backup by ALL filesystems, 2) Stop ALL Applications {The system must be idle during the firmware upgrade process}, 3) Unmount all file systems on the drives to be upgrade. Disks with mounted file system are not eligible for upgrade, 4) Unconfigure devices from volume manager, 5) Reboot the system if you unconfigured any disks from volume manager (e.g. Veritas). Otherwise you will not be able to upgrade any previously configured disks, 6) Upgrade the disks. Follow the given instructions in the patch README for specifics on the firmware download. Additional patches required with this patch are: Solaris 2.5.1 103640-32 or higher 2.6 105568-16 or higher 105580-08 or higher (for Ultra-30/60) 7 106980-10 or higher.

Figure 44:
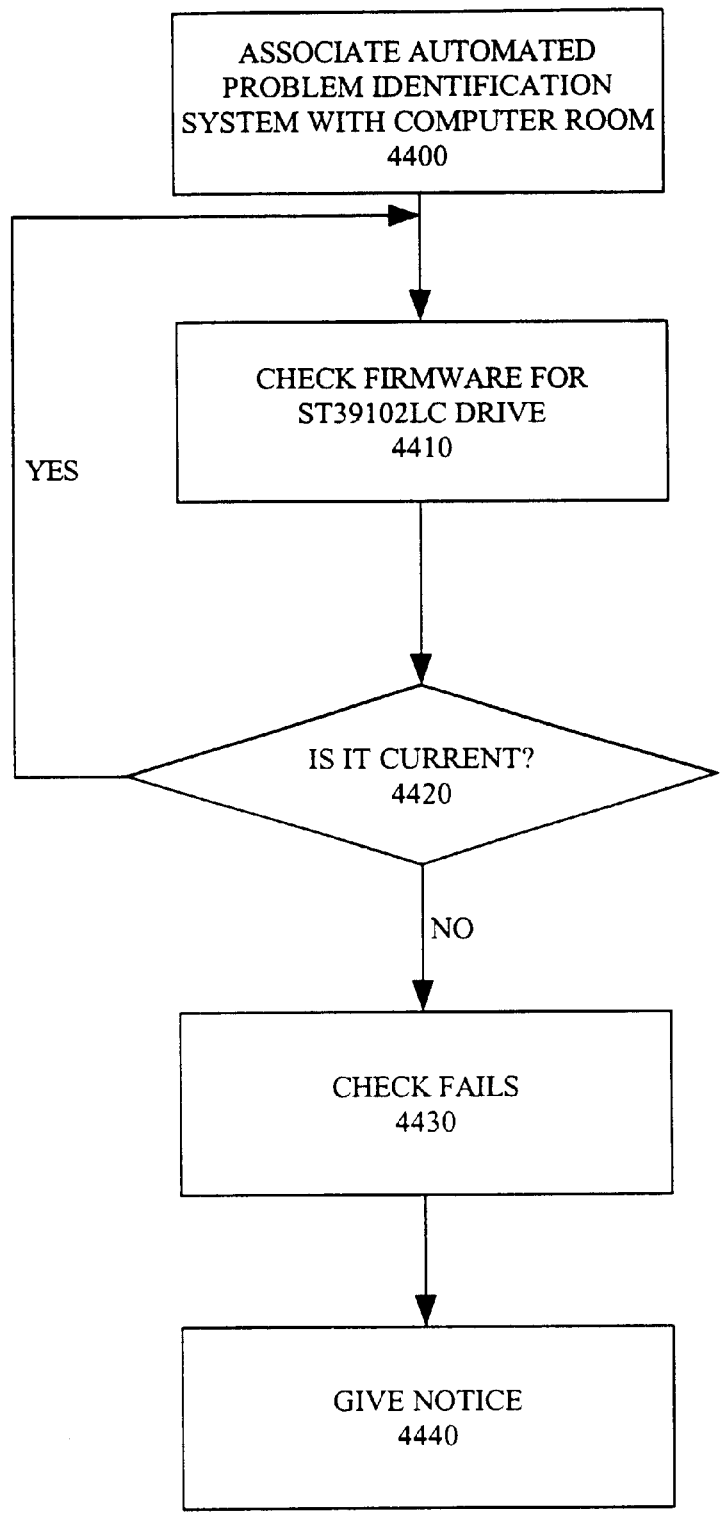
FIG. 44 shows a medium risk of service interruption check according to another embodiment of the present invention.

FIG. 44 shows a storage check according to an embodiment of the present invention. At operation 4400, an automated problem identification system is associated with a computer room. At operation 4410, the firmware for the ST39102LC drive is checked. At operation 4420, it is determined if it is current. If it is, the process repeats at step 4410. Otherwise, the check fails at operation 4430 and some form of notice is given at operation 4440.

An example of an operational check that might result in a medium risk of service interruption or data loss is when the cables are not clearly labeled. The analysis might state that the cables attached to the system are not clearly labeled. This increases the risk of the wrong cable inadvertently being disconnected at the worst possible time. It also increased the risk of the system being inadvertently mis-cabled during system service. The recommendation might tell the user to clearly label both ends of any cables that are attached to the system. Ensure that each label clearly defines the system to which the cable attaches, as well as the proper port/interface on that system. Ensure that cables are relabeled during system reconfiguration to properly identify any cable configuration changes.

Figure 45:
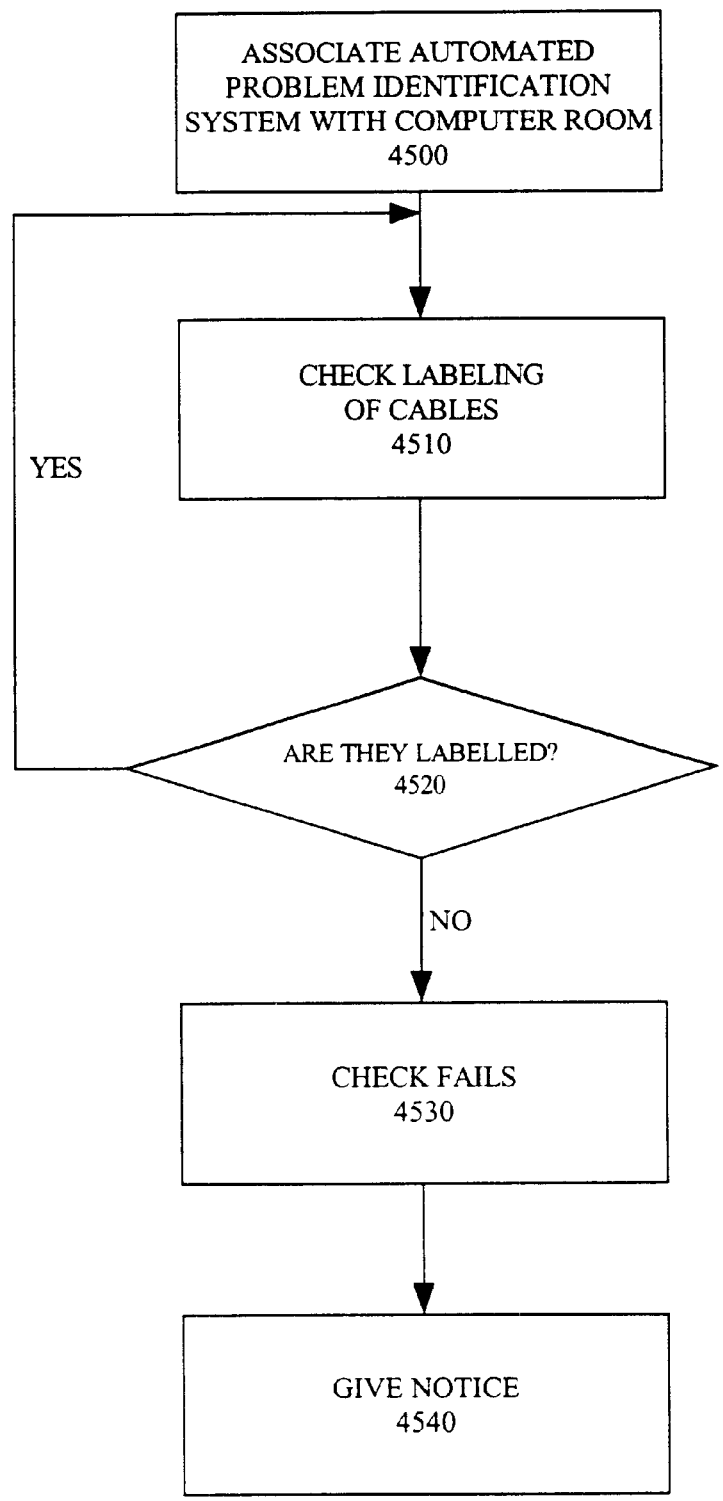
FIG. 45 shows a medium risk of service interruption check according to another embodiment of the present invention.

FIG. 45 shows an operational check according to an embodiment of the present invention. At operation 4500, an automated problem identification system is associated with a computer room. At operation 4510, the labeling of the cables is checked. At operation 4520, it is determined if they are labeled. If they are, the process repeats at step 4510. Otherwise, the check fails at operation 4530 and some form of notice is given at operation 4540.

Another example of an operational check that might result in a medium risk of service interruption or data loss is when the service log book does not exist or is not current The analysis might state that the system does not have a service log book or it is not being maintained. The service log book stores the service history for a system. This service history can provide data for trend analysis and service frequency, and is important for ongoing system health monitoring. It may also be used as a data point during complicated troubleshooting scenarios. The recommendation might tell the user to create a service log book for the system, and ensure that it is kept current.

Figure 46:
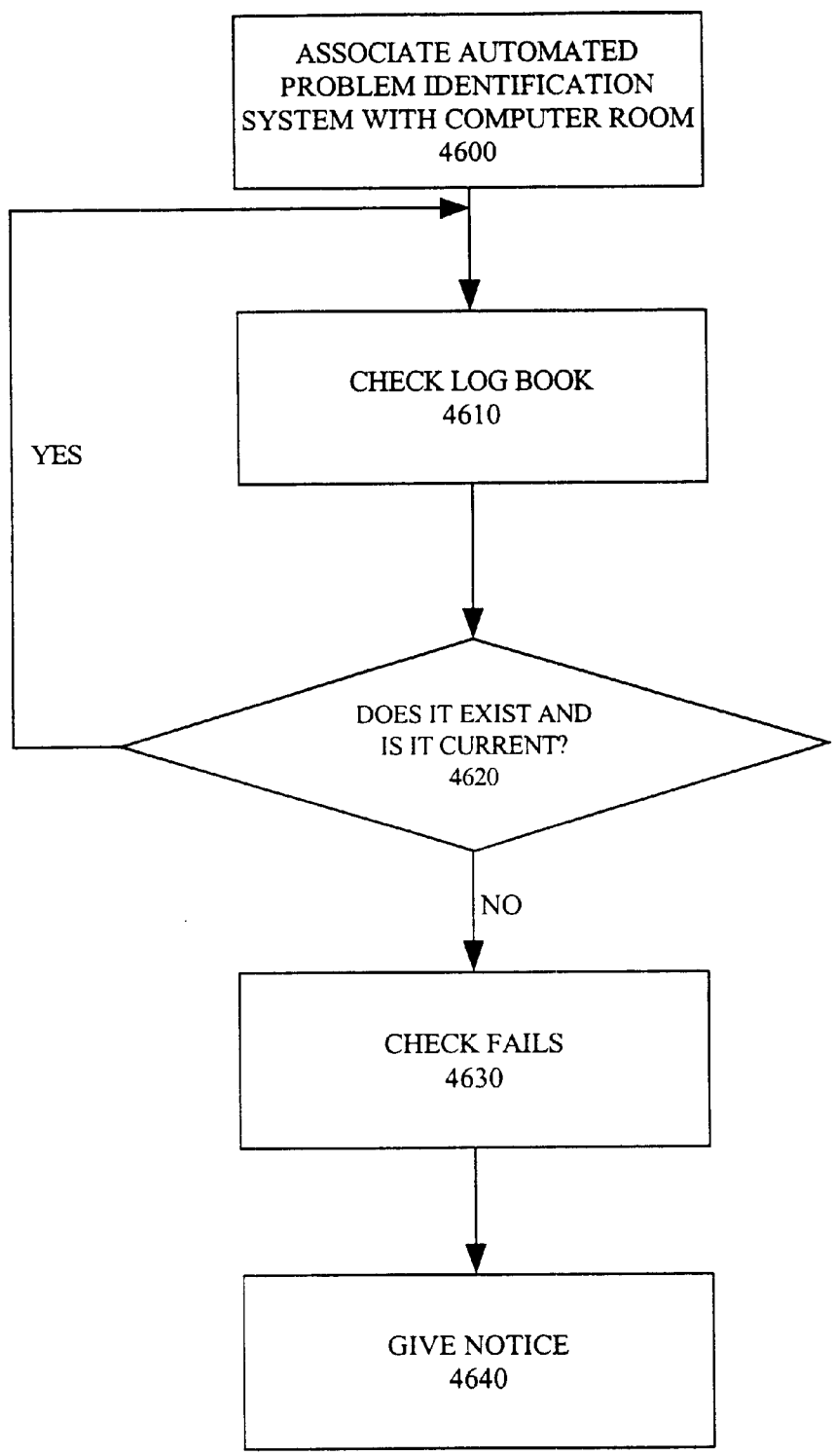
FIG. 46 shows a medium risk of service interruption check according to another embodiment of the present invention.

FIG. 46 shows an operational check according to an embodiment of the present invention. At operation 4600, an automated problem identification system is associated with a computer room. At operation 4610, the log book is checked. At operation 4620, it is determined if it exists and is current. If it is, the process repeats at step 4610. Otherwise, the check fails at operation 4630 and some form of notice is given at operation 4640.

Another example of an operational check that might result in a medium risk of service interruption or data loss is when the operating system recovery process has not been tested. The analysis might state that the process for recovering the system's Operating System from backup has never been successfully tested and verified. Until this process is tested and verified, it cannot be trusted in a crisis situation. If the process fails during an OS recovery in a critical situation, extended downtime is likely to occur. The recommendation might tell the user to test the OS recovery process, verifying that each step is complete and correct. This is especially necessary when the OS disks(s) are protected with Volume Manager or Disk Suite, as these products can complicate restoration process.

Figure 47:
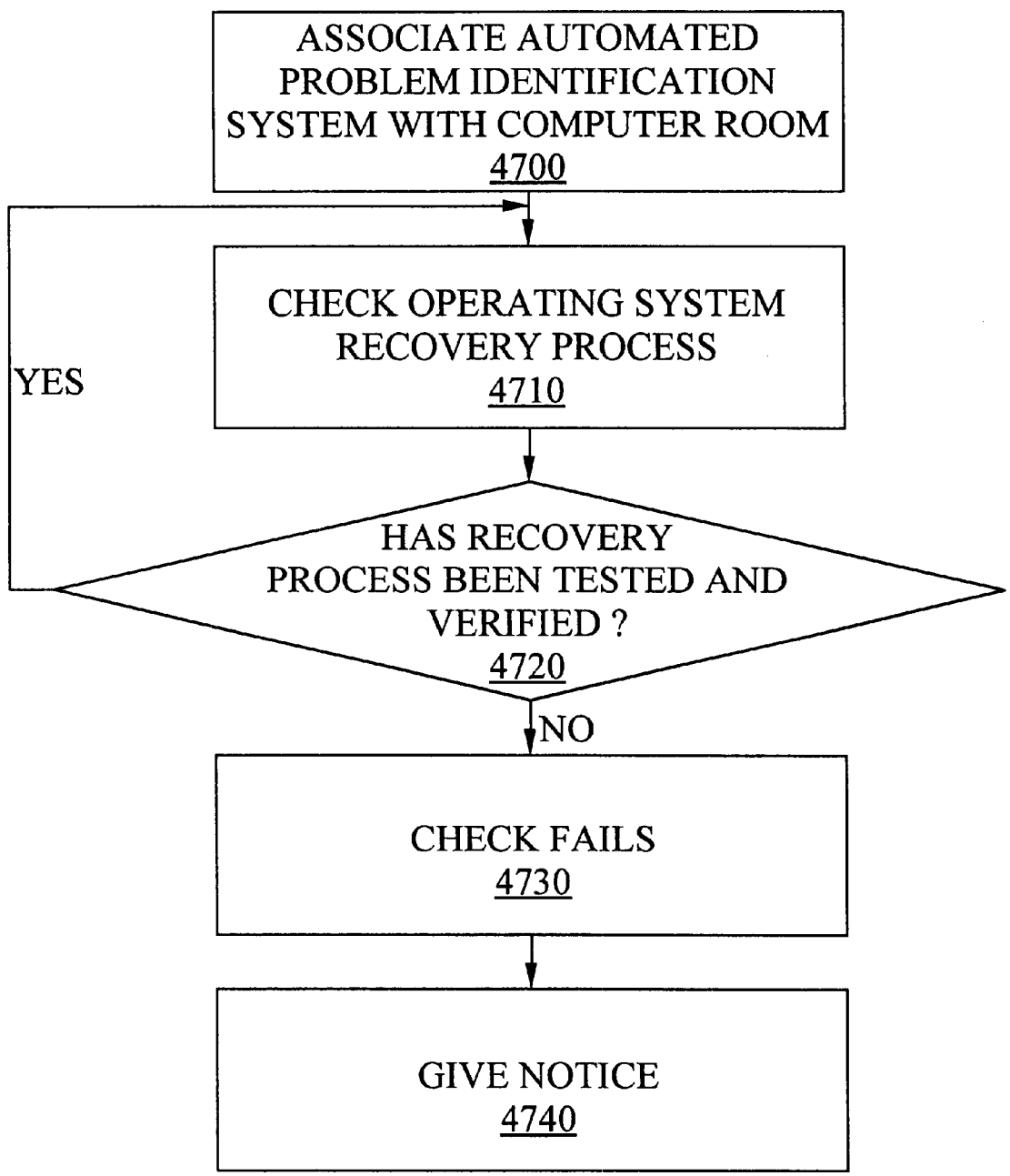
FIG. 47 shows a medium risk of service interruption check according to another embodiment of the present invention.

FIG. 47 shows an operational check according to an embodiment of the present invention. At operation 4700, an automated problem identification system is associated with a computer room. At operation 4710, the operating system recovery process is checked. At operation 4720, it is determined if it has been tested and verified. If it has, the process repeats at step 4710. Otherwise, the check fails at operation 4730 and some form of notice is given at operation 4740.

Another example of an operational check that might result in a medium risk of service interruption or data loss is when the OS mirror failure recovery process is not documented. The analysis might state that the process for recovering from a failed operating system disk mirror is not documented. Lack of a documented process may result in an OS disk mirror being recovered improperly, resulting in a system that does not have a protected OS disk, or possibly a system that will not be able to boot. The recommendation might tell the user to document and test the process for recovering from an OS mirror failure.

Figure 48:
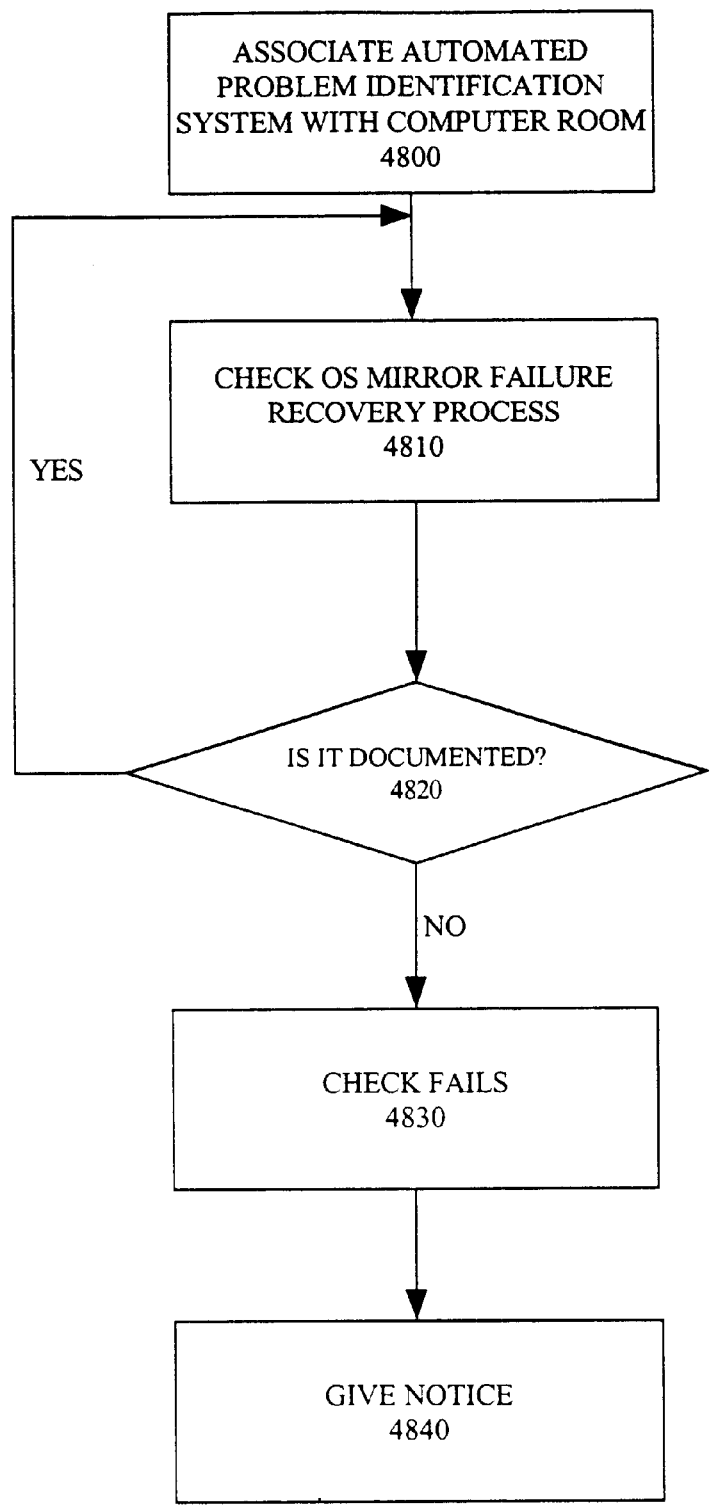
FIG. 48 shows a medium risk of service interruption check according to another embodiment of the present invention.

FIG. 48 shows an operational check according to an embodiment of the present invention. At operation 4800, an automated problem identification system is associated with a computer room. At operation 4810, the OS mirror failure recovery process is checked. At operation 4820, it is determined if it has been documented. If it has, the process repeats at step 4810. Otherwise, the check fails at operation 4830 and some form of notice is given at operation 4840.

Another example of an operational check that might result in a medium risk of service interruption or data loss is when the OS disk mirror failure recovery process has not been tested. The analysis might state that the process for recovering from a failed operating system disk mirror has not been tested. An untested procedure cannot be trusted in a crisis situation. It may be incomplete or incorrect, and may result in extended downtime or data loss. The recommendation might tell the user to test the process for recovering from an OS disk mirror failure.

Figure 49:
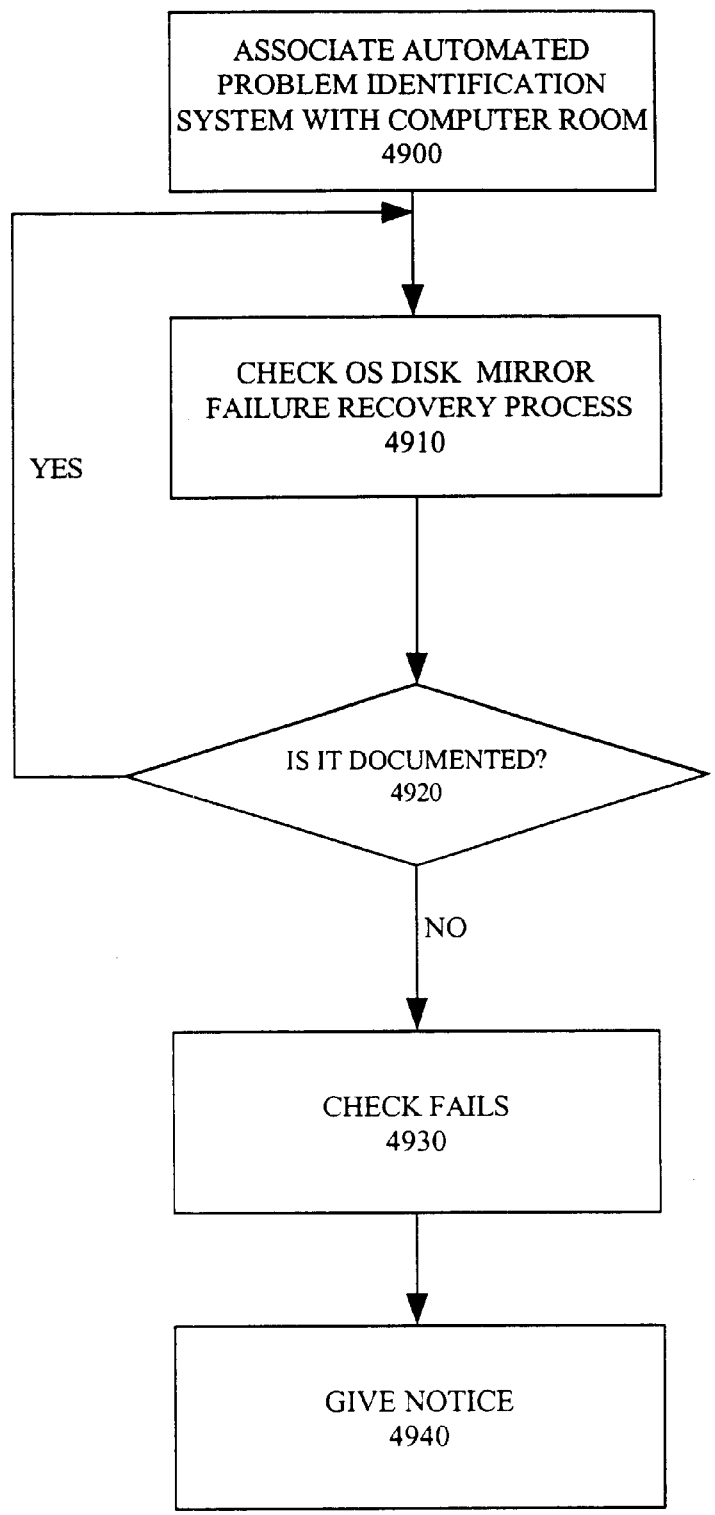
FIG. 49 shows a medium risk of service interruption check according to another embodiment of the present invention.

FIG. 49 shows an operational check according to an embodiment of the present invention. At operation 4900, an automated problem identification system is associated with a computer room. At operation 4910, the OS disk mirror failure recovery process is checked. At operation 4920, it is determined if it has been documented. If it has, the process repeats at step 4910. Otherwise, the check fails at operation 4930 and some form of notice is given at operation 4940.

Another example of an operational check that might result in a medium risk of service interruption or data loss is when the diag-device setting does not match the boot-device setting. The analysis might state that the diag-device value is different from the boot-device value. The diag-device is usually set to NET. Therefore the system tries to boot from the network. These are critical settings for "lights out" and remotely administered environments. The recommendation might tell the user to go the ok prompt and set the diag-device equal to the boot-device.

Figure 50:
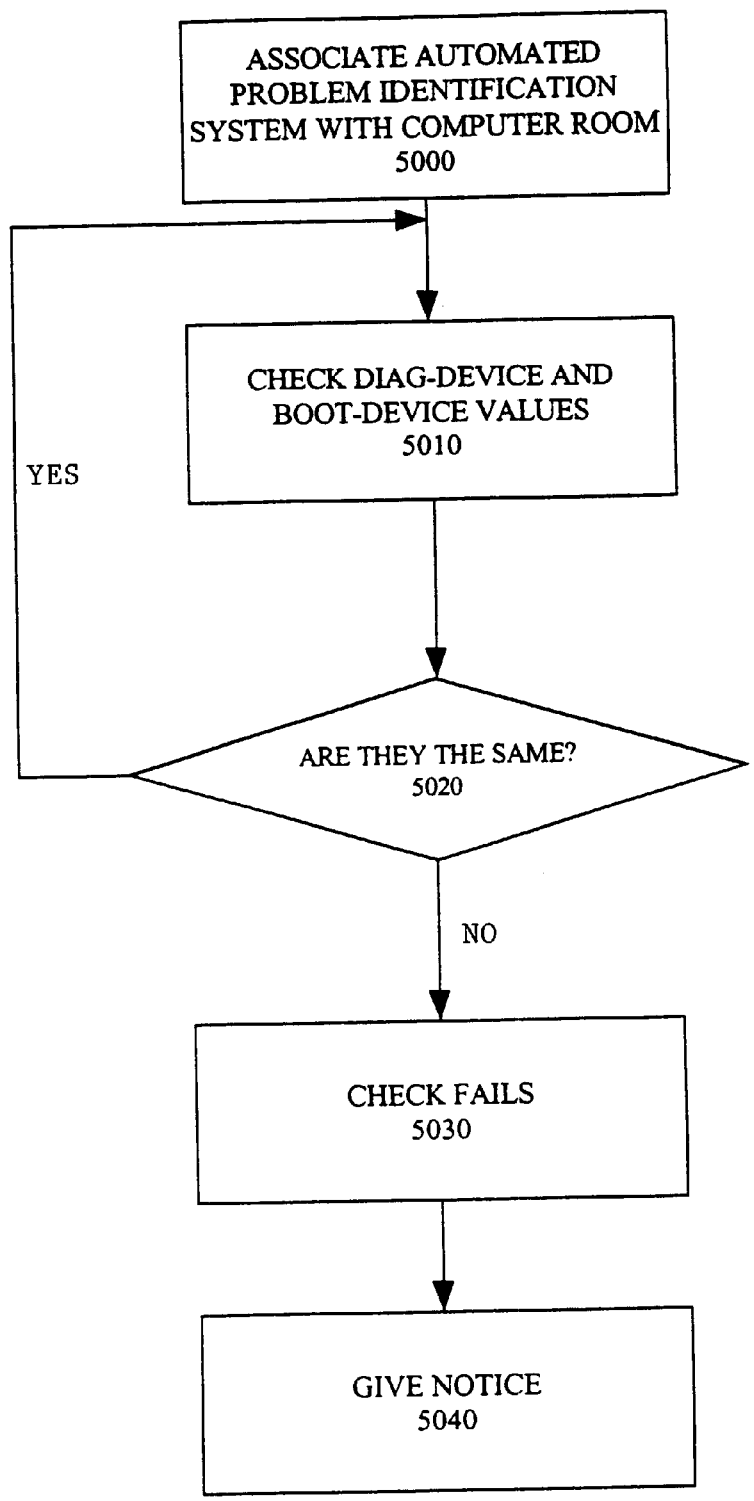
FIG. 50 shows a medium risk of service interruption check according to another embodiment of the present invention.

FIG. 50 shows an operational check according to an embodiment of the present invention. At operation 5000, an automated problem identification system is associated with a computer room. At operation 5010, the diag-device and boot-device values are checked. At operation 5020, it is determined if they are the same. If they are, the process repeats at step 5010. Otherwise, the check fails at operation 5030 and some form of notice is given at operation 5040.

Another example of an operational check that might result in a medium risk of service interruption or data loss is in the FCO tool analysis. The analysis might state that one or more FIN/FCOs (i.e., "field information notices and/or field change orders) apply to this system. The recommendation might tell the user to apply corrective action for FIN/FCOs that apply.

Figure 51:
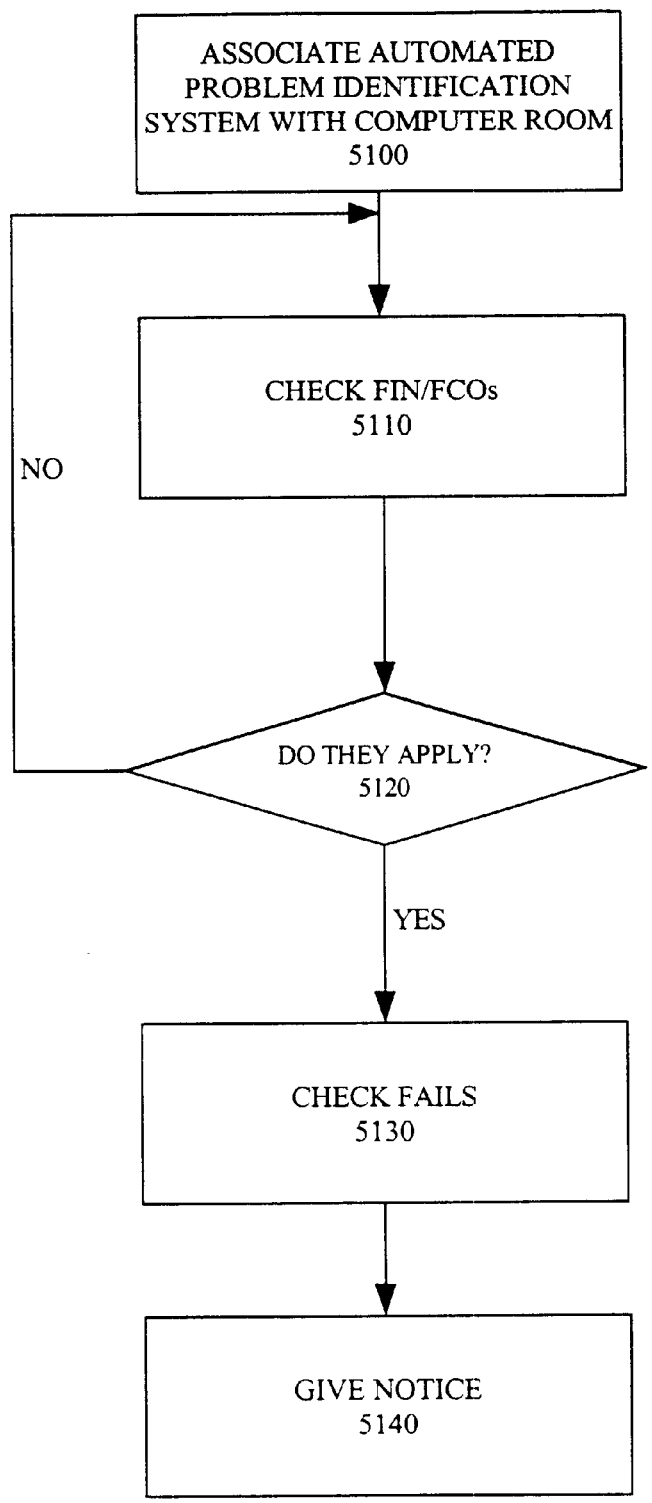
FIG. 51 shows a medium risk of service interruption check according to another embodiment of the present invention.

FIG. 51 shows an operational check according to an embodiment of the present invention. At operation 5100, an automated problem identification system is associated with a computer room. At operation 5110, the FIN/FCOs are checked. At operation 5120, it is determined if they apply. If they do not, the process repeats at step 5110. Otherwise, the check fails at operation 5130 and some form of notice is given at operation 5140.

Low Risk of Service Interruption

An example of a security check that might result in a low risk of service interruption or data loss is when physical access to the data center is not controlled. The analysis might state that physical access to the data center is not controlled. Lack of physical access control may allow unauthorized access to mission critical systems, jeopardizing their security and stability. The recommendation might instruct the user to develop and implement a procedure for controlling access to the data center.

Figure 15:
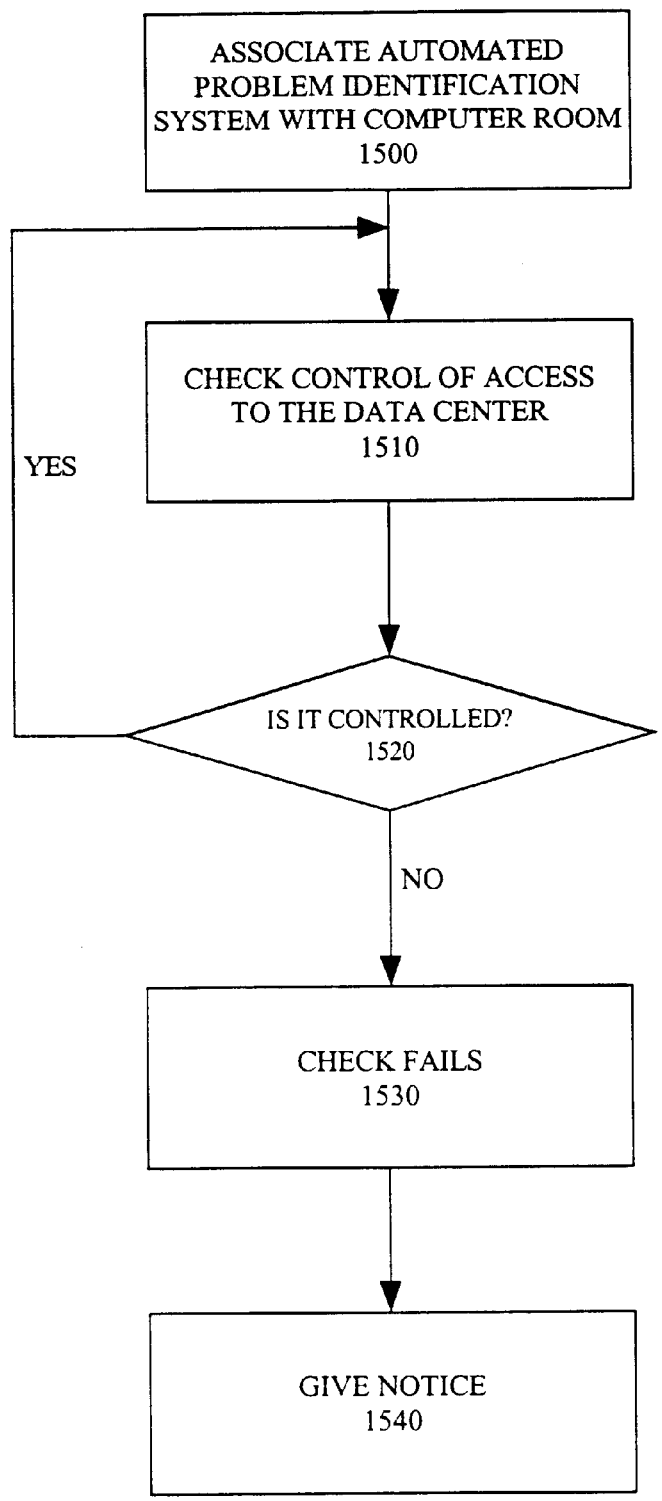
FIG. 15 shows a low risk of service interruption check according to an embodiment of the present invention.

FIG. 15 shows a security check according to an embodiment of the present invention. At operation 1500, an automated problem identification system is associated with a computer room. At operation 1510, the control of access to the data center is checked. At operation 1520, it is determined if it is controlled. If it is, the process repeats at step 1510. Otherwise, the check fails at operation 1530 and some form of notice is given at operation 1540.

Another example of a security check that might result in a low risk of service interruption or data loss is when physical access to the data center is not monitored or logged. The analysis might state that physical access to the data center is not being monitored or logged. Lack of physical access control and monitoring represents a significant security risk to the data center. It allows inappropriate access to mission critical data systems, and could lead to unplanned outages, data loss, or business espionage. The recommendation might instruct the user to develop and implement a procedure for monitoring and logging access to the data center.

Figure 16:
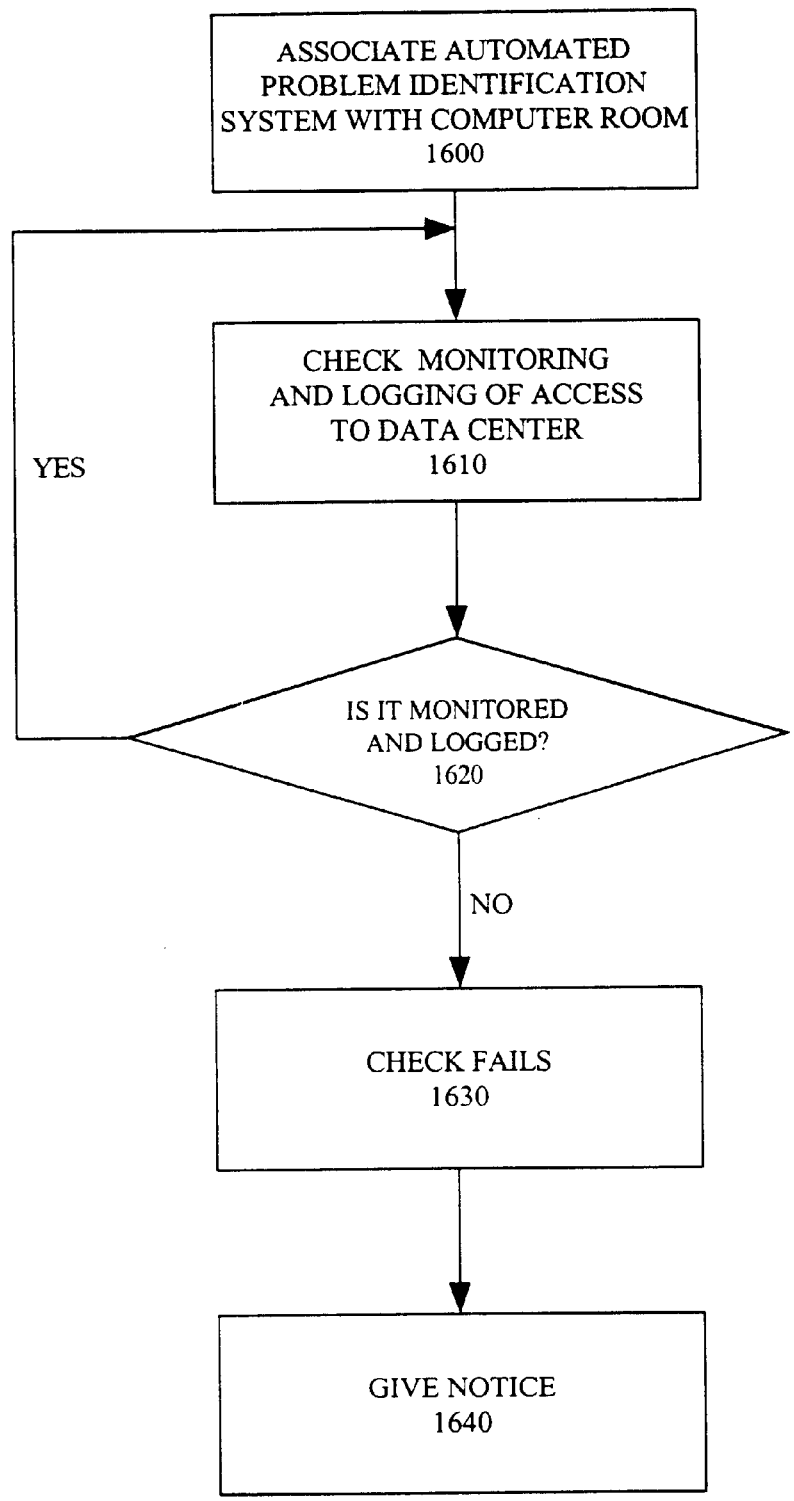
FIG. 16 shows a low risk of service interruption check according to another embodiment of the present invention.

FIG. 16 shows a security check according to an embodiment of the present invention. At operation 1600, an automated problem identification system is associated with a computer room. At operation 1610, the monitoring and logging of access to the data center is checked. At operation 1620, it is determined if it is monitored and logged. If it is, the process repeats at step 1610. Otherwise, the check fails at operation 1630 and some form of notice is given at operation 1640.

An example of a security check that might result in a low risk of service interruption or data loss is when a documented procedure for service personnel after hours does not exist. The analysis might state that the procedure for after hours access to the datacenter is not documented. This may extend downtime during a system failure if service personnel are not able to gain physical access to the failed system. The recommendation might instruct the user to implement and document a procedure for after hours access for service personnel.

Figure 17:
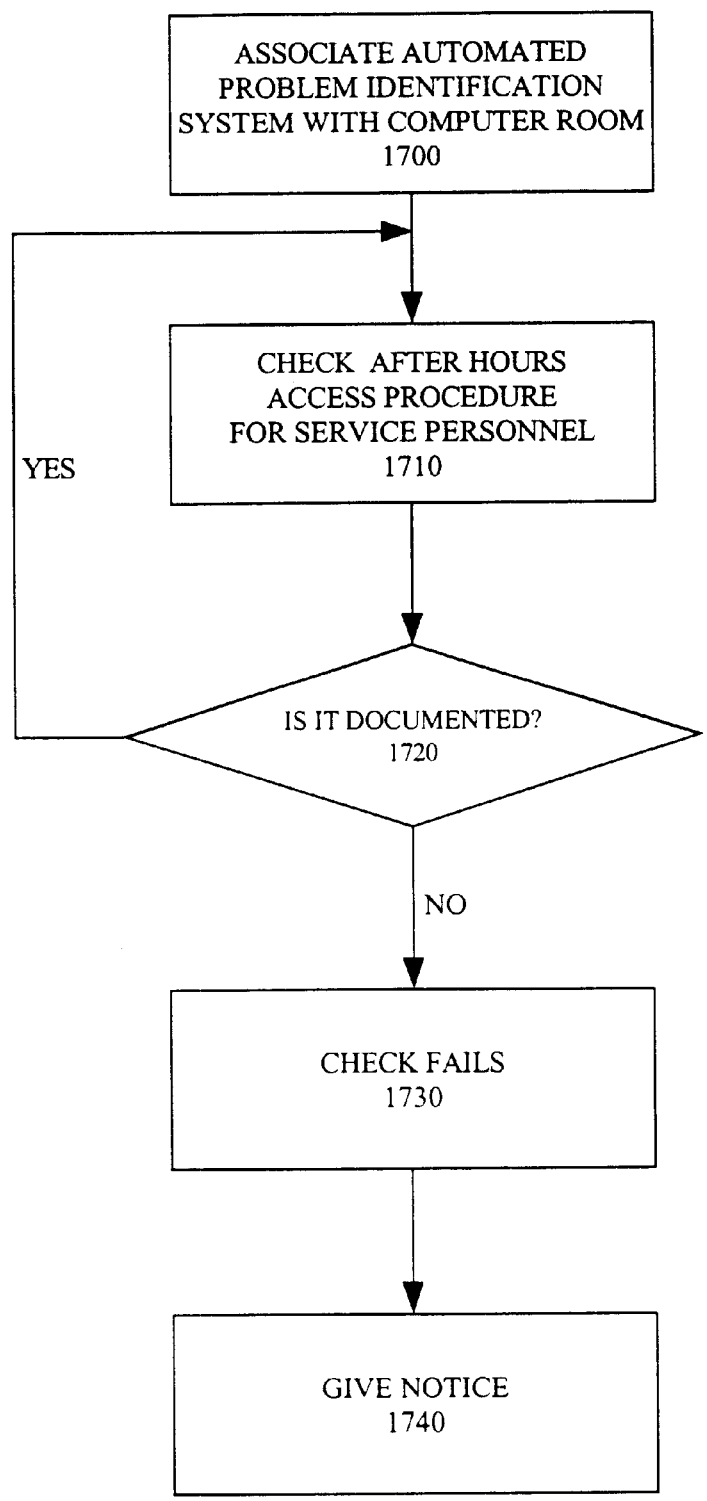
FIG. 17 shows a low risk of service interruption check according to another embodiment of the present invention.

FIG. 17 shows a security check according to an embodiment of the present invention. At operation 1700, an automated problem identification system is associated with a computer room. At operation 1710, the after hours access procedure for service personnel is checked. At operation 1720, it is determined if the procedure is documented. If it is, the process repeats at step 1710. Otherwise, the check fails at operation 1730 and some form of notice is given at operation 1740.

An example of a monitoring and escalation check that night result in a low risk of service interruption or data loss is when there is an insufficient ability to verify application, service, or host availability. The analysis might state that current monitoring tools are not able to sufficiently determine application, service, or host availability. The recommendation might instruct the user to use monitoring tools that can fully monitor all data services and applications, and their host systems.

Figure 18:
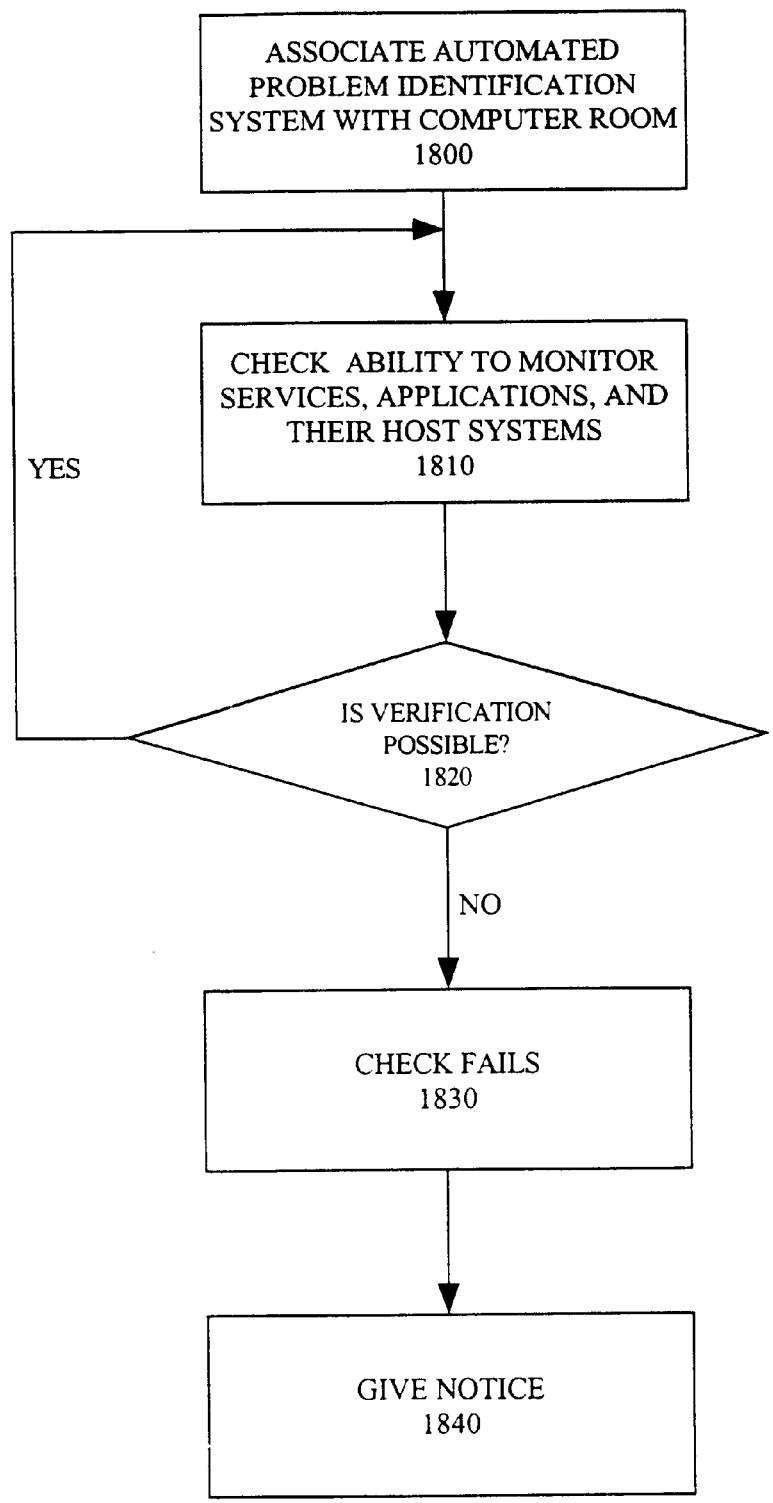
FIG. 18 shows a low risk of service interruption check according to another embodiment of the present invention.

FIG. 18 shows a monitoring and escalation check according to an embodiment of the present invention. At operation 1800, an automated problem identification system is associated with a computer room. At operation 1810, the ability to monitor services, applications, and their host systems is checked. At operation 1820, it is determined if verification is possible. If it is, the process repeats at step 1810. Otherwise, the check fails at operation 1830 and some form of notice is given at operation 1840.

Another example of a monitoring and escalation check that might result in a low risk of service interruption or data loss is when documented escalation procedures do not exist.

The analysis might state that a documented procedure for escalation in the event of service or system interruptions does not exist. Without a clear, documented escalation procedure, downtime on a failed system may be extended due to confusion of procedures, utilization of improper resources, or failure to act decisively in resolving the issue. The recommendation might instruct the user to clearly document the procedure for escalation in the event of service or system interruption.

Figure 19:
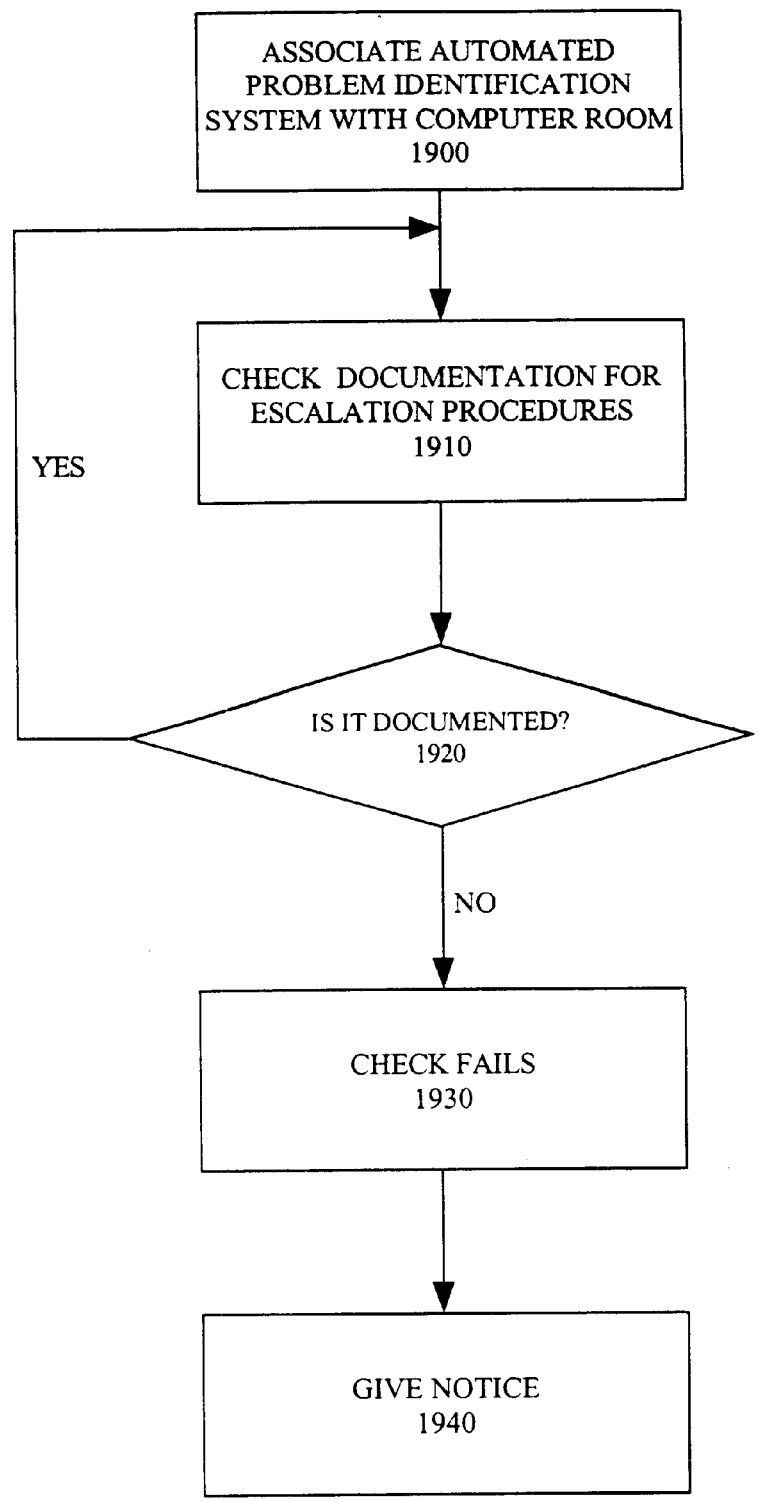
FIG. 19 shows a low risk of service interruption check according to another embodiment of the present invention.

FIG. 19 shows a monitoring and escalation check according to an embodiment of the present invention. At operation 1900, an automated problem identification system is associated with a computer room. At operation 1910, the documentation for escalation procedures is checked. At operation 1920, it is determined if it is documented. If it is, the process repeats at step 1910. Otherwise, the check fails at operation 1930 and some form of notice is given at operation 1940.

Figure 20:
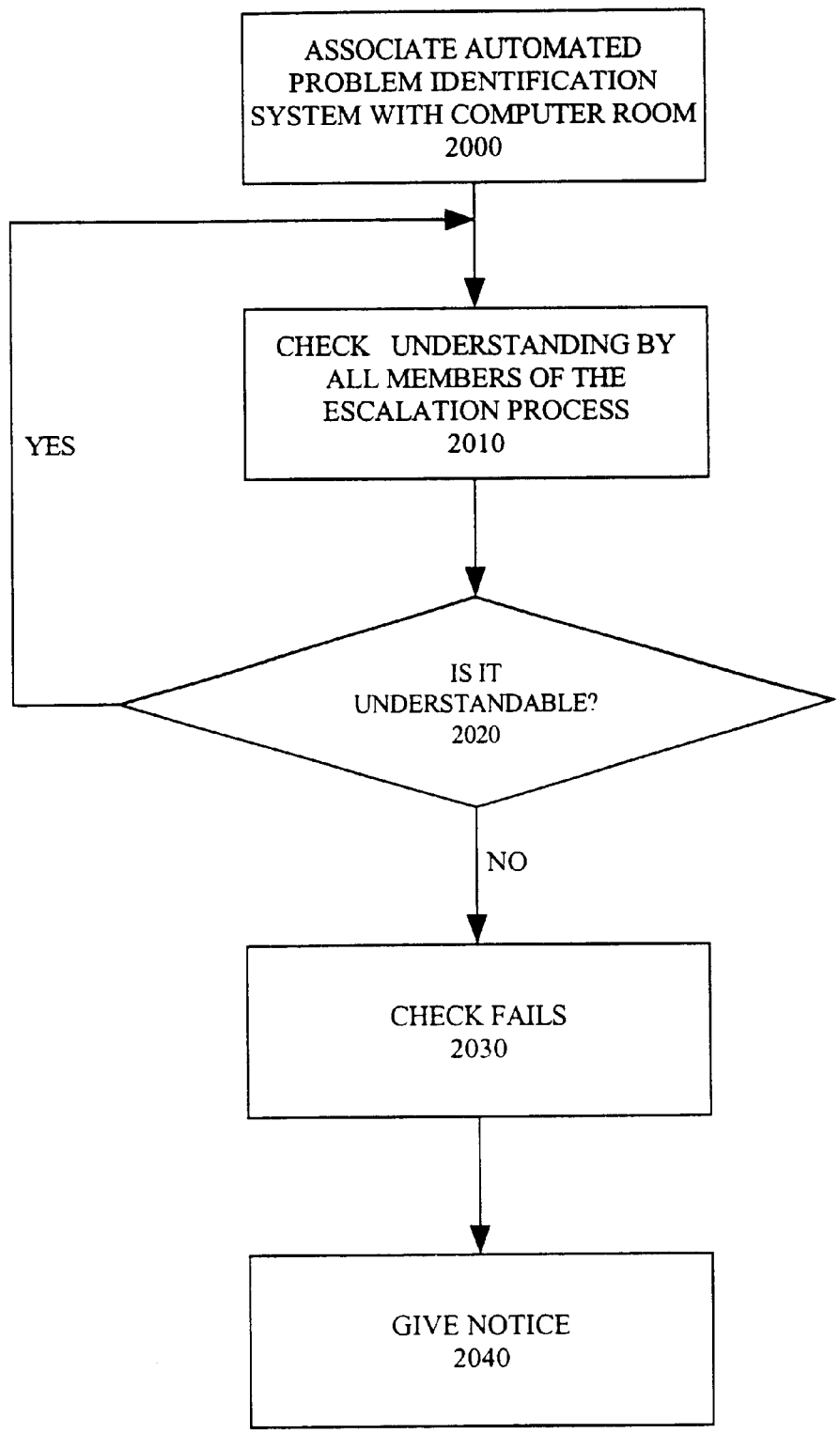
FIG. 20 shows a low risk of service interruption check according to another embodiment of the present invention.

Another example of a monitoring and escalation check that might result in a low risk of service interruption or data loss is when one or more staff members do not understand the escalation process. The analysis might state that the escalation process is not fully understood by all members of the customer support staff. This may complicate the initiation of an escalation during a system outage, and result in extended downtime. The recommendation might instruct the user to make the escalation process readily available to your staff and end users, and ensure that they are educated in its use FIG. 20 shows a monitoring and escalation check according to an embodiment of the present invention. At operation 2000, an automated problem identification system is associated with a computer room. At operation 2010, the understanding by all members of the escalation process is checked. At operation 2020, it is determined if they all understand. If they do, the process repeats at step 2010. Otherwise, the check fails at operation 2030 and some form of notice is given at operation 2040.

An example of a change management check that might result in a low risk of service interruption or data loss is when change management does not include a process for expedited emergency changes. The analysis might state that the change management procedures do not include a process for expediting changes during an emergency. This may extend downtime while the change management procedure is completed during a system outage. The recommendation might instruct the user to define and document a process for implementing emergency changes in addition to those processes defined for routine maintenance.

Figure 21:
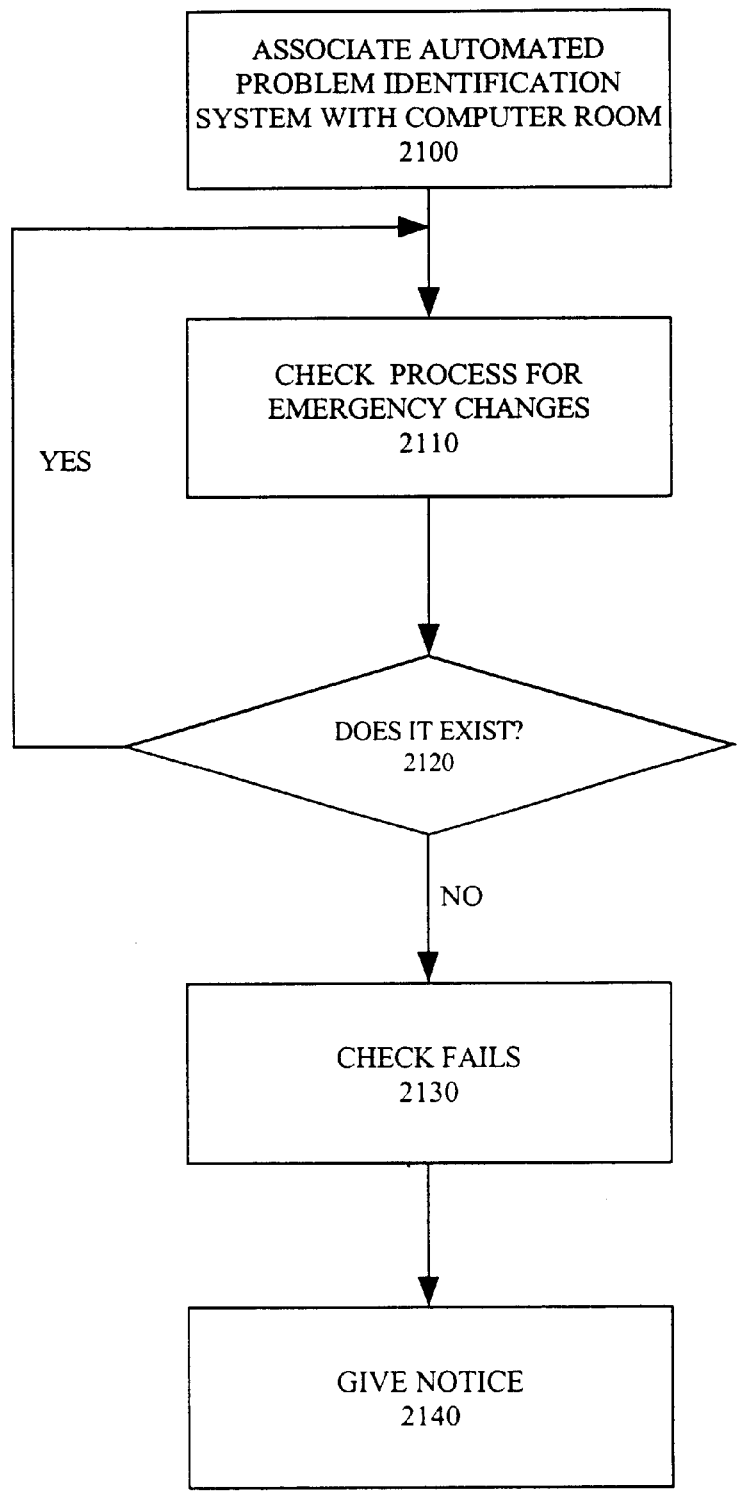
FIG. 21 shows a low risk of service interruption check according to another embodiment of the present invention.

FIG. 21 shows a change management check according to an embodiment of the present invention. At operation 2100, an automated problem identification system is associated with a computer room. At operation 2110, a process for expedited emergency changes is checked. At operation 2120, it is determined if such a process exists. If it does, the process repeats at step 2110. Otherwise, the check fails at operation 2130 and some form of notice is given at operation 2140.

Another example of a change management check that might result in a low risk of service interruption or data loss is when a regular maintenance window is not scheduled. The analysis might state that there is not a regularly scheduled maintenance window defined. Periodic maintenance is required on most datacenter equipment. Without a well known, regularly scheduled window, it may be difficult to obtain system and/or datacenter downtime to perform preventative maintenance on datacenter equipment. The recommendation might instruct the user to implement a regular maintenance schedule that allows for downtime to perform routine maintenance.

Figure 22:
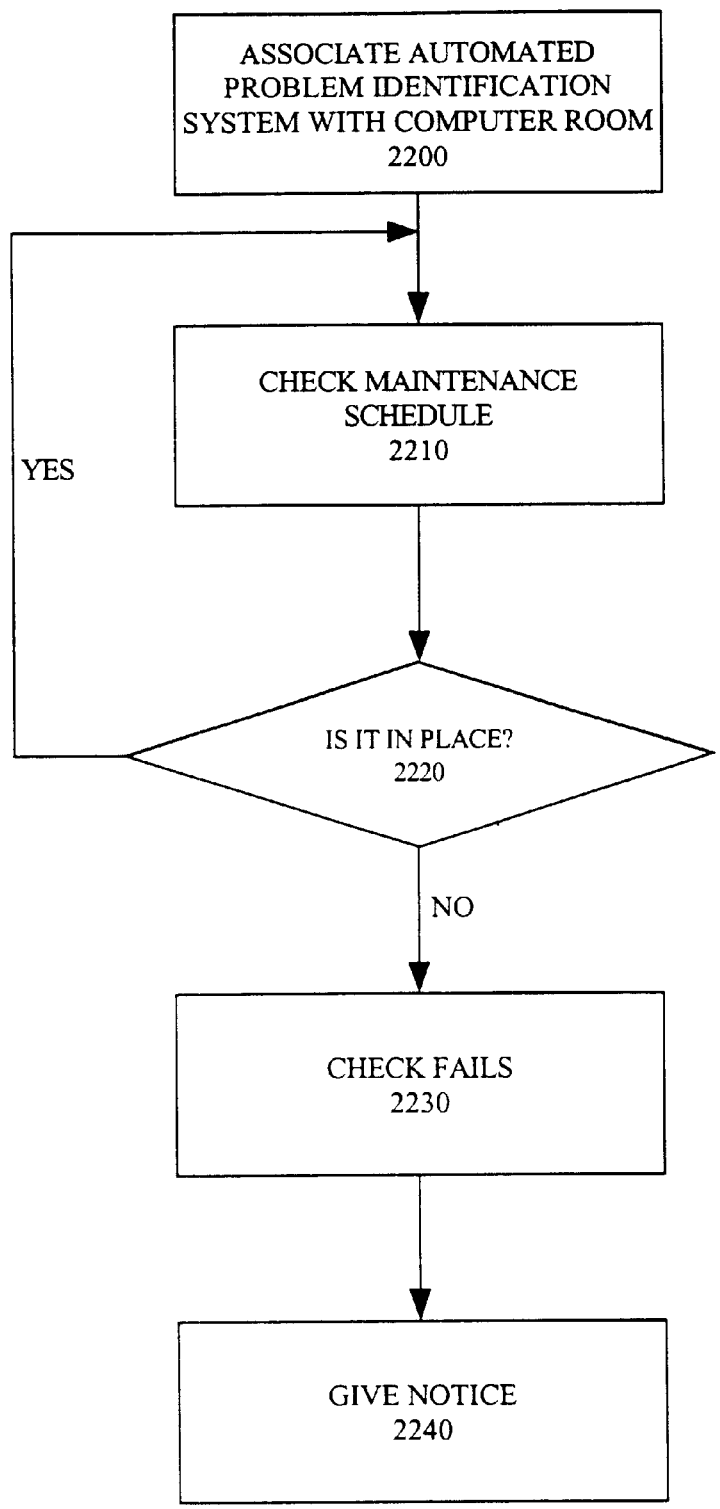
FIG. 22 shows a low risk of service interruption check according to another embodiment of the present invention.

FIG. 22 shows a change management check according to an embodiment of the present invention. At operation 2200, an automated problem identification system is associated with a computer room. At operation 2210, a regular maintenance schedule is checked. At operation 2220, it is determined if the schedule is in place. If it is, the process repeats at step 2210. Otherwise, the check fails at operation 2230 and some form of notice is given at operation 2240.

Another example of a change management check that might result in a low risk of service interruption or data loss is when mission critical systems do not require a pre-production review before going online. The analysis might state that a pre-production review is not required before mission critical systems are brought online. This may result in service interruptions due to infant mortality and/or configuration issues that might be discovered during a pre-production review process. The recommendation might instruct the user to implement a policy whereby all mission critical systems are required to go through a pre-production review before being put into production.

Figure 23:
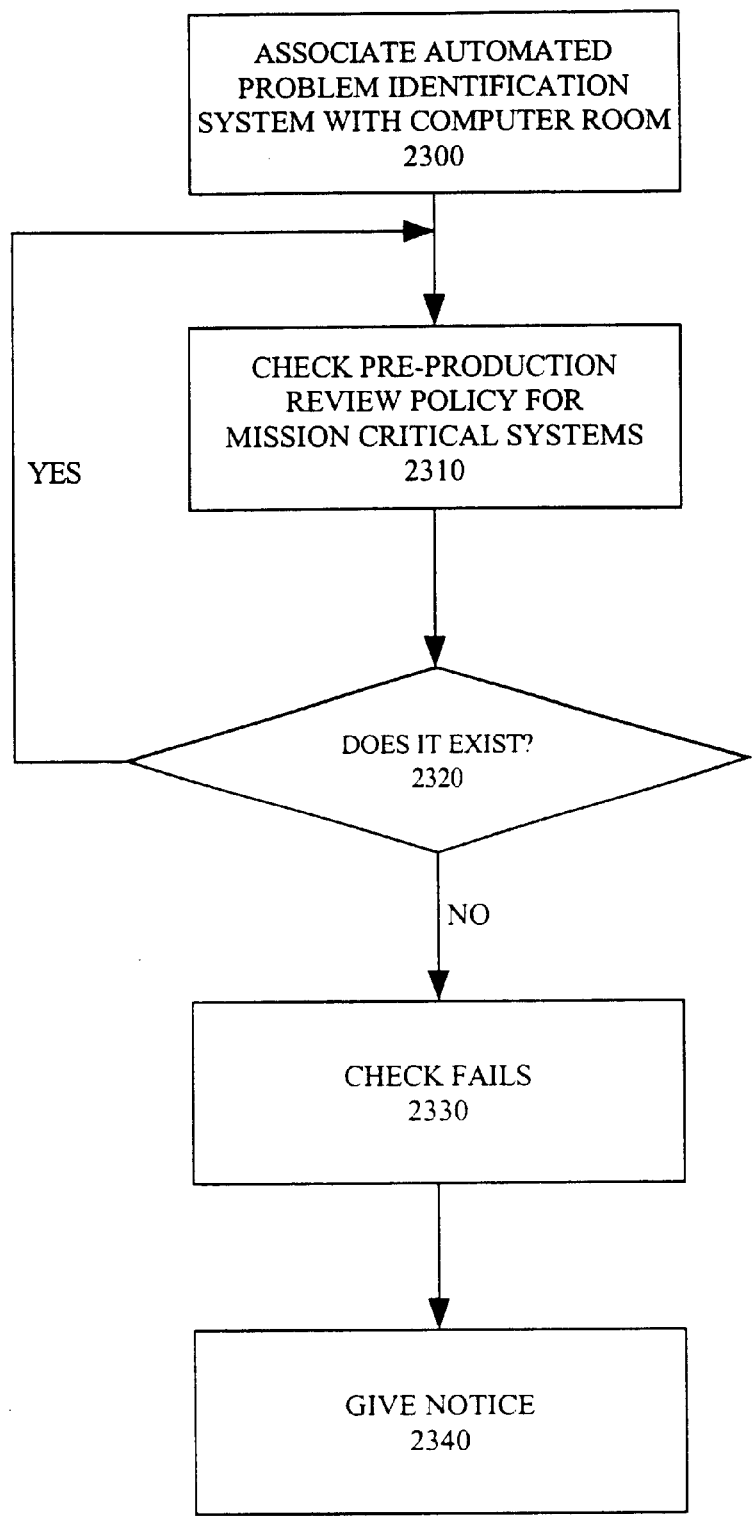
FIG. 23 shows a low risk of service interruption check according to another embodiment of the present invention.

FIG. 23 shows a change management check according to an embodiment of the present invention. At operation 2300, an automated problem identification system is associated with a computer room. At operation 2310, a pre-production review policy is checked for all mission critical systems. At operation 2320, it is determined if such a policy exists. If it does, the process repeats at step 2310. Otherwise, the check fails at operation 2330 and some form of notice is given at operation 2340.

An example of a training check that might result in a low risk of service interruption or data loss is when training is not budgeted whenever deploying new hardware or software. The analysis might state that training is not budgeted as part of the deployment process of any new type of hardware or software system This may cause extended downtime during a failure involving the new hardware or software, or service interruption due to lack of training on the product. The recommendation might instruct the user that when a new hardware or software system is being deployed, to ensure that training is budgeted and implemented as a part of the process.

Figure 24:
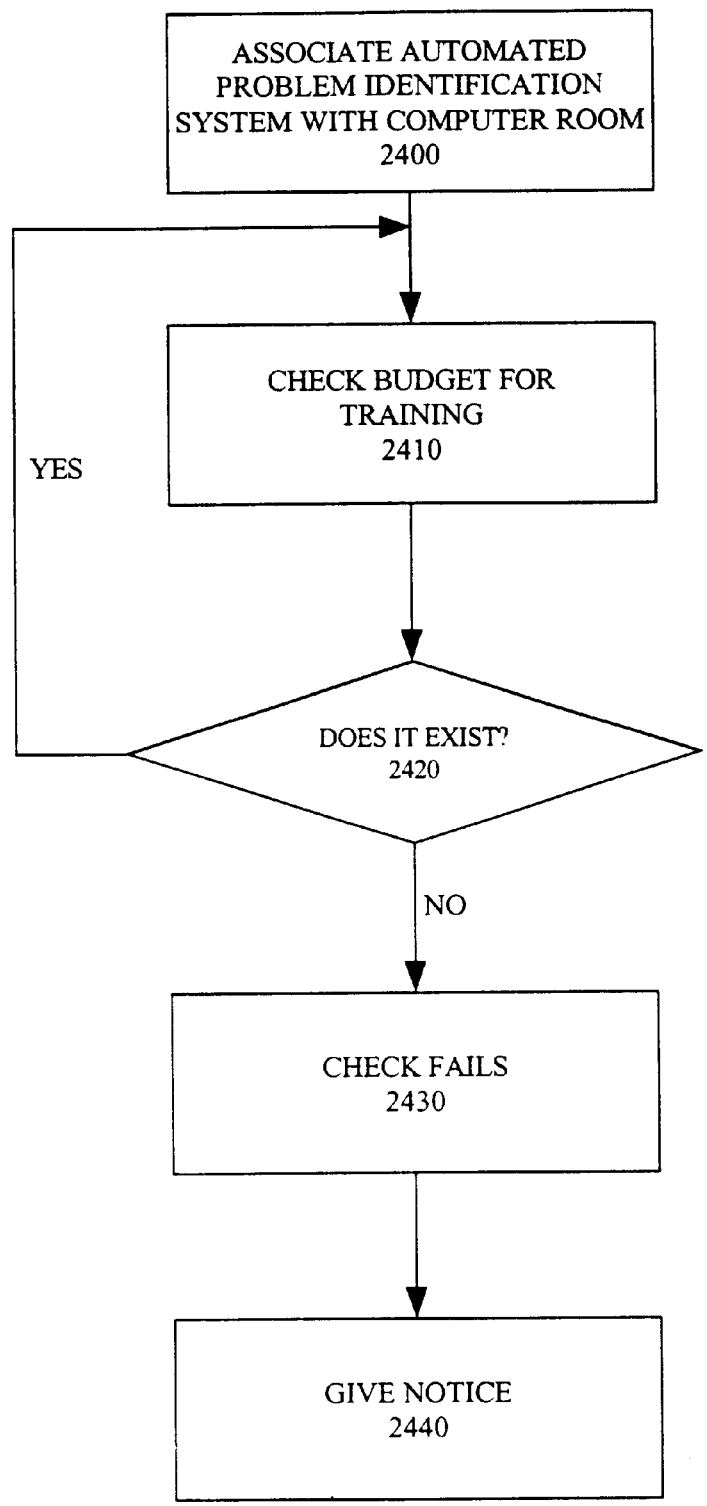
FIG. 24 shows a low risk of service interruption check according to another embodiment of the present invention.

FIG. 24 shows a training check according to an embodiment of the present invention. At operation 2400, an automated problem identification system is associated with a computer room. At operation 2410, the budget for training is checked for all new hardware and software. At operation 2420, it is determined if such a training budget exists. If it does, the process repeats at step 2410. Otherwise, the check fails at operation 2430 and some form of notice is given at operation 2440.

An example of a hardware check that might result in a low risk of service interruption or data loss is when one or more systems are not physically accessible for service. The analysis might state that the lack of accessibility to systems will hinder service by maintenance personnel, increasing the Mean Time To Fix for each system in this state. The recommendation might instruct the user to rearrange the appropriate systems to improve accessibility by maintenance personnel. Where possible, ensure that computer systems are mounted in approved cabinets and rack mount kits.

Figure 52:
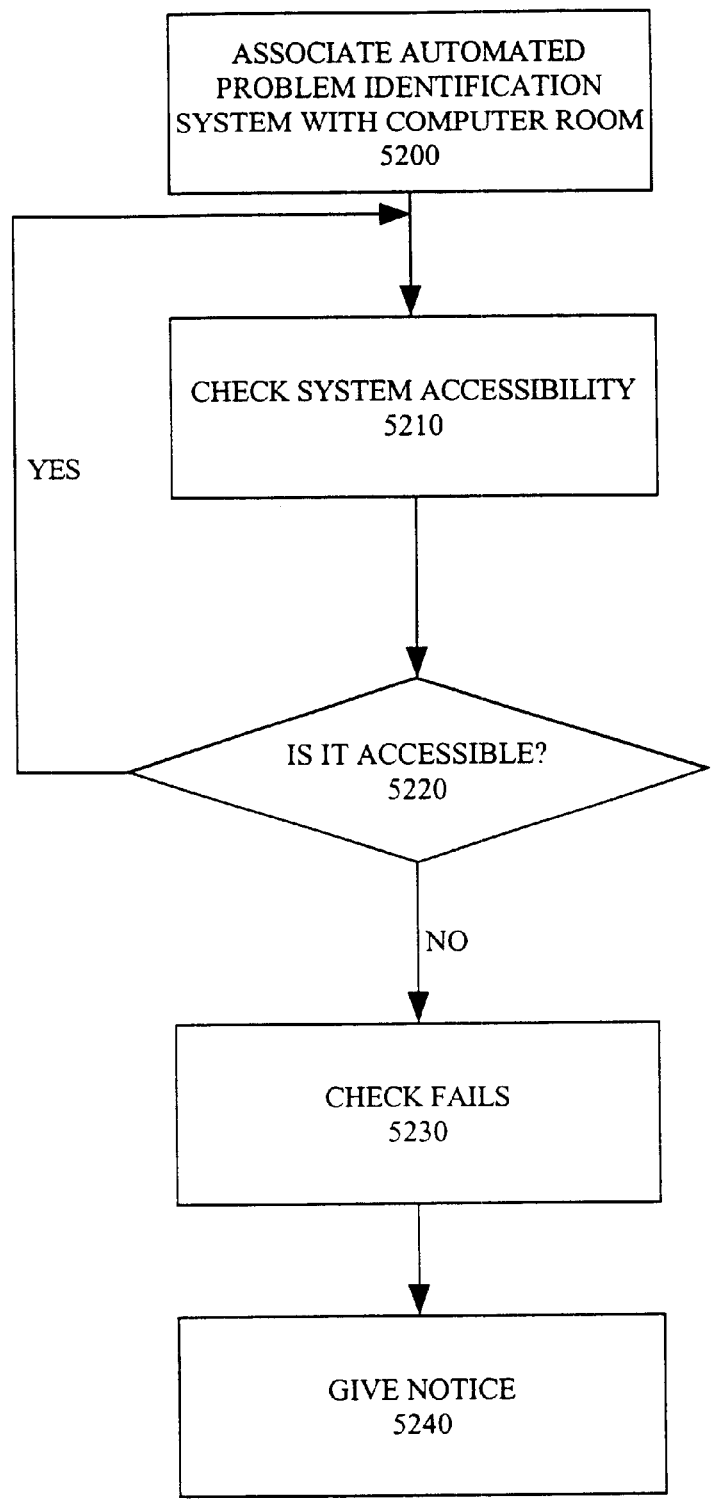
FIG. 52 shows a low risk of service interruption check according to another embodiment of the present invention.

FIG. 52 shows a hardware check according to an embodiment of the present invention. At operation 5200, an automated problem identification system is associated with a computer room. At operation 5210, a the system accessibility is checked. At operation 5220, it is determined if they are accessible. If they are, the process repeats at step 5210. Otherwise, the check fails at operation 5230 and some form of notice is given at operation 5240.

An example of a training check that might result in a low risk of service interruption or data loss is in the case of a memory correctable ECC error. The analysis might state that ECC memory error entries have been detected in the messages files. When the memory subsystem detects a single-bit error on a read, the MQH rewrites the corrected data into memory and delivers the corrected word to the requestor. The MQH also issues a level-15 broadcast interrupt with INTSID=0x02 if it is the first occurrence of a single-bit error, i.e., if the error is logged in the Correctable Error Address and Data registers. This means that an interrupt is issued if the SBE bit is set to one because the error and if the ECI bit of the MQH Control and Status register is set. When MQH detects the first occurrence of a single-bit error it keeps the address, data, ECC and syndrome for the double-word which was corrected. The recommendation might instruct the user that ECC memory error(s) may indicate that a system component could be questionable. Further verification should be conducted to validate the system hardware reporting the error(s). Diagnostics and further analysis should be scheduled.

Figure 53:
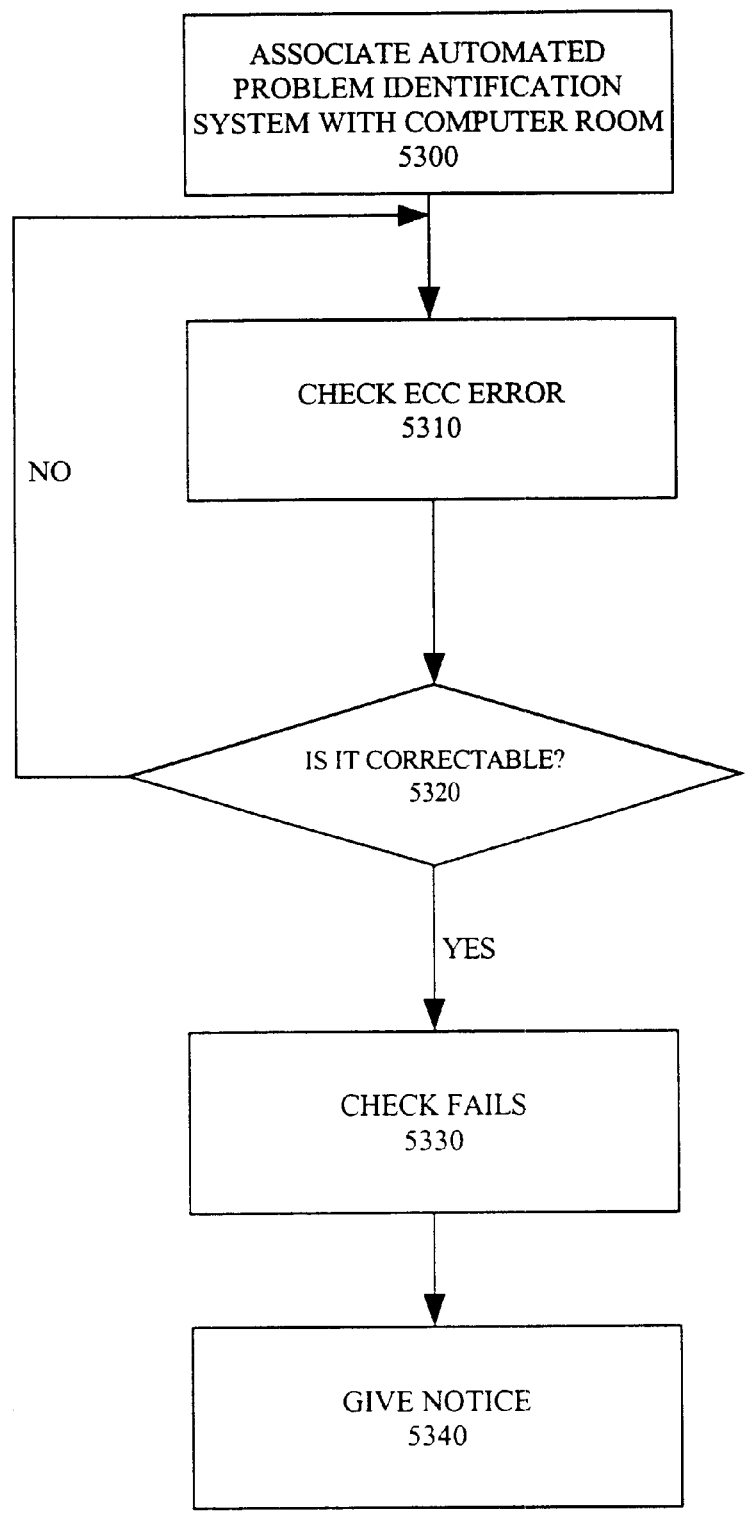
FIG. 53 shows a low risk of service interruption check according to another embodiment of the present invention.

FIG. 53 shows a hardware check according to an embodiment of the present invention. At operation 5300, an automated problem identification system is associated with a computer room. At operation 5310, an ECC error is checked. At operation 5320, it is determined if the ECC error is correctable. If it is not, the process repeats at step 5310. Otherwise, the check fails at operation 5330 and some form of notice is given at operation 5340.

An example of a training check that might result in a low risk of service interruption or data loss is when the process to recover the OS from a backup is not documented. The analysis might state that the procedure for recovering the operating system from a backup is not documented. Depending on the system configuration, recovery of the OS may not be a straight forward process. Lack of complete process documentation adds complexity to a process that must be completed quickly in a crisis situation. The added complexity may lead to errors in the recovery process that will lengthen the time taken to recover the system.

The recommendation might instruct the user that document the operating system recovery process in a clear and concise manner. Ideally, the process should be documented such that someone with no prior knowledge of the system can complete a recovery using the process documentation. Test the recovery process, following the documentation as written, to verify that the documentation is complete and correct.

Figure 54:
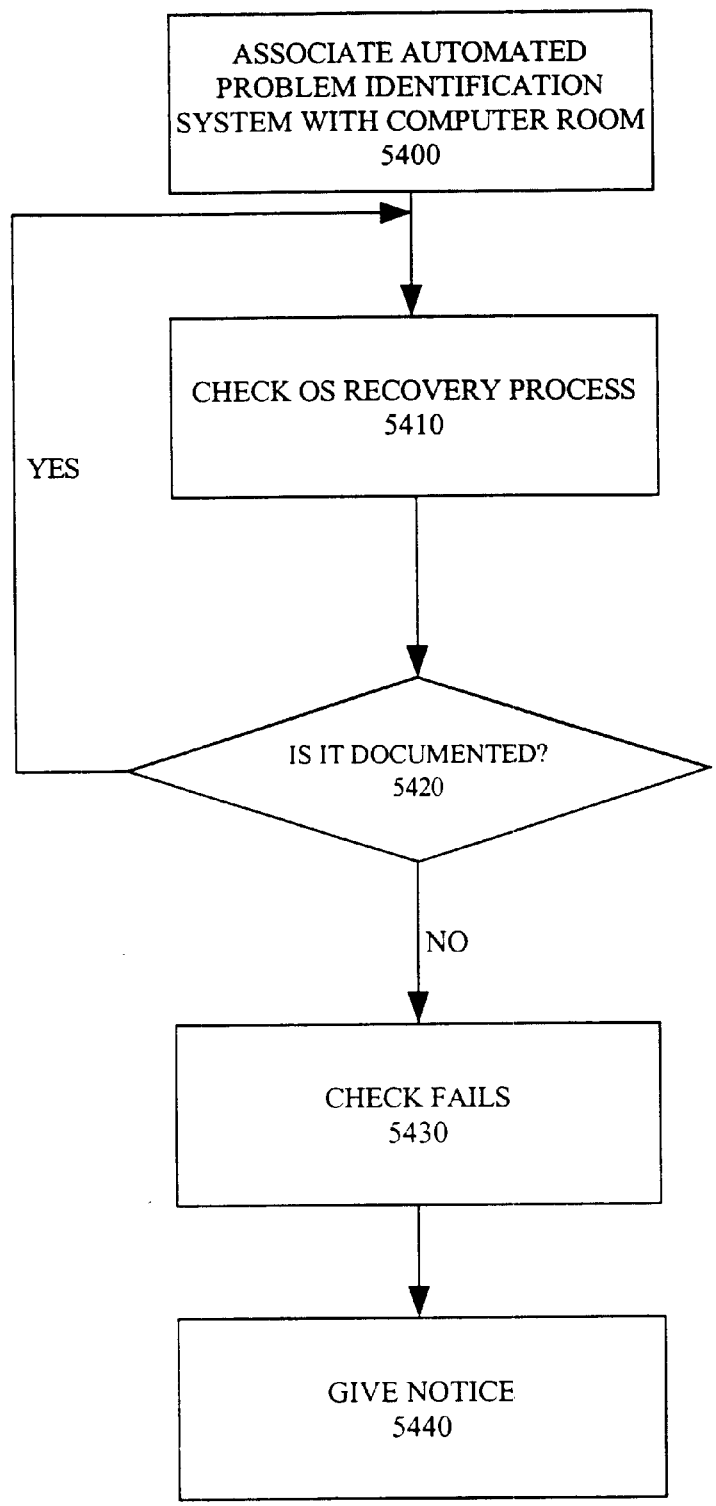
FIG. 54 shows a low risk of service interruption check according to another embodiment of the present invention.

FIG. 54 shows an operational check according to an embodiment of the present invention. At operation 5400, an automated problem identification system is associated with a computer room. At operation 5410, a the OS recovery process is checked. At operation 5420, it is determined if it is documented. If it is, the process repeats at step 5410. Otherwise, the check fails at operation 5430 and some form of notice is given at operation 5440.

Another example of an operational check that might result in a low risk of service interruption or data loss is when the system prompt for the root user does not contain a hostname. The analysis might state that the system prompt for the root user does not contain the system hostname. Without a unique identifier, such as the system hostname, the root user system prompts look the same on every system (for instance: '#'. This can lead to the wrong system inadvertently being changed, possibly resulting in system downtime, or data loss. It is a good practice to have this information visible so that changes are not inadvertently made to the wrong system. The recommendation might instruct the user to add the system's hostname to the root user's command line system prompt.

Figure 55:
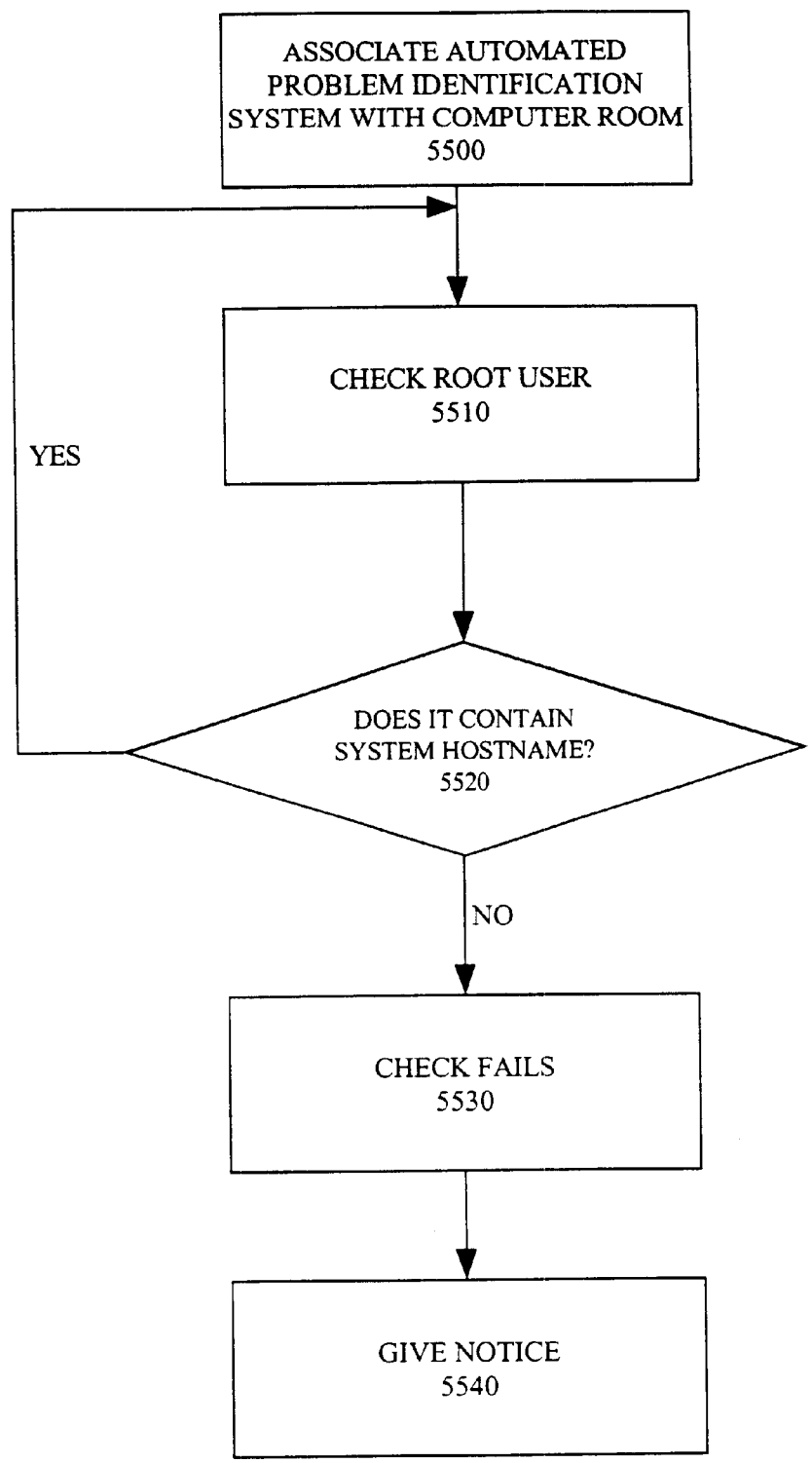
FIG. 55 shows a low risk of service interruption check according to another embodiment of the present invention.

FIG. 55 shows a training check according to an embodiment of the present invention. At operation 5500, an automated problem identification system is associated with a computer room. At operation 5510, the root user is checked. At operation 5520, it is determined if it contains the system hostname. If it does, the process repeats at step 5510. Otherwise, the check fails at operation 5530 and some form of notice is given at operation 5540.

Critical Risk of Service Interruption or Data Loss

An example of an operating system check that might result in a critical risk of service interruption or data loss is when there is a potential local root access security risk via a netpr exploit. The analysis might state that a failure to install patch 109320-01 or later may allow netpr to be exploited for local root access. The recommendation might instruct the user to install the current version of patch 109320.

Figure 25:
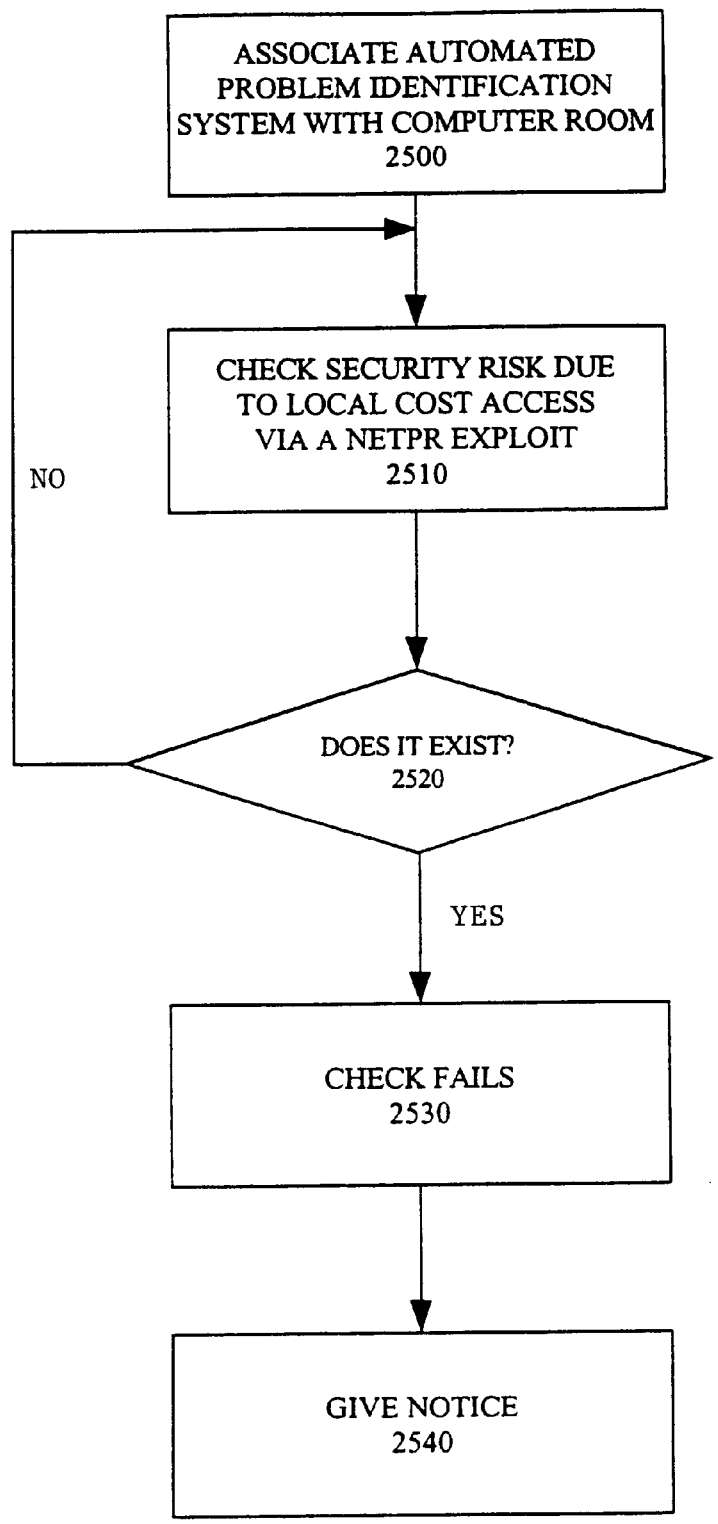
FIG. 25 shows a critical risk of service interruption check according to an embodiment of the present invention.

FIG. 25 shows an operating system check according to an embodiment of the present invention. At operation 2500, an automated problem identification system is associated with a computer room. At operation 2510, the potential for a security risk due to local root access via a netpr exploit is checked. At operation 2520, it is determined if such a potential exists. If it does not, the process repeats at step 2510. Otherwise, the check fails at operation 2530 and some form of notice is given at operation 2540.

An example of an operational check that might result in a critical risk of service interruption or data loss is when the primarily boot disk and it's mirror are on same controller. The analysis might state that the primarily boot disk and it's mirror are on the same controller. The recommendation might instruct the user that the primary boot disk and it's mirror being located on the same controller is not optimal or recommended in mission critical environments. This single point of failure should be removed.

Figure 26:
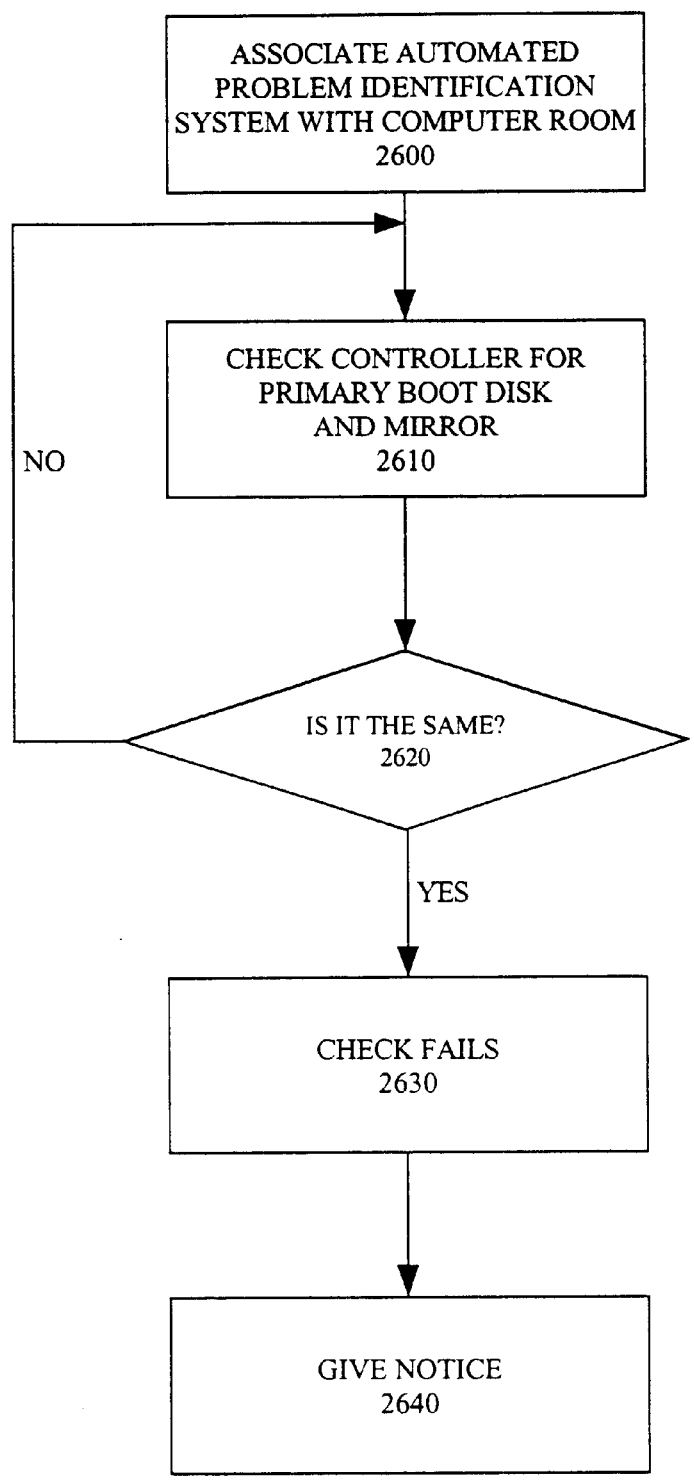
FIG. 26 shows a critical risk of service interruption check according to another embodiment of the present invention.

FIG. 26 shows an operational check according to an embodiment of the present invention. At operation 2600, an automated problem identification system is associated with a computer room. At operation 2610, the controller for the primary boot disk and it's mirror is checked. At operation 2620, it is determined if the controller is the same. If it is not, the process repeats at step 2610. Otherwise, the check fails at operation 2630 and some form of notice is given at operation 2640.

An example of an unbundled products check that might result in a critical risk of service interruption or data loss is when databases using raw disk devices or Veritas Quick I/O also use asynchronous I/O. The analysis might state that Solaris 2.6 system using raw devices or Veritas Quick I/O need patch 105181-17 or later. The recommendation might instruct the user to disable asynchronous I/O in the file init.ora using the setting: DISK_ASYNCH_IO=FALSE or install Solaris 2.6 patch 105181-16.

Figure 27:
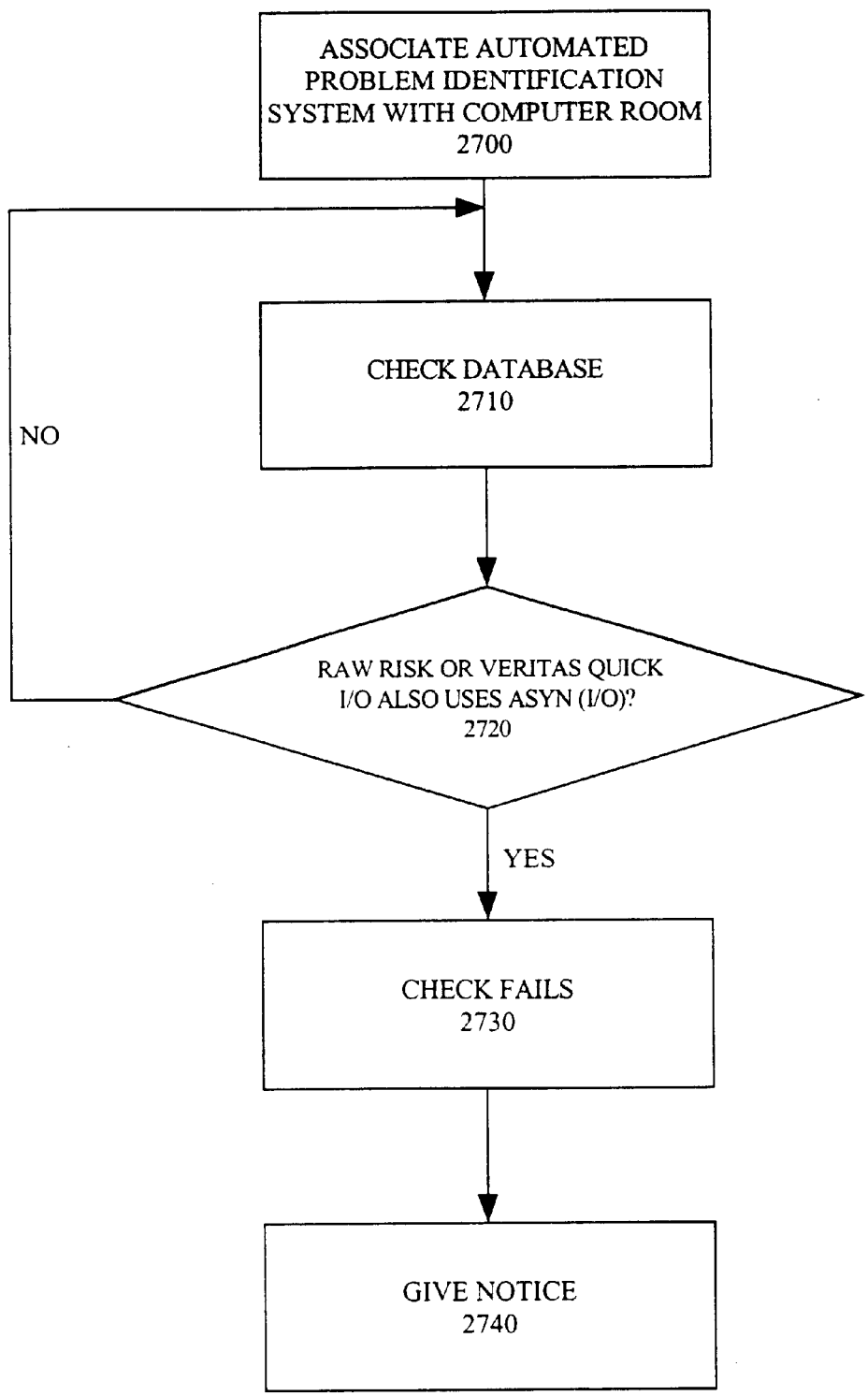
FIG. 27 shows a critical risk of service interruption check according to another embodiment of the present invention.

FIG. 27 shows an unbundled products check according to an embodiment of the present invention. At operation 2700, an automated problem identification system is associated with a computer room. At operation 2710, the database is checked. At operation 2720, it is determined if the databases using raw disk devices or Veritas Quick I/O also use asynchronous I/O. If not, the process repeats at step 2710.

Otherwise, the check fails at operation 2730 and some form of notice is given at operation 2740.

An example of an unbundled products check that might result in a critical risk of service interruption or data loss is when a Veritas filesystem version 3.3.1 with Veritas Quick I/O 3.3.1.1 on the Solaris 2.6 OS panics the system. The analysis might state that known problems with Solaris VXFS and Quick I/O which the system to panic. The recommendation might instruct the user to disable Veritas Quick I/O. This will cause some performance degradation.

Figure 28:
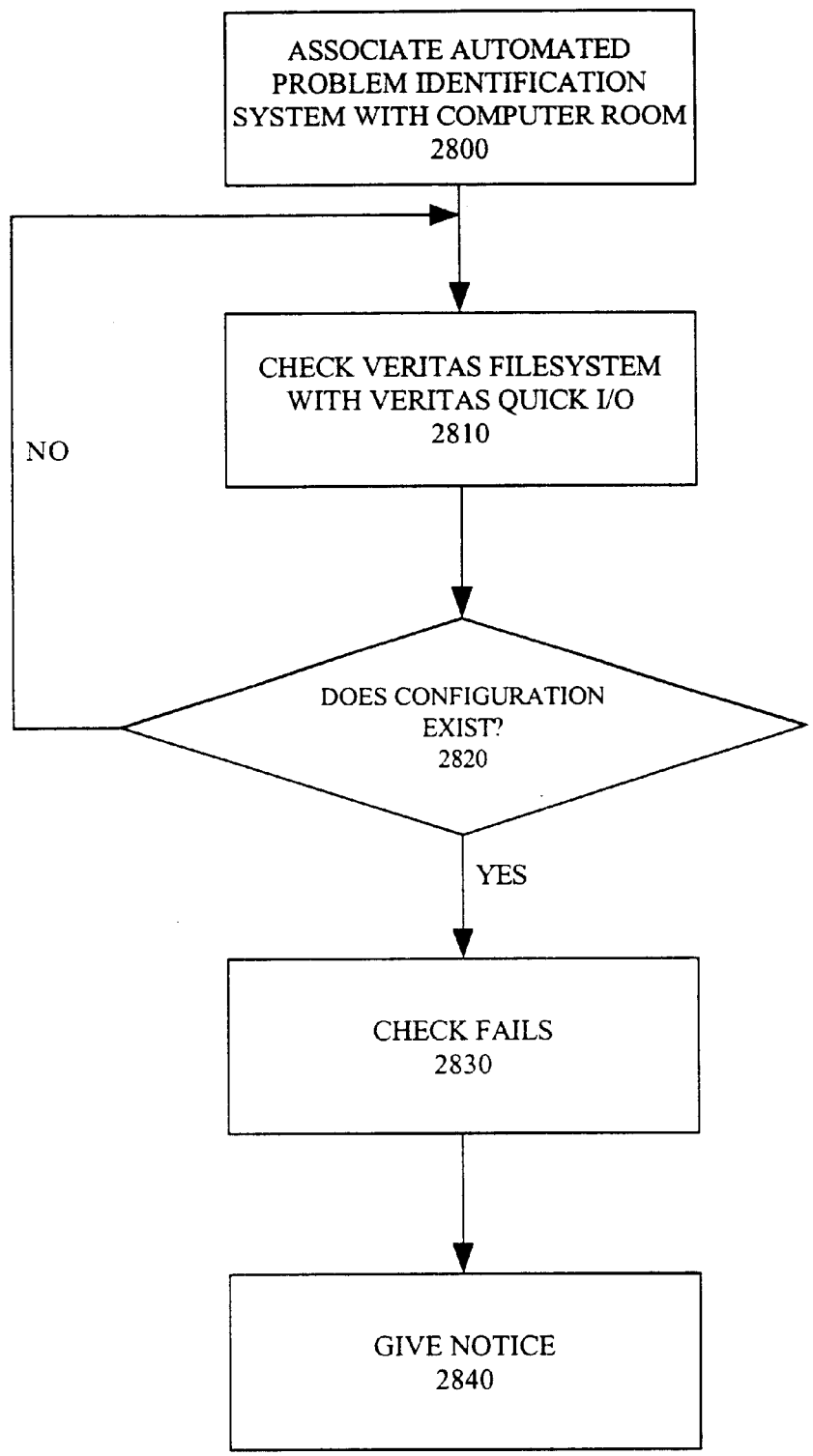
FIG. 28 shows a critical risk of service interruption check according to another embodiment of the present invention.

FIG. 28 shows an unbundled products check according to an embodiment of the present invention. At operation 2800, an automated problem identification system is associated with a computer room. At operation 2810, the potential for a security risk due to the use of a Veritas filesystem with Veritas Quick I/O is checked. At operation 2820, it is determined if such a configuration exists. If it does not, the process repeats at step 2810. Otherwise, the check fails at operation 2830 and some form of notice is given at operation 2840.

Embodiment of Computer Execution Environment (Hardware)

Figure 56:
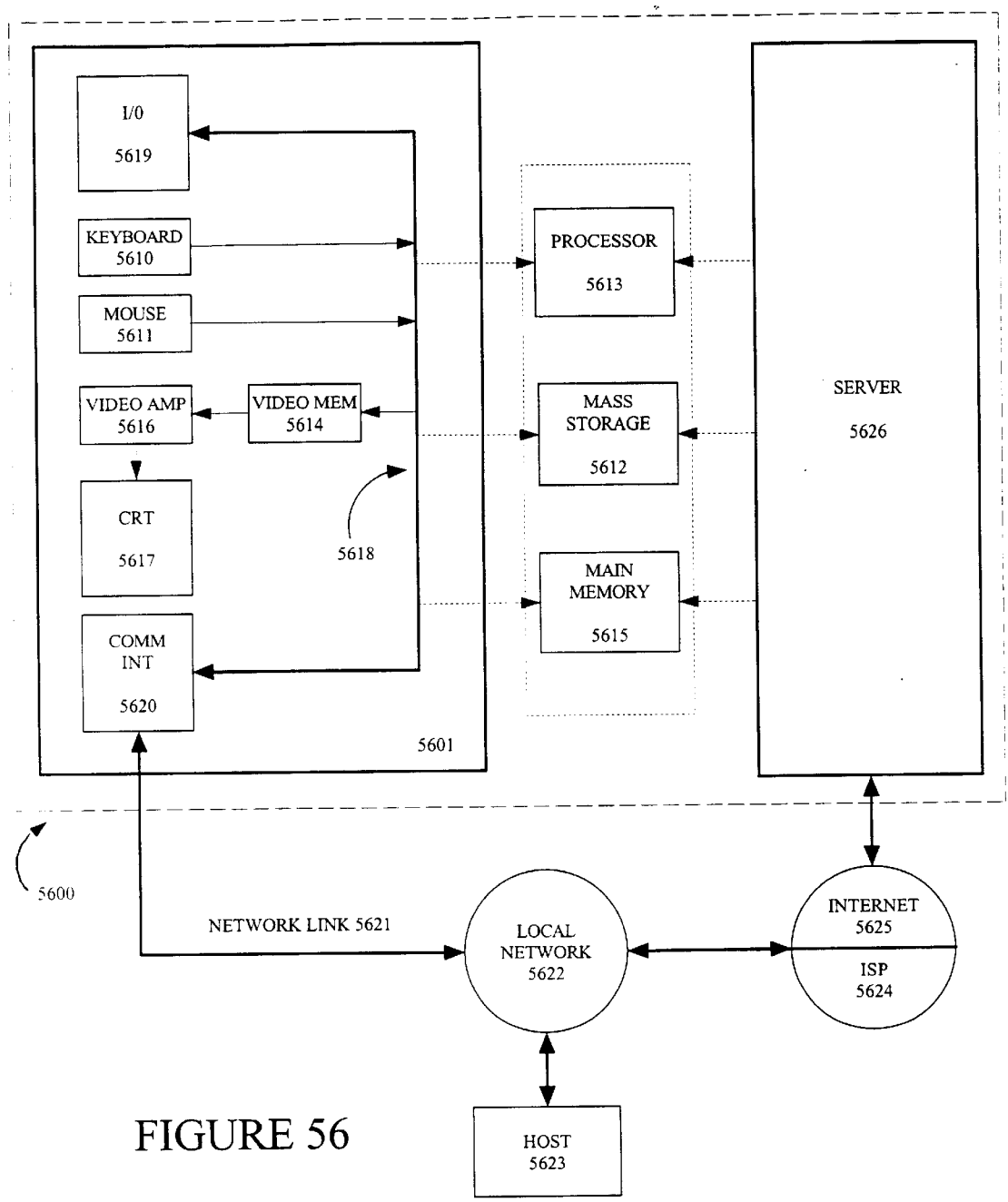
FIG. 56 is an example of a computer execution environment in which one or more embodiments of the present invention can be implemented

An embodiment of the invention can be implemented as computer software in the form of computer readable program code executed in a general purpose computing environment such as environment 5600 illustrated in FIG. 56, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 5610 and mouse 5611 are coupled to a system bus 5618. The keyboard and mouse are for introducing user input to the computer system and communicating that user input to central processing unit (CPQ 5613. Other suitable input devices maybe used in addition to, or in place of, the mouse 5611 and keyboard 5610. I/O (input/output) unit 5619 coupled to bi-directional system bus 5618 represents such I/O elements as a printer, A/V (audio/video) I/O, etc.

Computer 5601 may include a communication interface 5620 coupled to bus 5618. Communication interface 5620 provides a two-way data communication coupling via a network link 5621 to a local network 5622. For example, if communication interface 5620 is an integrated services digital network (ISDN) card or a modem, communication interface 5620 provides a data communication connection to the corresponding type of telephone line, which comprises part of network link 5621. If communication interface 5620 is a local area network (LAN) card, communication interface 5620 provides a data communication connection via network link 5621 to a compatible LAN. Wireless links are also possible. In any such implementation, communication interface 5620 sends and receives electrical, electromagnetic or optical signals which carry digital data streams representing various types of information.

Network link 5621 typically provides data communication through one or more networks to other data devices. For example, network link 5621 may provide a connection through local network 5622 to local server computer 5623 or to data equipment operated by ISP 5624. ISP 5624 in turn provides data communication services through the world wide packet data communication network now commonly referred to as the "Internet" 5625. Local network 5622 and Internet 5625 both use electrical, electromagnetic or optical signals which carry digital data streams. The signals through the various networks and the signals on network link 5621 and through communication interface 5620, which carry the digital data to and from environment 5600, are exemplary forms of carrier waves transporting the information.

Processor 5613 may reside wholly on client computer 5601 or wholly on server 5626 or processor 5613 may have its computational power distributed between computer 5601 and server 5626. Server 5626 symbolically is represented in FIG. 56 as one unit, but server 5626 can also be distributed between multiple "tiers". In one embodiment, server 5626 comprises a middle and back tier where application logic executes in the middle tier and persistent data is obtained in the back tier. In the case where processor 5613 resides wholly on server 5626, the results of the computations performed by processor 5613 are transmitted to computer 5601 via Internet 5625, Internet Service Provider (ISP) 5624, local network 5622 and communication interface 5620. In this way, computer 5601 is able to display the results of the computation to a user in the form of output.

Computer 5601 includes a video memory 5614, main memory 5615 and mass storage 5612, all coupled to bi-directional system bus 5618 along with keyboard 5610, mouse 5611 and processor 5613. As with processor 5613, in various computing environments, main memory 5615 and mass storage 5612, can reside wholly on server 5626 or computer 5601, or they maybe distributed between the two. Examples of systems where processor 5613, main memory 5615, and mass storage 5612 are distributed between computer 5601 and server 5626 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 5612 may include both fixed and removable media, such as magnetic, optical or magnetic optical storage systems or any other available mass storage technology. Bus 5618 may contain, for example, thirty-two address lines for addressing video memory 5614 or main memory 5615. The system bus 5618 also includes, for example, a 32-bit data bus for transferring data between and among the components, such as processor 5613, main memory 5615, video memory 5614 and mass storage 5612. Alternatively, multiplex data/address lines may be used instead of separate data and address lines.

In one embodiment of the invention, the processor 5613 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 5615 is comprised of dynamic random access memory (DRAM). Video memory 5614 is a dual-ported video random access memory. One port of the video memory 5614 is coupled to video amplifier 5616. The video amplifier 5616 is used to drive the cathode ray tube (CRT) raster monitor 5617. Video amplifier 5616 is well known in the art and maybe implemented by any suitable apparatus. This circuitry converts pixel data stored in video memory 5614 to a raster signal suitable for use by monitor 5617. Monitor 5617 is a type of monitor suitable for displaying graphic images.

Computer 5601 can send messages and receive data, including program code, through the network(s), network link 5621, and communication interface 5620. In the Internet example, remote server computer 5626 might transmit a requested code for an application program through Internet 5625, ISP 5624, local network 5622 and communication interface 5620. The received code may be executed by processor 5613 as it is received, and/or stored in mass storage 5612, or other non-volatile storage for later execution. In this manner, environment 5600 may obtain application code in the form of a carrier wave. Alternatively, remote server computer 5626 may execute applications using processor 5613, and utilize mass storage 5612, and/or video memory 5615. The results of the execution at server 5626 are then transmitted through Internet 5625, ISP 5624, local network 5622 and communication interface 5620. In this example, computer 5601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, an automated problem identification system is described in conjunction with one or more specific embodiments. The invention is defined by the claims and their full scope of equivalents.

What is claimed is:

1. A method for automated problem identification comprising:
   providing a set of information for a computer environment, wherein the set of information includes system configuration information;
   performing a check of said set of information for the computer environment;
   determining if said check is satisfied, wherein the determining includes comparing at least a portion of the set of information with a portion of an internal rules database, the internal rules database comprising known problems for a set of system configurations;
   providing a notice, if said check is not satisfied.

2. The method of claim 1 wherein said performing uses a knowledge base comprising a series of the checks, the checks including information regarding potential computer environment problems.

3. The method of claim 2 wherein said determining uses a knowledge engine to interpret the check against the set of information for the computer environment including interacting with the knowledge base.

4. The method of claim 1 wherein said performing comprises:
   determining if a computer room temperature is within an acceptable range.

5. The method of claim 1 wherein said performing comprises:
   determining if a power and environmental certification has occurred within a range.

6. The method of claim 1 wherein said performing comprises:
   determining if one or more grounding points reference a PDU ground.

7. The method of claim 1 wherein said performing comprises:
   determining if a root password has been changed within a range.

8. The method of claim 1 wherein said performing comprises:
   determining if a hard copy of an escalation procedure is available.

9. The method of claim 1 wherein said performing comprises:
   determining if a server response time is fast enough.

10. The method of claim 1 wherein said performing comprises:
    determining if a new hardware validation process occurs.

11. The method of claim 1 wherein said performing comprises:
    determining if a file backup for an operating system of the computer environment occurs regularly.

12. The method of claim 1 wherein said performing comprises:
    determining if a backup is tested regularly.

13. The method of claim 1 wherein said performing comprises:
    determining if a document exists regarding OS and data set recovery.

14. The method of claim 1 wherein said performing comprises:
    determining if a data center has its access controlled.

15. The method of claim 1 wherein said performing comprises:
    determining if a data center has its access monitored and logged.

16. The method of claim 1 wherein said performing comprises:
    determining if an access procedure for after hours personnel exists.

17. The method of claim 1 wherein said performing comprises:
    determining if an escalation procedure document exists.

18. The method of claim 1 wherein said performing comprises:
    determining if all members have an understanding of an escalation procedure.

19. The method of claim 1 wherein said performing comprises:
    determining if a process for emergency changes exists.

20. The method of claim 1 wherein said performing comprises:
    determining if a maintenance schedule exists.

21. The method of claim 1 wherein said performing comprises:
    determining if a pre production review policy for mission critical systems exists.

22. The method of claim 1 wherein said performing comprises:
    determining if a budget for training exists.

23. The method of claim 1 wherein said performing comprises:
    determining if a potential for a security risk exists due to a local root access via a netpr exploit.

24. The method of claim 1 wherein said performing comprises:
    determining if a disk array patch cluster is current.

25. The method of claim 1 wherein said performing comprises:
    determining if a controller for a primary boot disk and a mirror are the same.

26. The method of claim 1 wherein said performing comprises:

determining if a raw disk device or a quick I/O also use ASYNC I/O.

27. The method of claim 1 wherein said performing comprises:

determining if a filesystem uses a quick I/O.

28. The method of claim 1 wherein said performing comprises:

determining if a quantity of host adapters is large.

29. The method of claim 1 wherein said performing comprises:

determining if a firmware for a disk drive is current.

30. The method of claim 1 wherein said performing comprises:

determining if a power supply for two differing disk arrays in the computer environment is the same.

31. The method of claim 1 wherein said performing comprises:

determining if a current restorable OS backup was restored with a file backup utility.

32. The method of claim 1 wherein said performing comprises:

determining if one or more cables are cleanly routed.

33. The method of claim 1 wherein said performing comprises:

determining if a system console is clearly labeled.

34. The method of claim 1 wherein said performing comprises:

determining if a fast Ethernet NIC is operating at a half duplex.

35. The method of claim 1 wherein said performing comprises:

determining if a NIC has an excessive amount of I/O errors.

36. The method of claim 1 wherein said performing comprises:

determining if an ability to print kernel routine names is enabled in case of a watchdog reset.

37. The method of claim 1 wherein said performing comprises:

determining if a Y2K OS patch is a minimum version.

38. The method of claim 1 wherein said performing comprises:

determining if a GBIC is a current version.

39. The method of claim 1 wherein said performing comprises:

determining if a firmware for a drive is a current version.

40. The method of claim 1 wherein said performing comprises:

determining if one or more cables are clearly labeled.

41. The method of claim 1 wherein said performing comprises:

determining if a log book exists and is current.

42. The method of claim 1 wherein said performing comprises:

determining if an OS mirror recovery process is documented.

43. The method of claim 1 wherein said performing comprises:

determining if an OS disk mirror recovery process is documented.

44. The method of claim 1 wherein said performing comprises:

determining if a diag-device and a boot-device value is the same.

45. The method of claim 1 wherein said performing comprises:

determining if a system is accessible.

46. The method of claim 1 wherein said performing comprises:

determining if a field information notice or a field change order applies to the computer environment.

47. The method of claim 1 wherein said performing comprises:

determining if a correctable ECC error exists.

48. The method of claim 1 wherein said performing comprises:

determining if an OS recovery process is documented.

49. The method of claim 1 wherein said performing comprises:

determining if a root user system prompt contains a system hostname.

50. The method of claim 1 wherein said performing comprises:

determining if a kernel state of a plex is disabled.

51. The method of claim 1 wherein said performing comprises:

determining if an ability to monitor a service, an application, and a host system exists.

52. The method of claim 1, wherein the notice includes a recommendation for dressing a problem identified by the not satisfied check.

53. An automated problem identification system for identifying and correcting problems in a computer environment comprising:

a store storing configuration and administration information for the computer environment;

a checks input module selectively providing a check configured to be applied to said configuration and administration information for said computer environment;

a knowledge engine determining if said check is satisfied; and a notice generator generating a notice configured to be provided, if said check is not satisfied.

54. The system of claim 53 further comprising:

an internal rules database configured to be consulted by the knowledge engine during the determining and comprising a compilation of various problems identified for configurations for computer environments.

55. The system of claim 53:

wherein the knowledge engine interacts with a knowledge base to determine if said check should be performed.

56. A computer program product comprising:

a computer usable medium having computer readable program code embodied therein configured to automatically identify a problem in a computer environment, said computer program product comprising:

computer readable code configured to cause a computer to provide information for the computer environment;

computer readable code configured to cause a computer to perform a check of said information for the computer environment;

computer readable code configured to cause a computer to determine if said check is satisfied, wherein the determining includes comparing a portion of the information with an internal rules database comprising previously-identified problems for varying configurations of computer environments; and computer readable code configured to cause a computer to provide a notice, if said check is not satisfied.

57. The computer program product of claim 56 wherein said computer readable code configured to cause a computer to perform uses a knowledge base comprising checks including information corresponding to identifying and correcting problems in the varying computer environments.

58. The computer program product of claim 57 wherein said computer readable code configured to cause a computer to determine uses a knowledge engine to interpret the check against the information for the computer environment including interacting with the knowledge base.

59. A method for inspecting a computer environment for potential problems identified for various configurations of other computer environments, comprising:

providing a set of checks for the potential problems, each of the checks including a rule for use in determining whether the checks are passed or failed;

receiving a set of information corresponding to computer software and hardware in the computer environment;

identifying a set of the checks based on the set of information that are applicable to the computer environment; and determining whether the rules in the applicable checks are satisfied by the set of information for the computer environment to identify which ones of the applicable checks are failed.

60. The method of claim 59, further including for each of the failed checks generating a report identifying the failed checks.

61. The method of claim 60, wherein the report includes information for each of the failed checks on corrective actions useful for passing the failed check.

62. The method of claim 59, further including generating a severity indicator indicating a level of risk for unplanned downtime or data corruption for the computer environment based on the determining.

63. The method of claim 62, wherein the level of risk is selected from the group consisting of low risk, medium risk, and high risk and wherein the set of checks are divided into three subsets consisting of low risk checks, medium risk checks, and high risk checks, the generating of the severity indicator being performed based on which of the three subsets a failed check is a member.

64. The method of claim 59, further including repeating the determining for the checks that based on the determining pass the rules of the checks.

65. The method of claim 59, wherein the checks are selected from the group of checks consisting of: determining if a computer room temperature is within an acceptable range; determining if a power and environmental certification has occurred within a range; determining if one or more grounding points reference a PDU ground; determining if a root password has been changed within a range; determining if a hard copy of an escalation procedure is available; determining if a server response time is fast enough; determining if a new hardware validation process occurs; determining if a file backup for an operating system of the computer environment occurs regularly; determining if a backup is tested regularly; determining if a document exists regarding OS and data set recovery; determining if a data center has its access controlled; determining if a data center has its access monitored and logged; determining if an access procedure for after hours personnel exists; determining if an escalation procedure document exists; determining if all members have an understanding of an escalation procedure; determining if a process for emergency changes exists; determining if a maintenance schedule exists; determining if a pre production review policy for mission critical systems exists; determining if a budget for training exists; determining if a potential for a security risk exists due to a local root access via a netpr exploit; determining if a disk array patch cluster is current; determining if a controller for a primary boot disk and a mirror are the same; determining if a raw disk device or a quick 110 also use ASYNC I/O; determining if a filesystem uses a quick 110; determining if a quantity of host adapters is large; determining if a firmware for a disk drive is current; determining if a power supply for two differing disk arrays in the computer environment is the same; determining if a current restorable OS backup was restored with a file backup utility; determining if one or more cables are cleanly routed; determining if a system console is clearly labeled; determining if a fast Ethernet NIC is operating at a half duplex; determining if a NIC has an excessive amount of I/O errors; determining if an ability to print kernel routine names is enabled in case of a watchdog reset; determining if a GBIC is a current version; determining if a firmware for a drive is a current version; determining if one or more cables are clearly labeled; determining if a log book exists and is current; determining if an OS mirror recovery process is documented; determining if an OS disk mirror recovery process is documented; determining if a diag-device and a boot-device value is the same; determining if a system is accessible; determining if a field information notice or a field change order applies to the computer environment; determining if a correctable ECC error exists; determining if an OS recovery process is documented; determining if a root user contains a system hostname; determining if a kernel state of a plex is disabled; and determining if an ability to monitor a service, an application, and a host system exists.

* * * * *

UNITED STATES PATENT AND TRADEMARK OFFICE
CERTIFICATE OF CORRECTION

PATENT NO. : 6,678,639 B2
DATED : January 13, 2004
INVENTOR(S) : Mike E. Little, Matt J. Helgren and Alan Treece It is certified that error appears in the above-identified patent and that said Letters Patent is hereby corrected as shown below:

<u>Column 26,</u>
Line 48, "pre production" should be -- preproduction --

<u>Column 28,</u>
Line 26, "dressing" should be -- addressing --

<u>Column 30,</u>
Line 18, "pre production" should be -- preproduction --
Lines 24 and 25, "110" should be -- I/O --

Signed and Sealed this

Thirteenth Day of April, 2004

JON W. DUDAS
*Acting Director of the United States Patent and Trademark Office*